(12) United States Patent
DiGiantomasso et al.

(10) Patent No.: US 11,145,216 B2
(45) Date of Patent: *Oct. 12, 2021

(54) METHODS AND SYSTEMS FOR DYNAMICALLY GENERATING A TRAINING PROGRAM

(71) Applicant: Breakthrough PerformanceTech, LLC, Los Angeles, CA (US)

(72) Inventors: John DiGiantomasso, Rancho Santa Margarita, CA (US); Martin L. Cohen, Malibu, CA (US)

(73) Assignee: Breakthrough PerformanceTech, LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/883,463

(22) Filed: May 26, 2020

(65) Prior Publication Data
US 2020/0334997 A1    Oct. 22, 2020

Related U.S. Application Data

(63) Continuation of application No. 16/156,972, filed on Oct. 10, 2018, now Pat. No. 10,672,284, which is a
(Continued)

(51) Int. Cl.
*G06F 3/048* (2013.01)
*G09B 5/00* (2006.01)
(Continued)

(52) U.S. Cl.
CPC .............. *G09B 5/00* (2013.01); *G06Q 10/06* (2013.01); *G06Q 50/20* (2013.01)

(58) Field of Classification Search
CPC .................................. G09B 9/00; G06Q 50/20
See application file for complete search history.

(56) References Cited

U.S. PATENT DOCUMENTS

| 4,015,344 A | 4/1977 | Michaels et al. |
| 4,459,114 A | 7/1984 | Barwick |
(Continued)

FOREIGN PATENT DOCUMENTS

| JP | 2000330464 | 11/2000 |
| JP | 200272843 | 3/2002 |
(Continued)

OTHER PUBLICATIONS

Australian Office Action, dated Jan. 31,2012, on patent application 2008230731 by Breakthrough Performancetech, LLC, 3 pages.
(Continued)

*Primary Examiner* — Justin S Lee
(74) *Attorney, Agent, or Firm* — Knobbe, Martens, Olson & Bear LLP

(57) ABSTRACT

Learning content management systems and processes are described that enable a user to independently define or select learning content, frameworks, styles, and/or protocols. The frameworks may be configured to specify a flow or an order of presentation to a learner with respect to a learning content presentation. The style definition may define an appearance of learning content. At least partly in response to a publishing instruction, the received learning content and the received framework definition are merged and then rendered in accordance with the defined style. The rendered merged learning content and framework definition are packaged in accordance with the defined/selected protocol to provide a published learning document.

20 Claims, 71 Drawing Sheets

Related U.S. Application Data continuation of application No. 15/665,961, filed on Aug. 1, 2017, now Pat. No. 10,102,762, which is a continuation of application No. 14/530,202, filed on Oct. 31, 2014, now Pat. No. 9,728,096, which is a continuation of application No. 13/528,708, filed on Jun. 20, 2012, now Pat. No. 8,887,047.

(60) Provisional application No. 61/501,142, filed on Jun. 24, 2011.

(51) Int. Cl.
*G06Q 10/06* (2012.01)
*G06Q 50/20* (2012.01)

(56) References Cited

U.S. PATENT DOCUMENTS

| | | | |
|---|---|---|---|
| 4,493,655 A | 1/1985 | Groff | |
| 4,608,601 A | 8/1986 | Shreck et al. | |
| 4,643,682 A | 2/1987 | Migler | |
| 4,689,022 A | 8/1987 | Peers et al. | |
| 4,745,468 A | 5/1988 | Von Kohorn | |
| 5,006,987 A | 4/1991 | Harless | |
| 5,056,792 A | 10/1991 | Helweg-Larsen et al. | |
| 5,147,205 A | 9/1992 | Gross et al. | |
| 5,533,110 A | 7/1996 | Pinard et al. | |
| 5,722,418 A | 3/1998 | Bro | |
| 5,980,429 A | 11/1999 | Nashner | |
| 6,067,638 A | 5/2000 | Benitz et al. | |
| 6,106,298 A | 8/2000 | Pollak | |
| 6,113,645 A | 9/2000 | Benitz et al. | |
| 6,125,356 A | 9/2000 | Brockman et al. | |
| 6,155,834 A | 12/2000 | New, III | |
| 6,171,112 B1 | 1/2001 | Clark et al. | |
| 6,190,287 B1 | 2/2001 | Nashner | |
| 6,236,955 B1 | 5/2001 | Summers | |
| 6,296,487 B1 | 10/2001 | Lotecka | |
| 6,319,130 B1 | 11/2001 | Ooseki et al. | |
| 6,409,514 B1 | 6/2002 | Bull | |
| 6,433,784 B1 | 8/2002 | Merrick et al. | |
| 6,514,079 B1 | 2/2003 | McMenimen et al. | |
| 6,516,300 B1 | 2/2003 | Rakshit et al. | |
| 6,535,713 B1 | 3/2003 | Houlihan et al. | |
| 6,589,055 B2 | 7/2003 | Osborne et al. | |
| 6,632,158 B1 | 10/2003 | Nashner | |
| 6,684,027 B1 | 1/2004 | Rosenberg | |
| 6,705,869 B2 | 3/2004 | Schwartz | |
| 6,722,888 B1 | 4/2004 | Macri et al. | |
| 6,736,642 B2 | 5/2004 | Bajer et al. | |
| 6,755,659 B2 | 6/2004 | LoSasso et al. | |
| 6,909,874 B2 | 6/2005 | Holtz et al. | |
| 6,913,466 B2 | 7/2005 | Stanfield et al. | |
| 6,925,601 B2 | 8/2005 | Moore et al. | |
| 6,966,778 B2 | 11/2005 | Macri et al. | |
| 6,976,846 B2 | 12/2005 | Dupont et al. | |
| 6,988,239 B2 | 1/2006 | Womble et al. | |
| 7,016,949 B1 | 3/2006 | Tagawa | |
| 7,039,594 B1 | 5/2006 | Gersting | |
| 7,221,899 B2 | 5/2007 | Ohno et al. | |
| 7,287,218 B1 | 10/2007 | Knotz et al. | |
| 7,367,808 B1 | 5/2008 | Frank et al. | |
| 7,788,207 B2 | 8/2010 | Alcorn et al. | |
| 8,315,893 B2 | 11/2012 | Yaskin et al. | |
| 8,402,055 B2 | 3/2013 | Cepuran et al. | |
| 2002/0059376 A1 | 5/2002 | Schwartz | |
| 2002/0097244 A1 | 7/2002 | Merrick et al. | |
| 2002/0119434 A1 | 8/2002 | Beams et al. | |
| 2003/0059750 A1 | 3/2003 | Bindler et al. | |
| 2003/0065524 A1 | 4/2003 | Giacchetti et al. | |
| 2003/0127105 A1 | 7/2003 | Fontana | |
| 2003/0180699 A1 | 9/2003 | Resor | |
| 2004/0014016 A1 | 1/2004 | Popeck et al. | |
| 2004/0018477 A1 | 1/2004 | Olsen | |
| 2004/0043362 A1 | 3/2004 | Aughenbaugh et al. | |
| 2004/0166484 A1 | 8/2004 | Budke et al. | |
| 2005/0003330 A1 | 1/2005 | Asgarinejad et al. | |
| 2005/0004789 A1 | 1/2005 | Summers | |
| 2005/0026131 A1 | 2/2005 | Elzinga et al. | |
| 2005/0089834 A1 | 4/2005 | Shapiro | |
| 2005/0160014 A1 | 7/2005 | Moss et al. | |
| 2005/0170326 A1 | 8/2005 | Koehler et al. | |
| 2006/0048064 A1 | 3/2006 | Vronay | |
| 2006/0074689 A1 | 4/2006 | Cosatto et al. | |
| 2006/0078863 A1 | 4/2006 | Coleman et al. | |
| 2006/0154225 A1 | 7/2006 | Kim | |
| 2006/0172275 A1 | 8/2006 | Cohen | |
| 2006/0177808 A1 | 8/2006 | Aosawa et al. | |
| 2006/0204943 A1 | 9/2006 | Kimball | |
| 2007/0015121 A1 | 1/2007 | Johnson et al. | |
| 2007/0188502 A1 | 8/2007 | Bishop | |
| 2007/0245305 A1 | 10/2007 | Anderson | |
| 2007/0245505 A1 | 10/2007 | Abfall et al. | |
| 2008/0182231 A1 | 7/2008 | Cohen et al. | |
| 2008/0213741 A1 | 9/2008 | Redd et al. | |
| 2008/0254419 A1 | 10/2008 | Cohen | |
| 2008/0254423 A1 | 10/2008 | Cohen | |
| 2008/0254424 A1 | 10/2008 | Cohen | |
| 2008/0254425 A1 | 10/2008 | Cohen | |
| 2008/0254426 A1 | 10/2008 | Cohen | |
| 2010/0028846 A1 | 2/2010 | Cohen et al. | |
| 2010/0211866 A1 | 8/2010 | Nicholas et al. | |
| 2010/0235395 A1 | 9/2010 | Cepuran et al. | |
| 2011/0106660 A1 | 5/2011 | Ajjarapu et al. | |

FOREIGN PATENT DOCUMENTS

| | | |
|---|---|---|
| JP | 200489601 | 3/2004 |
| JP | 2004240234 | 8/2004 |
| KR | 10-2004-0040942 A | 5/2004 |
| WO | WO 8505715 | 12/1985 |

OTHER PUBLICATIONS

Australian Patent Examination Report No. 1, Patent Application No. 2012272850, dated Aug. 3, 2016, 3 pages.

International preliminary report on patentability; PCT Application No. PCT/US2006/003174, filed on Jan. 27, 2006. dated Apr. 9, 2009.

International Search Report and Written Opinion; PCT/US08/58781, Filing date: Mar. 28, 2008; dated Oct. 1, 2008.

English translation of Japanese Office Action regarding Japanese Patent Application No. 2007-553313, dated Mar. 12, 2012 and dated Mar. 21, 2012.

European Office Action, Application No. 12 802 597.0-1995, dated Dec. 1, 2015, 7 pages.

International Search Report and Written Opinion from PCT/US2012/043628, dated Jan. 10, 2013.

Office Action dated Mar. 28, 2018, received in Canadian Patent Application No. 2,838,985, 5 pages.

Office Action received in Canadian Patent Application No. 2,838,985, dated Dec. 11, 2018, 5 pages.

PCT International Search Report and Written Opinion dated Jul. 23, 2008, PCT Application No. PCT/US2006/003174.

PCT International Search Report and Written Opinion, PCT Application No. PCT/US2009/051994, dated Sep. 23, 2009.

PCT International Search Report and Written Opinion; PCT/US 08/50806; International Filing Date: Jan. 10, 2008; dated Jul. 8, 2008.

Summons to attend oral proceedings dated Nov. 11, 2018, received in European Patent Application No. 12802597.0.

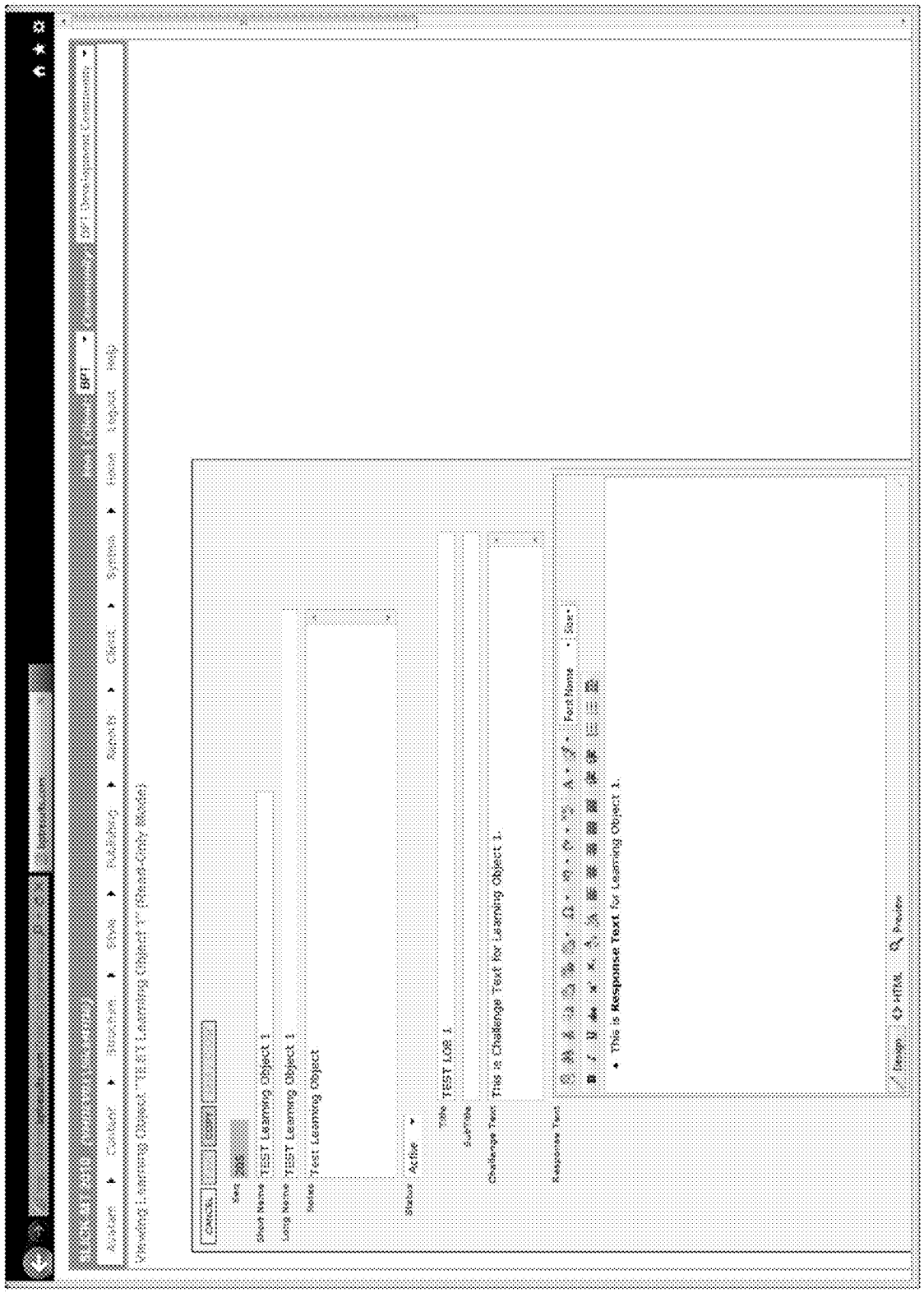
FIG. 2B1

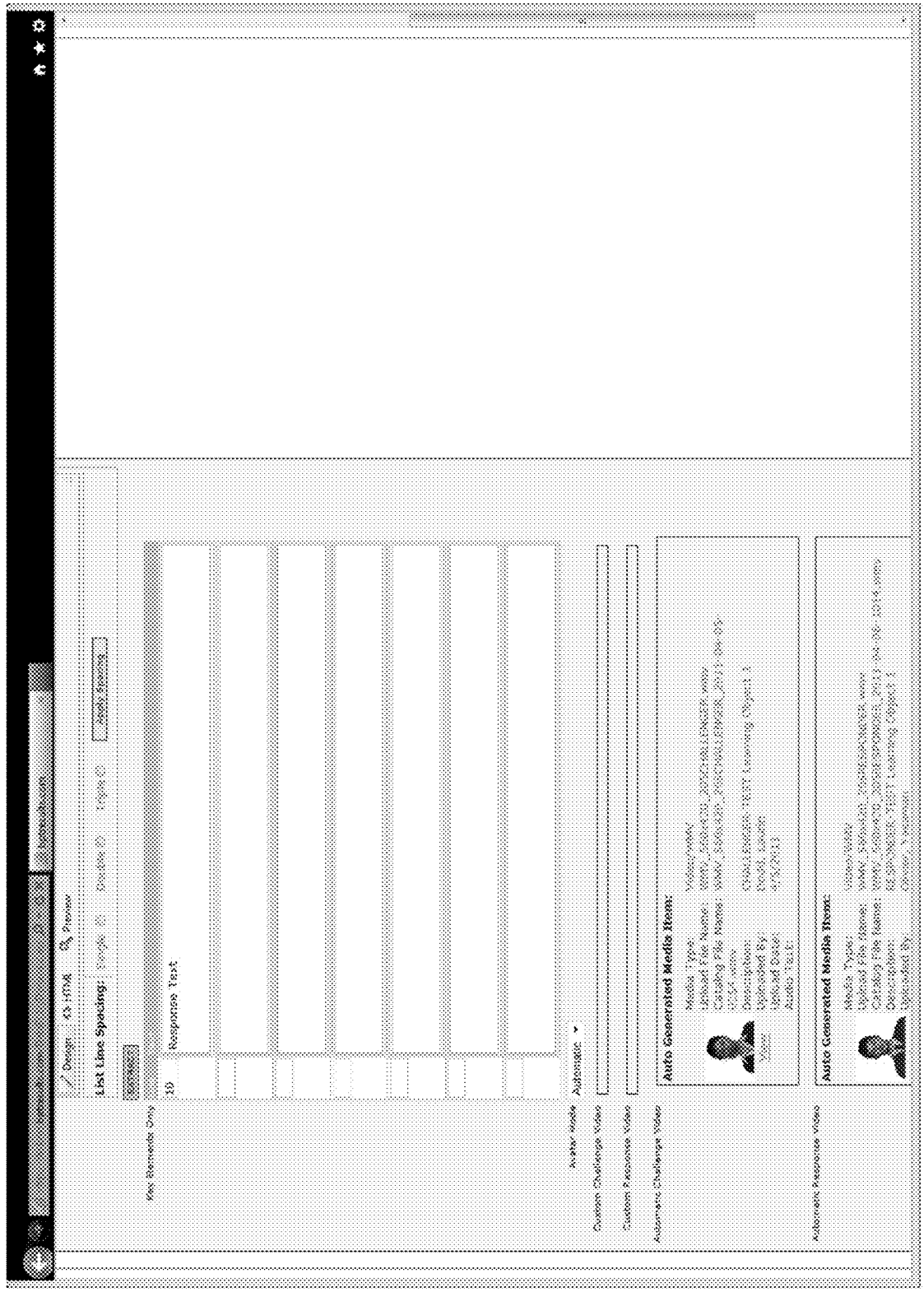
FIG. 2B2

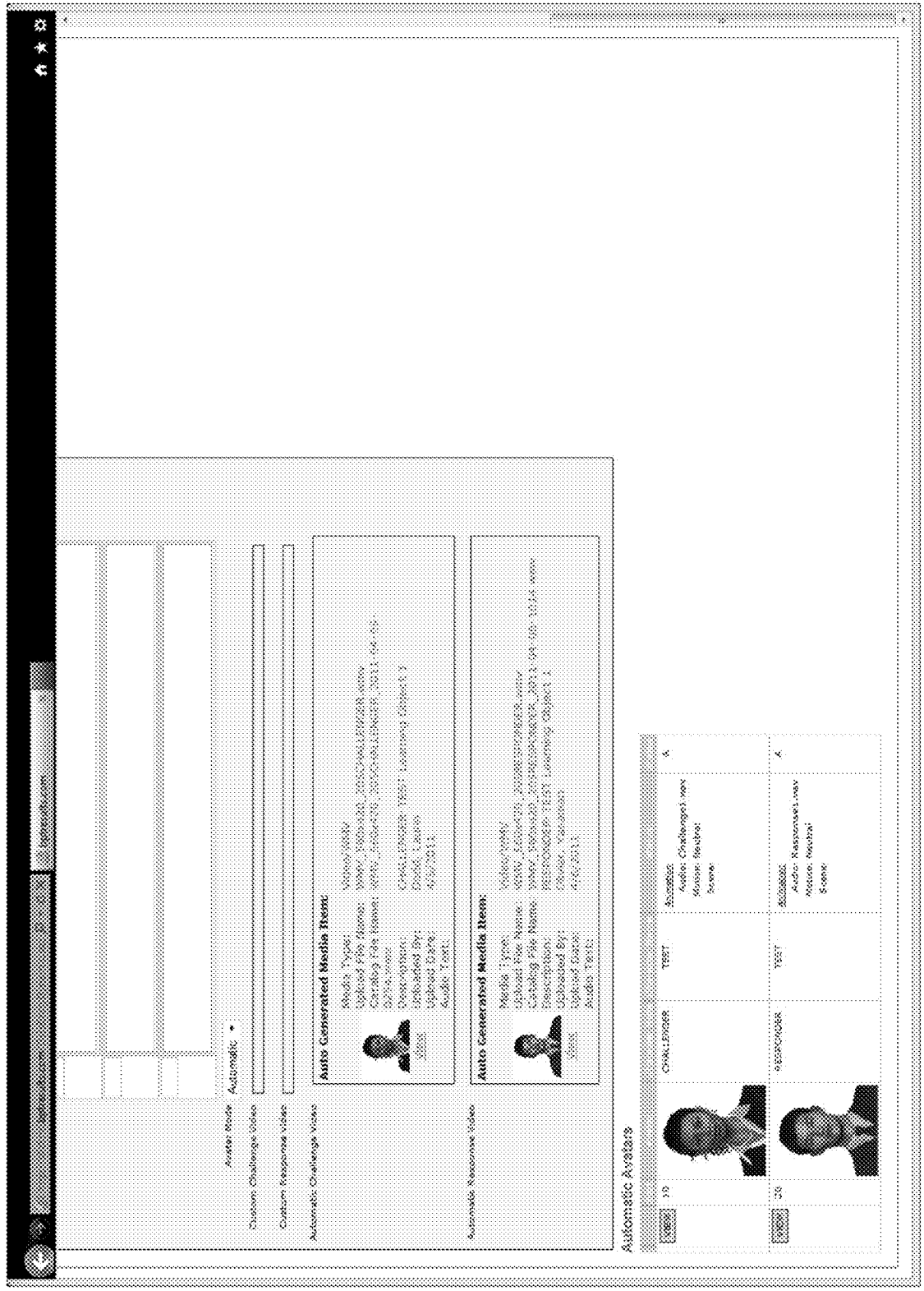
FIG. 2B3

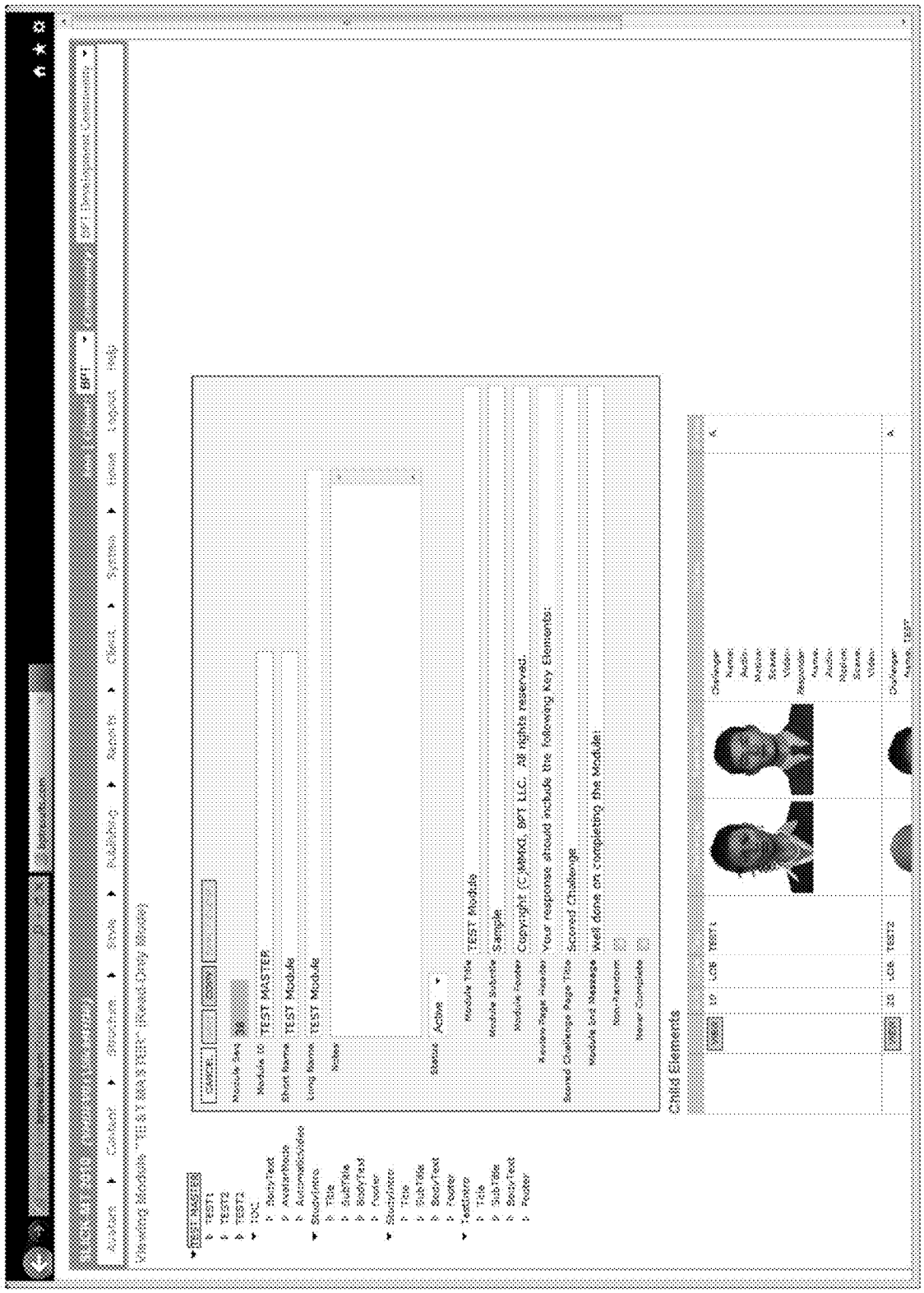
FIG. 2E1

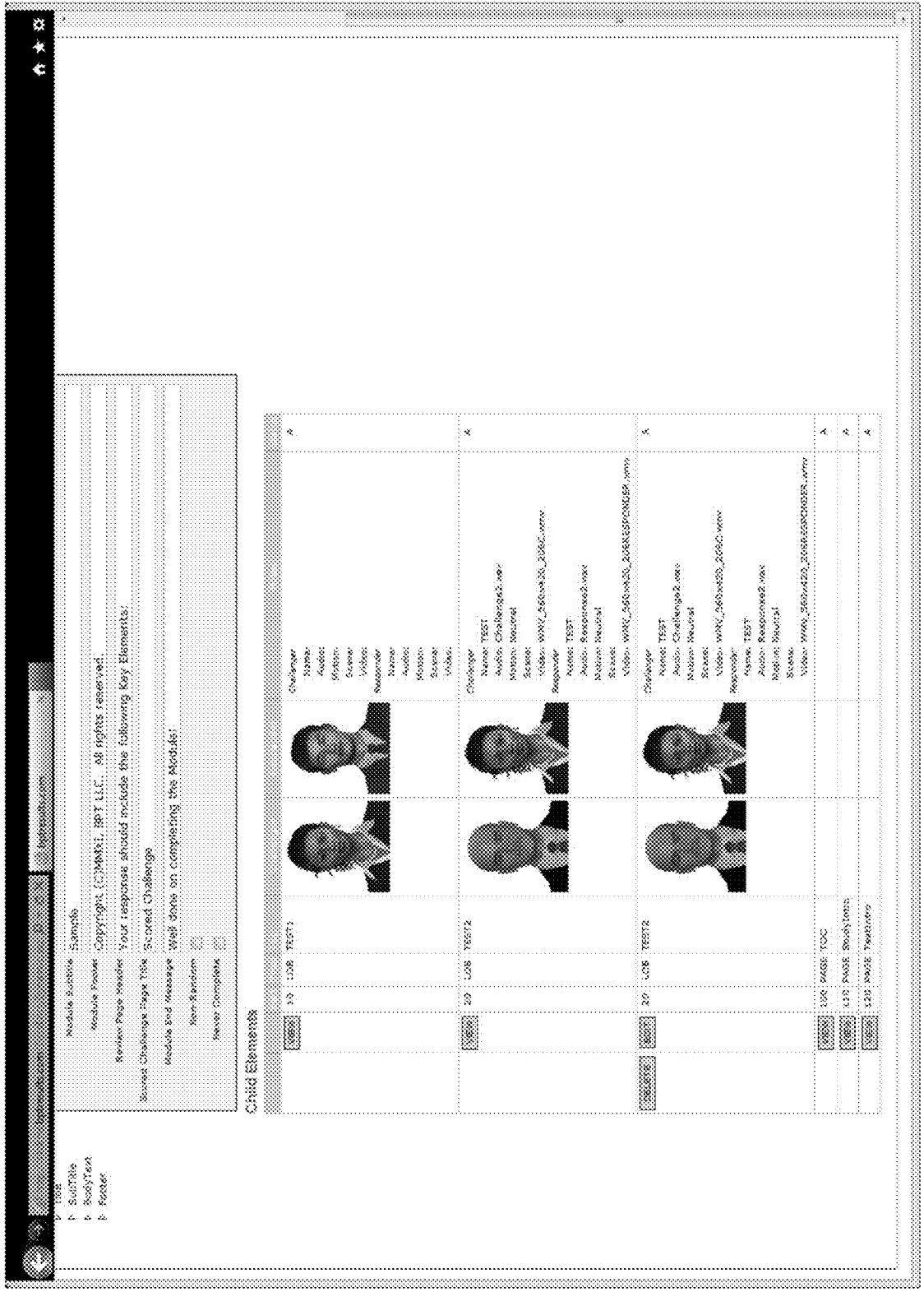
FIG. 2E2

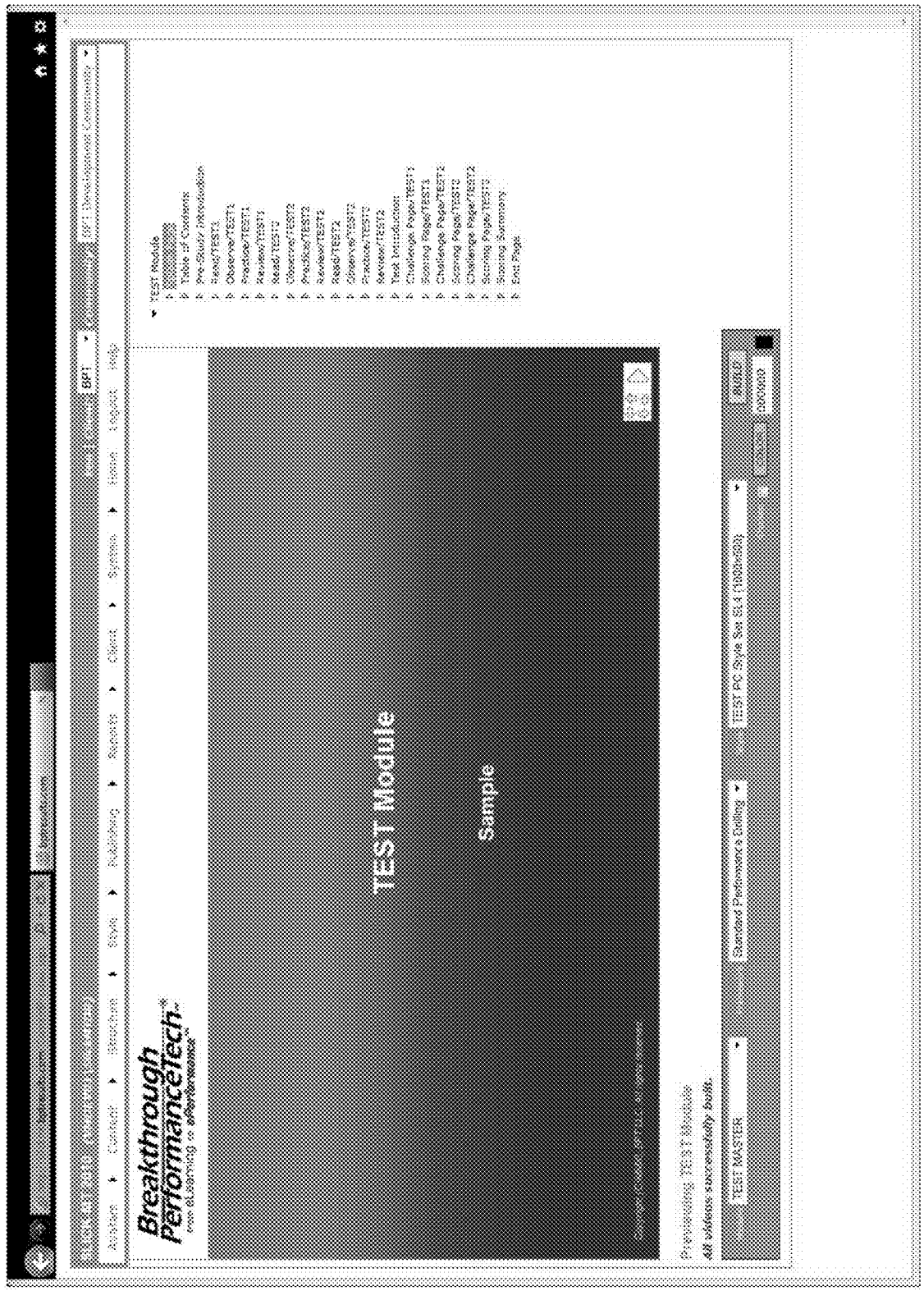
FIG. 2H1

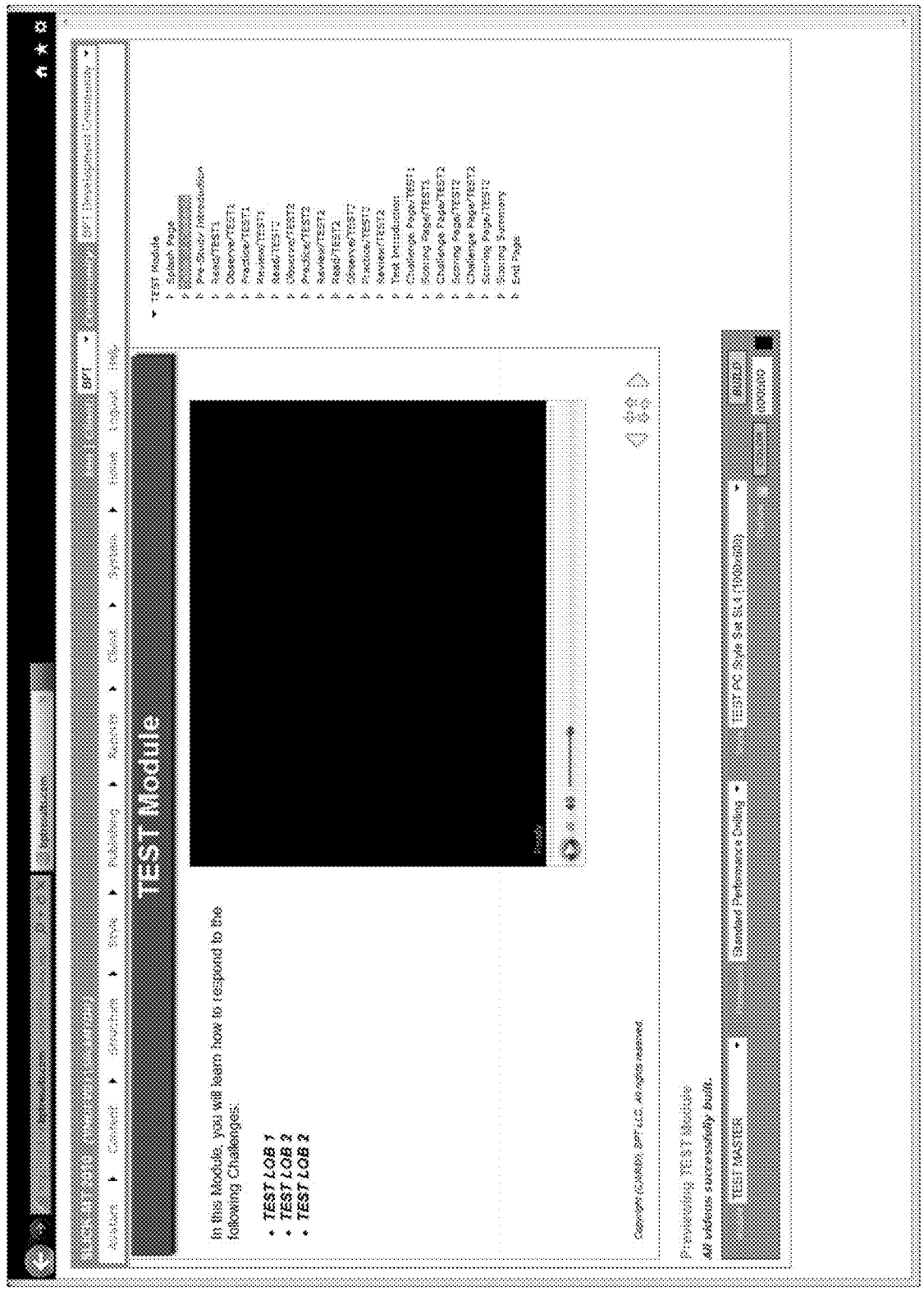
FIG. 2H2

1- User Parameters Definition Flow

METHODS AND SYSTEMS FOR DYNAMICALLY GENERATING A TRAINING PROGRAM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND OF THE INVENTION

Field of the Invention

The present invention is related to program generation, and in particular, to methods and systems for training program generation.

Description of the Related Art

Conventional tools for developing computer-based training courses and programs themselves generally require a significant amount of training to use. Further, updates to training courses and programs conventionally require a great deal of manual intervention. Thus, conventionally, the costs, effort, and time need to generate a training program are unsatisfactorily high.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example embodiment provides a learning content management system comprising: one or more processing devices; non-transitory machine readable media that stores executable instructions, which, when executed by the one or more processing devices, are configured to cause the one or more processing devices to perform operations comprising: providing for display on a terminal a learning content input user interface configured to receive learning content; receiving learning content via the learning content input user interface and storing the received learning content in machine readable memory; providing for display on the terminal a framework user interface configured to receive a framework definition, wherein the framework definition defines at least an order of presentation to a learner with respect to learning content; receiving, independently of the received learning content, a framework definition via the framework user interface and storing the received framework definition in machine readable memory, wherein the framework definition specifies a presentation flow; providing for display on the terminal a style set user interface configured to receive a style definition, wherein the style definition defines an appearance of learning content; receiving, independently of at least a portion of the received learning content, the style set definition via the style set user interface and storing the received style set definition in machine readable memory; providing for display on the terminal a protocol user interface configured to receive a protocol selection; receiving, independently of the received learning content, the protocol selection via the protocol user interface; receiving from the user a publishing instruction via a publishing user interface; at least partly in response to the received publishing instruction, accessing from machine readable memory the received learning content, the received framework definition, the received style set definition, and the received protocol selection: merging the received learning content and the received framework definition; rendering the merged the received learning content and the received framework definition in accordance with the received style set definition; packaging the rendered merged learning content and framework definition in accordance with the selected protocol to provide a published learning document.

An example embodiment provides a method of managing learning content, the method comprising: providing, by a computer system, for display on a display device a learning content input user interface configured to receive learning content; receiving, by the computer system, learning content via the learning content input user interface and storing the received learning content in machine readable memory; providing, by the computer system, for display on the display device a framework user interface configured to receive a framework definition, wherein the framework definition defines an order of presentation to a learner with respect to learning content; receiving by the computer system, independently of the received learning content, a framework definition via the framework user interface and storing the received framework definition in machine readable memory, wherein the framework definition specifies a presentation flow; providing, by the computer system, for display on the display device a style set user interface configured to receive a style definition, wherein the style definition defines an appearance of learning content; receiving by the computer system the style set definition via the style set user interface and storing the received style set definition in machine readable memory; providing for display on the display device a protocol user interface configured to receive a protocol selection; receiving by the computer system, independently of the received learning content, the protocol selection via the protocol user interface; receiving, by the computer system from the user, a publishing instruction via a publishing user interface; at least partly in response to the received publishing instruction, accessing, by the computer system, from machine readable memory the received learning content, the received framework definition, the received style set definition, and the received protocol selection: merging, by the computer system, the received learning content and the received framework definition; rendering, by the computer system, the merged the received learning content and the received framework definition in accordance with the received style set definition; packaging the rendered merged learning content and framework definition in accordance with the selected protocol to provide a published learning document.

An example embodiment provides a non-transitory machine readable media that stores executable instructions, which, when executed by the one or more processing devices, are configured to cause the one or more processing devices to perform operations comprising: providing for display on a terminal a learning content input user interface configured to receive learning content; receiving learning content via the learning content input user interface and storing the received learning content in machine readable memory; providing for display on the terminal a framework user interface configured to receive a framework definition, wherein the framework definition defines an order of presentation to a learner with respect to learning content; receiving, independently of the received learning content, a framework definition via the framework user interface and storing the received framework definition in machine readable memory, wherein the framework definition specifies a presentation flow; providing for display on the terminal a style set user interface configured to receive a style definition, wherein the style definition defines an appearance of learning content; receiving the style set definition via the style set user interface and storing the received style set definition in machine readable memory; providing for display on the terminal a protocol user interface configured to receive a protocol selection; receiving, independently of the received learning content, the protocol selection via the protocol user interface; receiving from the user a publishing instruction via a publishing user interface; at least partly in response to the received publishing instruction, accessing from machine readable memory the received learning content, the received framework definition, the received style set definition, and the received protocol selection: merging the received learning content and the received framework definition; rendering the merged the received learning content and the received framework definition in accordance with the received style set definition; packaging the rendered merged learning content and framework definition in accordance with the selected protocol to provide a published learning document.

An example embodiment provides a non-transitory machine readable media that stores executable instructions, which, when executed by the one or more processing devices, are configured to cause the one or more processing devices to perform operations comprising: providing for display on a terminal a learning content input user interface configured to receive learning content; receiving learning content via the learning content input user interface and storing the received learning content in machine readable memory; providing for display on the terminal a framework user interface configured to receive a framework definition, wherein the framework definition defines an order of presentation to a learner with respect to learning content; receiving, independently of the received learning content, a framework definition via the framework user interface and storing the received framework definition in machine readable memory, wherein the framework definition specifies a presentation flow; receiving from the user a publishing instruction via a publishing user interface; at least partly in response to the received publishing instruction, accessing from machine readable memory the received learning content, the received framework definition, a received style set definition, and a received protocol selection: merging the received learning content and the received framework definition; rendering the merged the received learning content and the received framework definition in accordance with the received style set definition; packaging the rendered merged learning content and framework definition in accordance with the selected protocol to provide a published learning document.

An example embodiment comprises: an extensible content repository; an extensible framework repository; an extensible style repository; an extensible user interface; and an extensible multi-protocol publisher component. Optionally, the extensible framework repository, the extensible style repository; the extensible user interface, and the extensible multi-protocol publisher component may be configured as described elsewhere herein.

An example embodiment provides a first console enabling the user to redefine the first console and to define at least a styles console, a framework console, and/or a learning content console. The styles consoles may be used to define styles for learning content (optionally independently of the learning content), the framework console may be used to define a learning framework (e.g., order of presentation and/or assessments) to be used with learning content, (optionally independently of the learning content), The learning content console may be used to receive/define learning content.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

FIGS. 3A-3D illustrate additional example user interfaces.

DETAILED DESCRIPTION OF PREFERRED EMBODIMENTS

Figure 1:
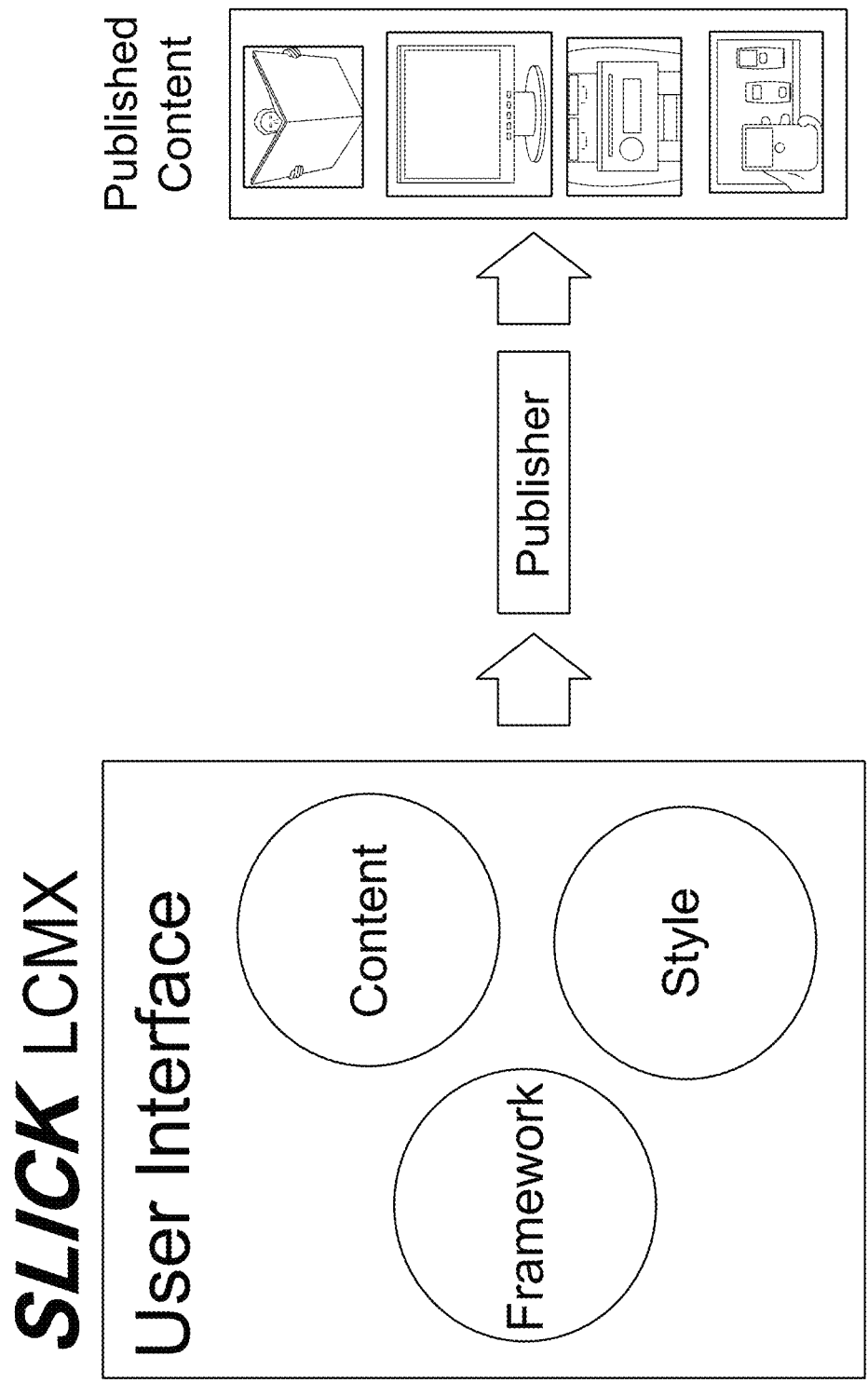
FIG. 1 illustrates an example architecture.

Systems and methods are described for storing, organizing, manipulating, and/or authoring content, such as learning content. Certain embodiments provide a system for authoring computer-based learning modules. Certain embodiments provide an extensible learning management solution that enables new features and functionality to be added over time to provide a long-lasting solution.

Certain embodiments enable a user to define and/or identify the purpose or intent of an item of learning content. For example, a user may assign one or more tags (e.g., as metadata) to a given piece of content indicating a name, media type, purpose of content, intent of content. A tag (or other linked text) may include descriptive information, cataloging information, classification information, etc. Such tag information may enhance a designer of learning courseware to more quickly locate (e.g., via a search engine or via an automatically generated index), insert, organize, and update learning content with respect to learning modules. For example, a search field may be provided wherein a user can enter text corresponding to a subject matter of a learning object, and a search engine will then search for and identify to the user learning objects corresponding to such text, optionally in order of inferred relevancy.

Further, certain embodiments provide some or all of the following features:

The ability to quickly enter and organize content without having to first define a course module framework to receive the content.

The ability to have changes to content quickly and automatically incorporated/updated in some or all modules that include such content (without requiring a user to manually go through each course where the content is used and manually update the content).

Enables the coordination among designers and content providers.

The ability to create multiple versions of a course applicable to different audiences (beginners, intermediate learners, advanced learners);

The ability to create multiple versions of a course for different devices and formats.

Certain example embodiments described herein may address some or all of the deficiencies of the conventional techniques discussed herein.

By way of background, certain types of language are not adequately extensible. By way of illustration, HTML (HyperText Markup Language), which is used to create Web pages, includes "tags" to denote various types of text formatting. These tags are encased in angle brackets, and opening and closing tags are paired around the text they impact. Closing tags are denoted with a slash character before the tag name. Consider this example:

This text is Italic, this remainder of this text is underlined, but this text is italic and underlined.

The HTML tags to define this, assuming "i" for italic and "u" for underlined could look like this:

This text is <i>Italic</i>, this remainder of this text is <u>underlined, but this text is </i>italic and underlined</i></u>.

HTML allows for the definition of more than italics and underlining, including identification of paragraphs, line breaks, bolding, typeface and font size changes, colors, etc. Basically, the controls that a user would need to be able to format text on a web page are defined in the HTML standard, and implemented through the use of opening and closing tags.

However, HTML is limited. It was specifically designed for formatting text, and not intended to structure data. Extensible languages have been developed, such as XML. For example, allowable tags could be defined within the structure of XML itself—allowing for growth potential over time. Since the language defined itself it was considered to be an "eXtensible Markup Language" and was called "XML" for short.

However, extensible languages have not been developed for managing or authoring learning modules.

While Learning Content Management Systems (LCMS) exist, they suffer from significant deficiencies. Conventional LCMS products are course-centric, not "content centric." In other words, with respect to certain convention LCMS products, the learning content is only entered within the confines of the narrow definition of a "course", and these courses are designed to follow a given flow and format. Reusability is limited. For example, if a designer wishes to reuse a piece of content from an existing course, typically the user would have to access the existing course, find content (e.g., a page, a text block, or an animation) that can be utilized in a new course, and would then have to manually copy such content (e.g., via a copy function), and then manually paste the content into a new course.

Just as HTML is limited to defining specific "page formatting" elements, a conventional LCMS is limited to defining specific "course formatting" elements, such as pages, text, animations, videos, etc. Thus, the learning objects in a conventional LCMS product are identified by their formats, not by their purpose or intent within the confines of the course.

As such, in conventional LCMS products, a user can only search for content type (e.g., "videos"), and cannot search for content based on the content purpose or content subject matter. For example, in conventional LCMS products, a user cannot search for "animated role-model performances," "typical customer face-to-face challenges," or "live-action demonstrations."

By contrast, certain embodiments described herein enable a user to define and describe content and its purpose outside of a course, and to search for such content using words or other data included within the description and/or other fields (e.g., such a data provided via one or more of the user interfaces discussed herein). For example, with respect to an item of video, in addition to identifying the item as a video item, the user can define the video with respect to its purpose, such as "animated role-model performance," that exemplifies a given learning concept. As will be discussed below, certain examples enable a user to associate a short name, a long name, a description, notes, type, and/or other data with respect to an item of content, style, framework, control, etc., which may be used by the search engine when looking for matches to a user search term. Optionally, the search user interface may include a plurality of fields and/or search control terms that enable a user to further refine a search. For example, the user may specify that the search engine should find content items that include a specified search term in their short and/or long names. The user may focus the search to one or more types of data described herein.

Another deficiency of conventional LCMS products is that they force the author to store the content in a format that is meaningful to the LCMS and they do not provide a mechanism that allows the author to store the content in a format that is meaningful to the user. In effect, conventional LCMS products structure their content by course, and when a user accesses a course, the user views pages, and on those pages are various elements—text, video, graphics, animations, audios, etc. Content is simply placed on pages. Conventionally, then, a course is analogous to a series of slides, in some instances with some interactivity included. But the nature of conventional e-Learning courses authored using conventional LCSM products is very much like a series of pages with various content placed on each page—much like a PowerPoint slide show.

To further illustrate the limitations of conventional LCMS, if a user wants to delete an item of learning content, the user would have to access each page that includes the learning content, select the learning content to be deleted, and then manually delete the learning content. Similarly, conventionally if a user wants to add learning content, the user visits each page where the learning content is to be inserted, and manually inserts the learning content. Generally, conventional LCMS products do not know what data the user is looking to extract. Instead, a conventional LCMS product simply "knows" that it has pages, and on each page are items like headers, footers, text blocks, diagrams, videos, etc.

By contrast, certain embodiments described herein have powerful data description facilities that enable a user to enter and identify data in terms that is meaningful to the user. So instead of merely entering items, such as text blocks and diagrams, on pages, the user may enter and/or identify items by subject (e.g., "Basic Concepts", "Basic Concepts Applied", "Exercises for Applying Basic Concepts", etc.). The user may then define a template that specifies how these various items are to be presented to build learning modules for basic concepts. This approach saves time in authoring learning modules, as a user would not be required to format each learning module. Instead, a user may enter the data independent of the format in which it is to be presented, and then create a "framework" that specifies that for a given module to be built, various elements are to be extracted from the user's data, such as an introduction to the learning module, a description of the subject or skills to be learned, introduction of key points, and a conclusion. The user may enter the content in such a way that the system knows what the data is, and the user may enter the content independent of the presentation framework. Then publishing the matter may be accomplished by merging the content and the framework. An additional optional advantage is that the user can automatically publish the same content in any number of different frameworks.

Certain embodiments enable some or all of the foregoing features by providing a self-defining, extensible system enabling the user to appropriately tag and classify data. Thus, rather than being limited to page-based formatting, as is the case with conventional LCMS products, certain embodiments provide extensible learning content management, also referred to as an LCMX (Learning Content Management—Extensible) application. The LCMX application may include an extensible format whereby new features, keywords and structures may be added as needed or desired.

Certain example embodiments that provide an authoring system that manages the authoring process and provides a resulting learning module will now be described in greater detail.

Certain embodiments provide some or all of the following:
  Web-Enabled Data Entry User interfaces
  SQL Server Data Repository Separation of Content, Framework and Style Elements
  Table-Driven, Extensible Architecture
  Multiple Frameworks
  One-Step Publishing Engine
  Multiple Output Formats
  Sharable Content Object Reference Model (SCROM) (standards and specifications for web-based e-learning)-Compliant (FLASH, SILVERLIGHT software compliant)
  HTML5-Output (compatible with IPOD/IPAD/BLACKBERRY/ANDROID products (HTML5)
  MICROSOFT OFFICE Document output compatibility (e.g., WORD software, POWERPOINT software, etc.)
  Audio only output
  PDF output Certain embodiments may be used to author and implement training modules and processes disclosed in the following patent applications, incorporated herein by reference in their entirety:

| Application No. | Publication No. | Filing Date |
| --- | --- | --- |
| 12/510,868 | US 2010-0028846 A1 | Jul. 28, 2009 |
| 12/058,525 | US 2008-0254426 A1 | Mar. 28, 2008 |
| 12/058,515 | US 2008-0254425 A1 | Mar. 28, 2008 |
| 12/058,493 | US 2008-0254424 A1 | Mar. 28, 2008 |
| 12/058,491 | US 2008-0254423 A1 | Mar. 28, 2008 |
| 12/058,481 | US 2008-0254419 A1 | Mar. 28, 2008 |
| 11/669,079 | US 2008-0182231 A1 | Jan. 30, 2007 |
| 11/340,891 | US 2006-0172275 A1 | Jan. 27, 2006 |

Further, certain embodiments may be implemented using the systems disclosed in the foregoing applications.

Certain embodiments enhance database capabilities so that much or all of the data is self-defined within the database, and further provide database defined User Interface (UI) Consoles that enable the creation and maintenance of data. This technique enables certain embodiments to be extensible to provide for the capture of new, unforeseen data types and patterns.

Certain example embodiments will now be described in greater detail. Certain example embodiments include some or all of the following components:
  Extensible Content Repository
  Extensible Framework Repository
  Extensible Style Repository
  Extensible User Interface
  Extensible Multi-Protocol Publisher As illustrated in FIG. 1, the extensible user interface provides access to the extensible content, framework, and style repositories. This content is then processed through the multi-protocol publisher application to generate content intended for the end user (e.g., a trainee/student or other learner). A search engine may be provided, wherein a user can enter into a search field text (e.g., tags or content) associated with a learning object, framework, or style, and the search engine will identify matching objects (e.g., in a listing prioritized based on inferred relevancy). Optionally, an indexing module is provided which generates an index of each tag and the learning objects associated with such tag. Optionally, a user may make changes to a given item via a respective user interface, and the system will automatically ripple the changes throughout one or more user-specified course modules to thereby produce and updated course module.

Conventional approaches to learning content management lay out a specific approach in a "fixed" manner. Conventionally, with such a "fixed" approach, entry user interfaces/screens would be laid out in an unchanging configuration—requiring extensive manual "remodeling" if more features are to be added or deleted, or if a user wanted to re-layout a user interface (e.g., split a busy user interface into two or more smaller workspaces).

By contrast, certain embodiments described herein utilize a dynamic, extensible architecture, enabling a robust capability with a large set of features to be implemented for current use, along with the ability to add new features and functionality over time to provide a long-lasting solution.

With the database storing the content, a learning application may be configured as desired to best manipulate that data to achieve an end goal. In certain embodiments, the same data can be accessed and maintained by a number of custom user interfaces to handle multiple specific requests. For example, if one client wanted the content labeled in certain terms and presented in a certain order, and a different client wanted the content displayed in a totally different way, two separate user interfaces can be configured so that each client optionally sees the same or substantially the same data in accordance with their own specified individual preferences. Furthermore, the data can be tailored as well, so that each client maintains data specific to their own needs in each particular circumstance.

Thus, in certain embodiments, a system enables the user to perform the following example definition process (where the definitions may be then stored in a system database):

1. Define content, where the user may associate meaning and intent of the content with a given item of content (e.g., via one or more tags described herein). Certain embodiments enable a user to add multiple meanings and/or intents with a given item of content, as desired. The content and associated tags may be stored in a content library.

2. Define frameworks, which may specify or correspond to a learning methodology. For example, a framework may specify an order or flow of presentation to a learner (e.g., first present an introduction to the course module, then present a definition of terms used in the course module, then present one or more objectives of the course module, then display a "good" role model video illustrating a proper way to perform, then display a "bad" role model video illustrating an erroneous way to perform, then provide a practice session, the provide a review page, then provide a test, then provide a test score, etc.). A given framework may be matched with content in the content library (e.g., where a user can specify which media is to be used to illustrate a role model). A framework may define different flows for different output/rendering devices. For example, if the output device is presented on a device with a small display, the content for a given user interface may be split up among two or more user interfaces. By way of further example, if the output device is an audio-only device, the framework may specify that for such a device only audio content will be presented.

3. Style, which defines appearances-publishing formats for different output devices (e.g., page layouts, type faces, corporate logos, color palettes, number of pixels (e.g., which may be respectively different for a desktop computer, a tablet computer, a smart phone, a television, etc.)). By way of illustration, different styles may be specified for a brochure, a printed book, a demonstration (e.g., live video, diagrams, animations, audio descriptions, etc.), an audio only device, a mobile device, a desktop computer, etc. The system may include predefined styles which may be utilized by a user and/or edited by a user.

Thus, content, frameworks, and styles may be separately defined, and then selected and combined in accordance with user instructions to provide a presentation. In particular, a framework may mine the content in the content library, and utilize the style from the style library.

By contrast, using conventional systems, before a user begins defining a course module, the user needs to know what device will be used to render the course module. Then the user typically specifies the format and flow of each page, on a page-by-page basis. The user then specifies the content for each page. Further, as discussed above, conventionally, because the system does not know the subject matter or intent of the content, if a user later wants to make a change to a given item or to delete a given item (e.g., a discussion of revenues and expenses), the user has to manually go through each page, determine where a change has to be made and then manually implement the change.

Certain embodiments of the authoring platform offer several areas of extensibility including learning content, frameworks, styles, publishing, and user interface, examples of which will be discussed in greater detail below. It is understood that the following are illustrative examples, and the extensible nature of the technology described herein may be utilized to create any number of data elements of a given type as appropriate or desired.

Extensible Learning Content

Learning Content is the actual data to be presented in published courseware (where published courseware may be in the form of audio/video courseware presented via a terminal (e.g., a desktop computer, a laptop computer, a table computer, a smart phone, an interactive television, etc.), audio only courseware, printed courseware, etc) to be provided to a learner (e.g., a student or trainee, sometimes generically referred to herein as a learner). For example, the learning content may be directed to "communication," "management," "history," or "science" or other subject. Because the content can reflect any subject, certain embodiments of the content management system described herein are extensible to thereby handle a variety of types of content. Some of these are described below.

Support Material

A given item of content may be associated with an abundance of related support data used for description, cataloging, and classification. For example, such support data may include a "title" (e.g., which describes the content subject matter), "design notes", "course name" (which may be used to identify a particular item of content and may be used to catalog the content) and "course ID" which may be used to uniquely identify a particular item of content and may be used to classify the content, wherein a portion of the course ID may indicate a content classification.

Text

For certain learning modules, a large amount of content may be in text format. For example, lesson content, outlines, review notes, questions, answers, etc. may be in text form. Text can be utilized by and displayed by computers, mobile devices, hardcopy printed materials, or via other mediums that can display text.

Illustrations

Illustrations are often utilized in learning content. By way of example and not limitation, a number of illustrations can be attached to/included in the learning content to represent and/or emphasize certain data (e.g., key concepts). In electronic courseware, the illustrations may be in the form of digital images, which may be in one or more formats (e.g., BMP, DIP, JPG, EPS, PCX, PDF, PNG, PSD, SVG, TGA, and/or other formats).

Audio & Video

Courseware elements may include audio and video streams. Such audio/video content can include narrations, questions, role models, role model responses, words of encouragement, words of correction, or other content. Certain embodiments described herein enable the storage (e.g., in a media catalog), and playback of a variety of audio and/or video formats/standards of audio or video data (e.g. MP3, ACC, WMA, or other format for audio data, and MPG, MOV, WMV, RM, or other format for video data).

Animations

An animation may be in the form of an "interactive illustration." For example, certain learning courseware may employ Flash, Toon Boom, Synfig, Maya (for 3D animations) etc., to provide animations, and/or to enable a user to interact with animations.

Automatically Generated Content

Certain embodiments enable the combination (e.g., synchronization) of individual learning content elements of different types to thereby generate additional unique content. For example, an image of a face can be combined with an audio track to generate an animated avatar whose lips and/or body motions are synchronized with the audio track so that it appears to the viewer that the avatar is speaking the words on the audio track.

Other content, including not yet developed content, may be incorporated as well.

Extensible Frameworks

As similarly discussed above, certain embodiments separate the learning content from the presentation framework. Thus, a database can store "knowledge" that can then be mapped out through a framework to become a course, where different frameworks can access the same content database to produce different courses and/or different versions and/or formats of the same course. Frameworks can range from the simple to the advanced.

By way of example, using embodiments described herein, various learning methodologies may be used to draw upon the content data. For example, with respect to vocabulary words, a user may define spelling, pronunciation, word origins, parts of speech, etc. A learning methodology could call for some or all of these elements to be presented in a particular order and in a particular format. Once the order and format is established, and the words are defined in the database, some or all of the vocabulary library may be incorporated as learning content in one or more learning modules.

The content can be in any of the previously mentioned formats or combinations thereof. For example, a module may be configured to ask to spell a vocabulary word by stating the word and its meaning via an audio track, without displaying the word on the display of the user's terminal. The learner could then be asked to type in the appropriate spelling or speak the spelling aloud in the fashion of a spelling bee. The module can then compare the learner's spelling with the correct spelling, score the learner's spelling, and inform the learner if the learner's spelling was correct or incorrect.

The same content can be presented in any number of extensible learning methodologies, and assessed via a variety of assessment methodologies.

Assessment Methodologies

Certain embodiments enable the incorporation of one or more of the following assessment methodologies and tools to evaluate a learner's current knowledge/skills and/or the success of the learning in acquiring new knowledge/skills via a learning course: true/false questions, multiple choice questions, fill in the blank, matching, essays, mathematical questions, etc. Such assessment tools can access data elements stored in the learning content.

In contrast to conventional approaches, using certain embodiments described herein, data elements can be re-used across multiple learning methodologies. For example, conventionally a module designer may incorporate into a learning module a multiple choice question by specifying a specific multiple choice question, the correct answer to the multiple choice question, and indicating specific incorrect answers. By contrast, certain embodiments described herein further enable a module designer to define a question more along the lines of "this is something the learner should be able to answer." The module designer can then program in correct answers and incorrect answers, complete answers and incomplete answers. These can then be drawn upon to create any type of assessment, such as multiple choice, fill in the blank, essays, or verbal response testing.

Intermixed Modules

In certain embodiments a variety of learning methodologies and assessments (e.g., performance drilling (PD), listening mastery (LM), perfecting performance (PP), automated data diagnostics (ADD), and preventing missed opportunities (PMO) methodologies disclosed in the applications incorporated herein) can be included in a given module. For example, with respect to a training program for a customer service person, a module may be included on how to greet a customer, how to invite the customer in for an assessment, and how to close the sale with the customer. Once the content is entered into the system and stored in the content database, a module may be generated with the training and/or assessment for the greeting being presented in a multiple choice format, the invitation presented in PD format, and the closing presented in PP format. If it was determined that a particular format was not well-suited for the specific content, it could be easily swapped out and replaced with a completely different learning methodology (e.g., using a different, previously defined framework or a new framework); the lesson content may remain the same, but with a different mix and/or formatting of how that content is presented.

Extensible Styles

Content and the manner in which it is presented via frameworks have now been discussed. The relationship of the extensible element to the actual appearance of that content will now be discussed. This relationship is managed in certain embodiments via Extensible Styles. Once the content and flow are established, the styles specify and set the formatting of individual pages or user interfaces, and define colors, sizes, placement, etc.

Page Layout

"Pages" need not be physical pages; rather they can be thought of as "containers" that present information as a group. Indeed, a given page may have different attributes and needs depending on the device used to present (visually and/or audibly) the page.

By way of example, in a hardcopy book (or an electronic representation of the same) a page may be laid out so with a chapter title, page number, header and footer, and paragraphs. Space may be reserved for illustrations.

For a computer, a "page" may be a "screen" that, like a book, includes text and/or illustrations placed at various locations. However, in addition, the page may also need to incorporate navigation controls, animations, audio/video, and/or other elements.

For an audio CD, a "page" could be a "track" that consists of various audio content separated into distinct sections.

Thus, in the foregoing instances, the layout of the content may be managed through a page metaphor. Further, for a given instance, there can be data/specifications established as to size and location, timing and duration, and attributes of the various content elements.

Media

The media to be displayed can be rendered in a variety of different styles. For example, a color photo could be styled to appear in gray tones if it were to appear in a black and white book. Similarly, a BMP graphic file could be converted into a JPG or PNG format file to save space or to allow for presentation on a specific device. By way of further example, a Windows WAV audio file could be converted to an MP3 file. Media styles allow the designer/author to define how media elements are to be presented, and embodiments described herein can automatically convert the content from one format (e.g., the format the content is currently stored in) to another format (e.g., the format specified by the designer or automatically selected based on an identified target device (e.g., a book, an audio player, a touch screen tablet computer, a desktop computer, an interactive television, etc.)).

Static Text

In addition to forming substantive learning content, certain text elements can be thought of as "static text" that remain consistent throughout a particular style. For example, static text can include words such as "Next" and "Previous" that may appear on each user interface in a learning module, but would need to be changed if the module were to be published in a different language. But other text, such as navigation terminology, copyright notices, branding, etc., can also be defined and applied as a style to learning content, thus eliminating the need to repetitively add these elements to each module.

Control Panels

Control panels give the learner a way to maneuver or navigate through the learning module as well as to access additional features. These panels can vary from page to page. For example, the learner may be allowed to freely navigate in the study section of a module, but once the learner begins a testing assessment, the learner may be locked into a sequential presentation of questions. Control panels can be configured to allow the learner to move from screen to screen, play videos, launch a game, go more in-depth, review summary or detailed presentations of the same data, turn on closed captioning, etc. The controls may be fully configurable and extensible.

Scoring

Scoring methods may also be fully customizable. For example, assessments with multiple objectives or questions can provide scoring related to how well the learner performed. By way of illustration, a score may indicate how many questions were answered correctly, and how many questions were answered incorrectly; the percentage of questions that were answered correctly; a performance/rank of a learner relative to other learners. The score may be a grade score, a numerical score, or may be a pass fail score. By way of illustration a score may be in the form of "1 out of 5 correctly answered", "20% correct," "pass/fail", and/or any other definable mechanism. Such scoring can be specified on a learning object basis and/or for an entire module.

Graphing & Reporting

Certain embodiments provide for user-configurable reports (e.g., text and/or graphical reporting). For example, a designer can specify that once a learning module is completed, the results (e.g., scores or other assessments) may be displayed in a text format, as a graph in a variety of formats, or as a mixture of text and graphs. The extensibility of the LCMX system enables a designer to specify and utilize any desired presentation methodology for formatting and displaying, whether in text, graphic, animated, video, and/or audio formats.

Extensible Publishing

Extensibility of the foregoing features is provided through extended data definitions in the LCMX database. Certain embodiments may utilize specifically developed application programs to be used to publish in a corresponding format. Optionally, a rules-based generic publishing application may be utilized.

Regardless of whether a custom developed publishing application or a generic publication application is used, optionally, data may be gathered in a manner that is that appears to be the same to a designer, and the resulting learning module may have the same appearance and functionality from a learner's perspective.

Devices

Styles may be defined to meet the requirements or attributes of specific devices. The display, processing power, and other capabilities of mobile computing devices (e.g., tablet computers, cell phones, smart phones, etc.), personal computer, interactive televisions, and game consoles may vary greatly. Further, it may be desirable to publish to word processing documents, presentation documents, (e.g., Word documents, PowerPoint slide decks, PDF files, etc.) and a variety of other "device" types. Embodiments herein may provide a user interface via which a user may specify one or more output devices, and the system will access the appropriate publishing functionality/program(s) to publish a learning module in one or more formats configured to be executed/displayed on the user-specified respective one or more output devices.

Protocols

While different devices may require different publishing applications to publish a module that can be rendered by a respective device, in certain instances the same device can accept multiple different protocols as well. For example, a WINDOWS-based personal computer may be able to render and display content using SILVERLIGHT, FLASH, or HTML5 protocols. Further, certain end-users/clients may have computing environments where plug-ins/software for the various protocols may or may not be present. Therefore, even if the content is to be published to run on a "Windows-based personal computer" and to appear within a set framework and style, the content may also be generated in multiple protocols that closely resemble one another on the outside, but have entirely different code for generating that user interface.

Players

As discussed above, a learning module may be published for different devices and different protocols. Certain embodiments enable a learning module to be published for utilization with one or more specific browsers (e.g., MICROSOFT EXPLORER browser, APPLE SAFARI browser, MOZILLA FIREFOX browser, GOOGLE CHROME browser, etc.) or other media player applications (e.g., APPLE ITUNES media player, MICROSOFT media player, custom players specifically configured for the playback of learning content, etc.) on a given type of device. In addition or instead, a module may be published in a "universal" formal suitable for use with a variety of different browsers or other playback applications.

Extensible User Interface

Some or all of the extensible features discussed herein may stored in the LCMX database. In addition, user interfaces may be configured to be extensible to access other databases and other types of data formats and data extensions. This is accomplished via dynamically-generated content maintenance user interfaces, which may be defined in the LCMX database.

For example, a content maintenance user interface may include user-specified elements that are associated with or bound to respective database fields. As a result, the appropriate data can be displayed in read-only or editable formats, and the user can save new data or changes to existing data via a consistent database interface layer that powers the dynamic screens.

Content Screens

In order to provide the ability of users to define their content in an extensible format, maintenance user interfaces may be defined that enable the content to be entered, updated, located and published. These user interfaces can be general purpose in design, or specifically tasked to handle individual circumstances. Additionally, these user interfaces may vary from client (end user) to client providing them the ability to tailor the user interface to match the particular format needs of their content.

Framework User Interfaces

Frameworks may be extensible as well. Therefore, the user interfaces used to define and maintain frameworks may also be dynamically generated to allow for essentially an unlimited number of possibilities. The framework definition user interfaces provide the location for the binding of the content to the flow of the individual framework.

Style User Interfaces

Style user interfaces may be divided into the following classifications: Style Elements and the Style Set.

Style Elements define attributes such as font sets, page layout formats, page widths, control panel buttons, page element positioning, etc. These elements may be formatted individually as components, and a corresponding style user interface may enable a user to preview the attribute options displayed in a generic format. As such, each of the style elements can be swapped into or out of a Style Set as an individual object.

The Style Set may be used to bind these attributes to the specific framework. In certain embodiments, the user interface enables a user to associate or tag a given style attribute with a specified framework element, and enables the attributes to be swapped in (or out) as a group. The forgoing functionally may be performed using a dynamically generated user interface or via a specific application with drag-and-drop capabilities.

Publishing User Interfaces

Publishing user interfaces are provided that enable the user to select their content, match it with a framework, render it through a specific style set, and package it in a format suitable for a given device in a specific protocol. In short, these user interfaces provide a mechanism via which the user may combine the various extensible resources into a single package specification (or optionally into multiple specifications). This package is then passed on to the appropriate publisher software, with generates the package to meet the user specifications. Once published, the package may be distributed to the user in the appropriate medium (e.g., as a hardcopy document, a browser render-able module, a downloadable mobile device application, etc.).

Figure 2A:
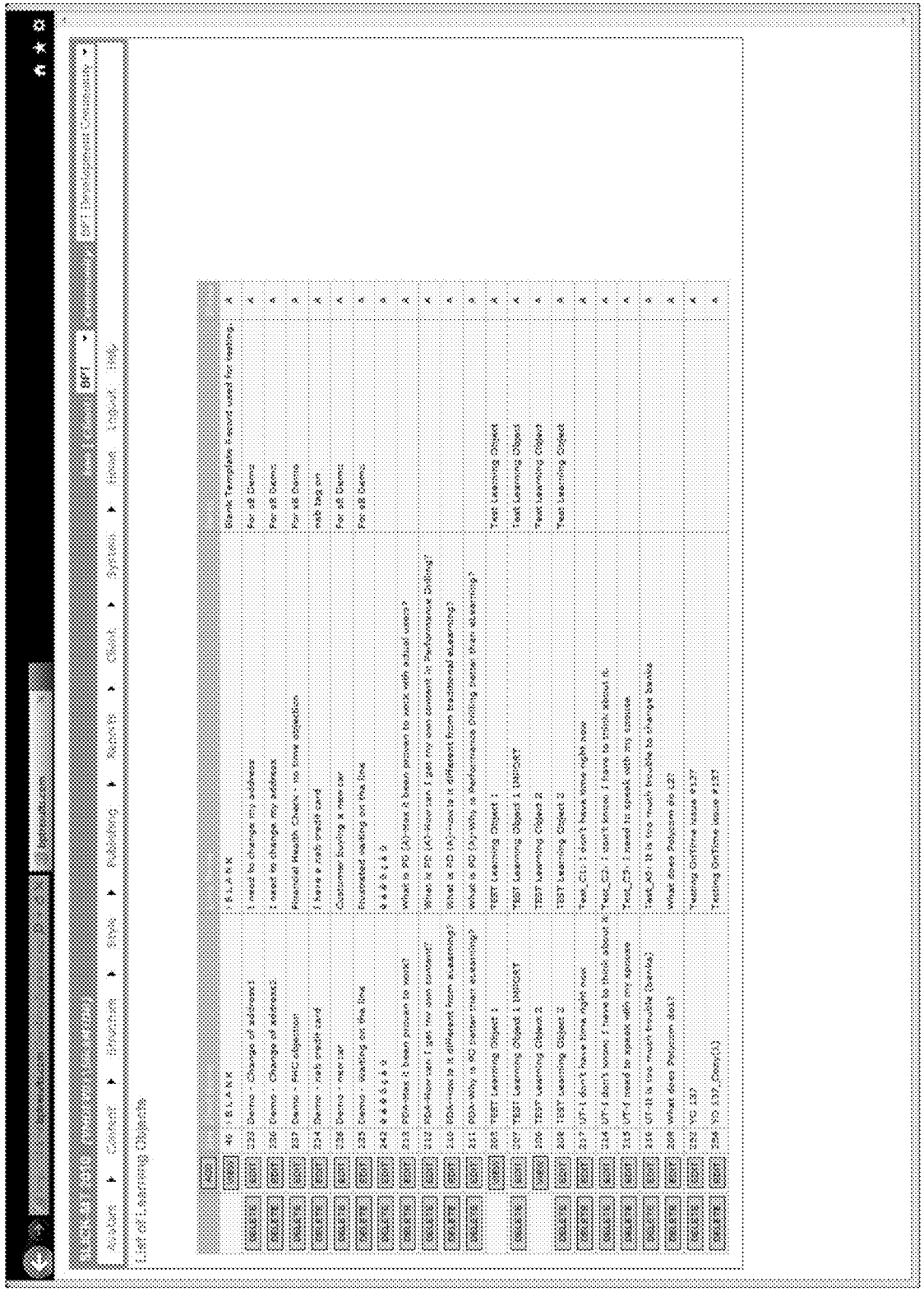
FIGS. 2A-2ZZ illustrate example user interfaces.
Figure 2A:
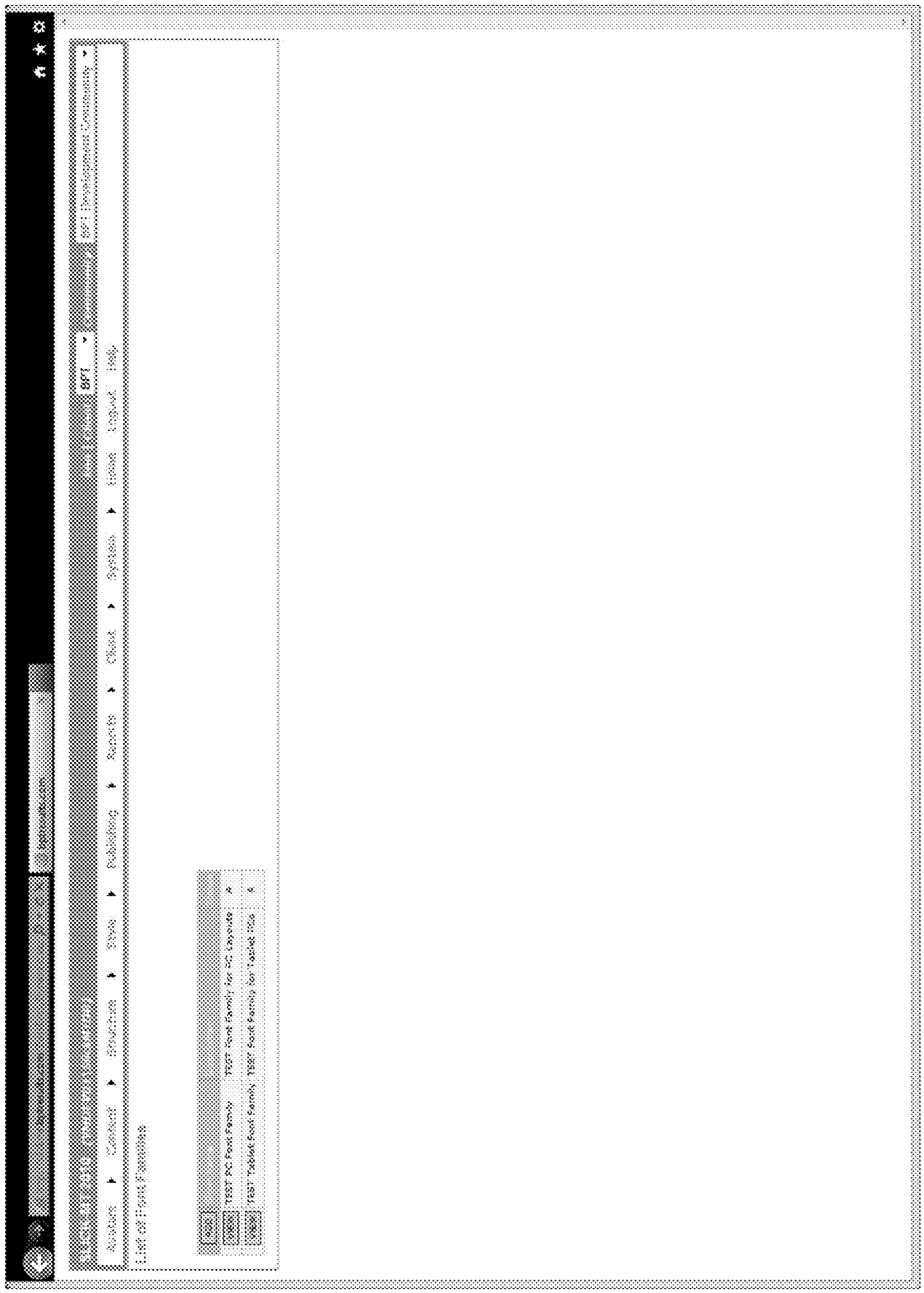

Certain example user interfaces will now be discussed in greater detail with reference to the figures. FIG. 2Y illustrates an example introduction user interface indicating the application name and the user that is logged in. FIG. 2A illustrates a user interface listing learning objects (e.g., intended to teach a learner certain information, such as how to perform certain tasks). Each object may be associated with a sequence number (e.g., a unique identifier), a short name previously specified by a user, a long name previously specified by a user (which may be more descriptive of the subject matter, content, and/or purpose of the object than the short name), a notes field (via which a user can add additional comments regarding the object), and a status field (which may indicate that the object design is not completed; that it has been completed, but not yet approved by someone whose approval is needed; that that it has been completed and approved by someone whose approval is needed; that it is active; that it is inactive; that it has been deployed, etc. In addition, an edit control is provided in association with a given learning object, which when activated, will cause an edit user interface to be displayed (see, e.g., FIG. 2B) enabling the user to edit the associated learning object. A delete control is provided in association with a given learning object, which when activated, will cause the learning object to be deleted from the list of learning objects.

Figure 2B:
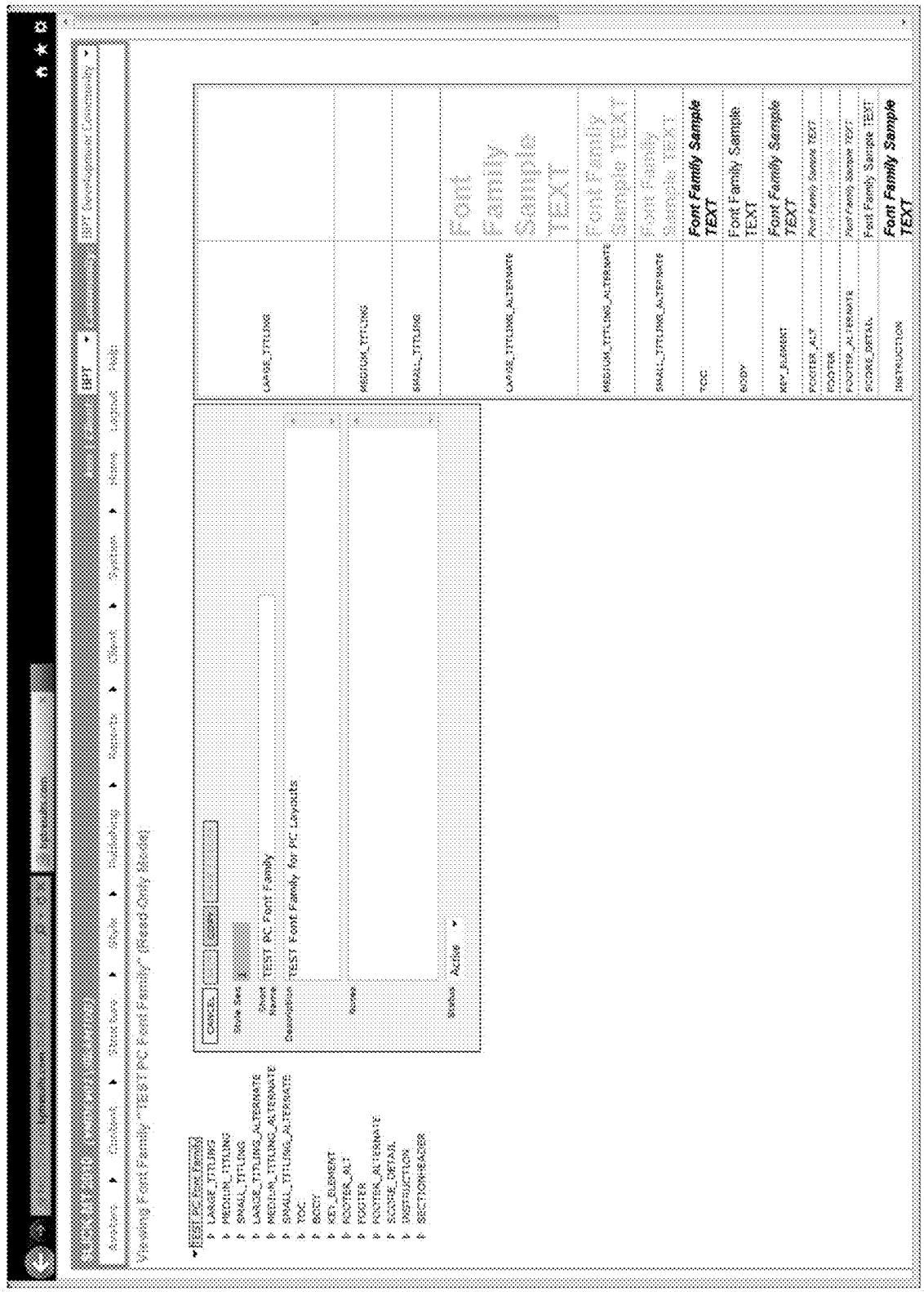

FIGS. 2B1-2B3 illustrate an example learning object edit user interface. Referring to FIG. 2B1, fields are provided via which the user may edit or change the sequence number, the short name, the long name, the notes, the status, the title, a sub-title, substantive content included in the learning object (e.g., challenge text, text corresponding to a response to the challenge), etc. A full functioned word processor (e.g., with spell checking, text formatting, font selection, drawing features, HTML output, preview functions, etc.) may be provided to edit some or all of the fields discuss above. Optionally, the user may save the changes to the learning object file. Optionally, the user may edit an object in a read-only mode, wherein the user cannot save the changes to the same learning object file, but can save the changes to another learning object file (e.g., with a different file name).

Referring to FIG. 2B2, fields are provided via which a user can enter or edit additional substantive text (e.g., key elements the learner is to learn) and indicate on which line the substantive text is to be rendered. A control is provided via which the user can change the avatar behavior (e.g., automatic). Additional fields are provided via which the user can specify or change the specification of one or more pieces of multimedia content (e.g., videos), that are included or are to be included in the learning object. The user interface may display a variety of types of information regarding the multimedia content, such as an indication as to whether the content item is auto generated, the media type (e.g. video, video format; audio, audio format; animation, animation format; image, image format, etc.), upload file name, catalog file name, description of the content, who uploaded the content, the date the content was uploaded, audio text, etc. In addition, an image associated with the content (e.g., a first frame or a previously selected frame/image) may be displayed as well.

Referring to FIG. 2B3, additional fields are depicted that provide editable data. A listing of automatic avatars is displayed (e.g. whose lips/head motions are automatically synchronized with an audio track). A given avatar listing may include an avatar image, a role played by the avatar, a name assigned to an avatar, an animation status (e.g., of the animation, such the audio file associated with the avatar, the avatar motion, the avatar scene), a status indicating with the avatar is active, inactive, etc.). A view control is presented, which if activated, causes the example avatar view interface illustrated in FIG. 2C to be displayed via which the user may view additional avatar-related data. In addition to or instead of view controls, edit controls may be presented, which, when activated would cause the user interface of FIG. 2C to be displayed as well, but with some or all of the fields being user editable. This is similarly the case with other user interfaces described herein.

Figure 2C:
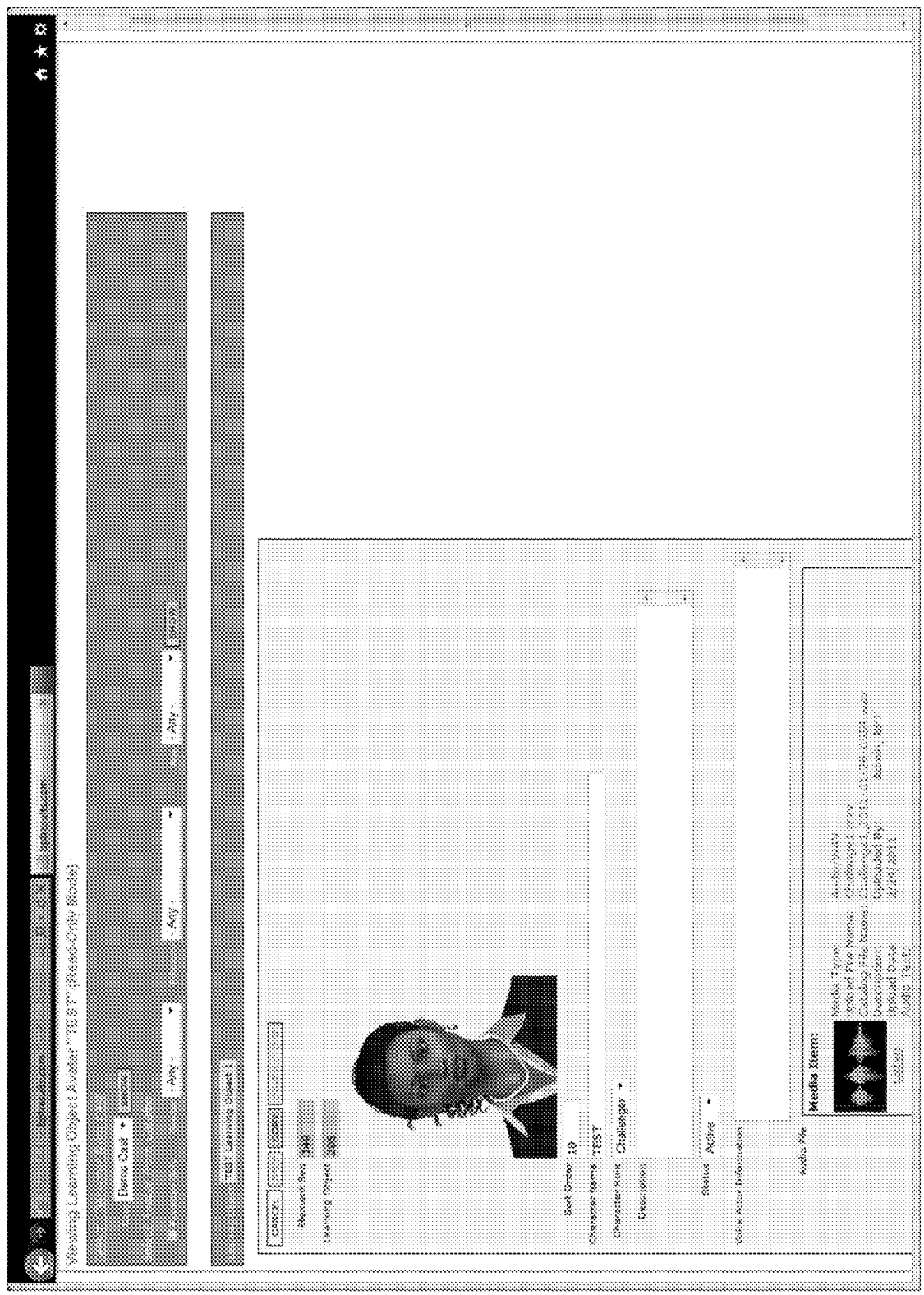
Figure 2C:
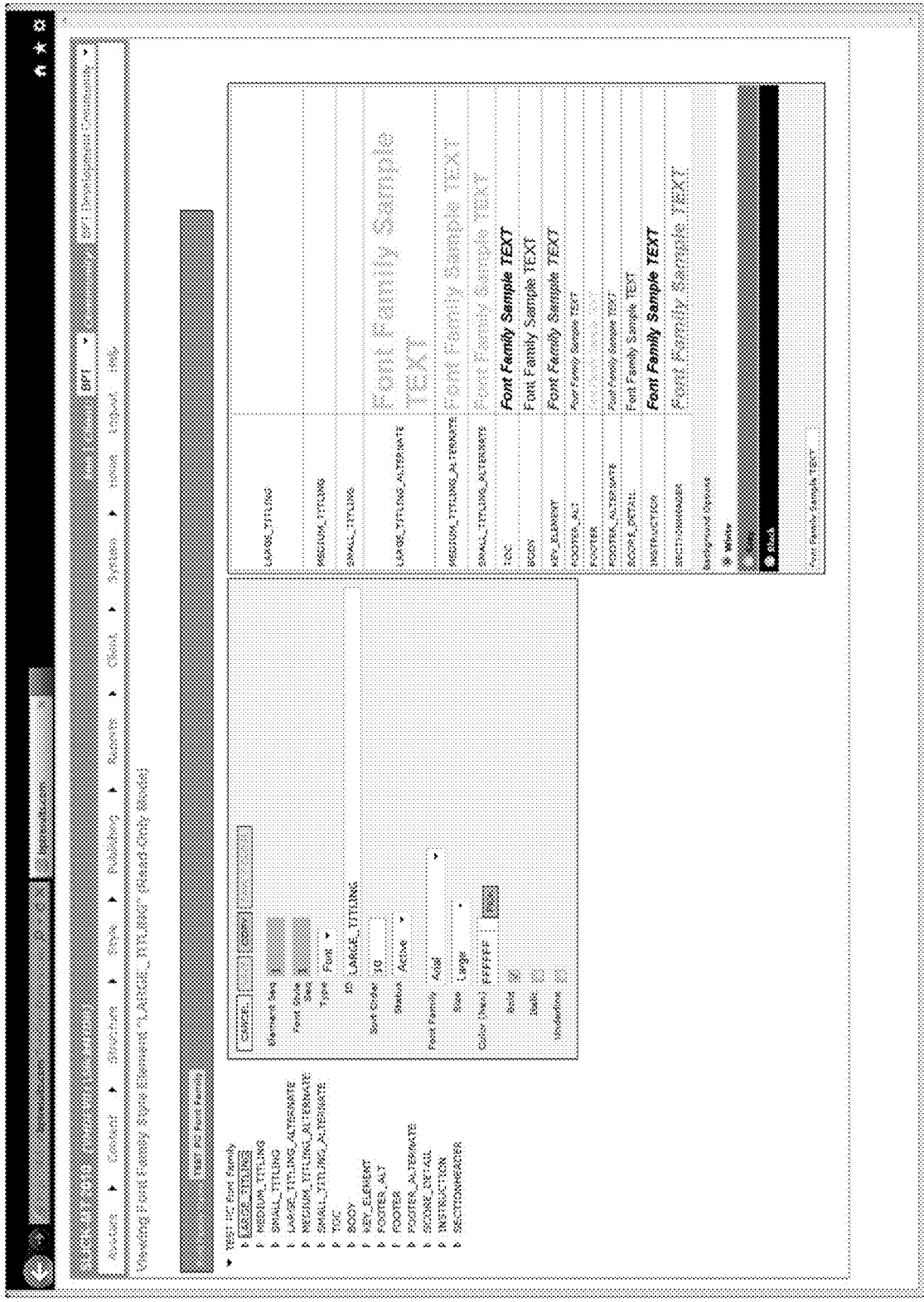

Referring to FIG. 2C, an interface for an avatar learning object is illustrated. A user can select a cast of avatar from an avatar cast via a "cast" menu, or the user can select an avatar from a catalog of avatars. The user can search for avatar types by specifying a desired gender, ethnicity, and/or age. The user interface displays an element sequence number and a learning object identifier. In addition, an image of the avatar is displayed (including the face and articles of clothing being worn by the avatar), an associated sort order, character name, character role (which may be changed/selected via a drop-down menu listing one or more roles), a textual description, information regarding the voice actor used to provide the avatar voice, an associated audio file and related information (e.g., audio, audio format; upload file name, catalog file name, description of the content, who uploaded the content, the date the content was uploaded, audio text, an image of the voice recording, etc.)

Figure 2D:
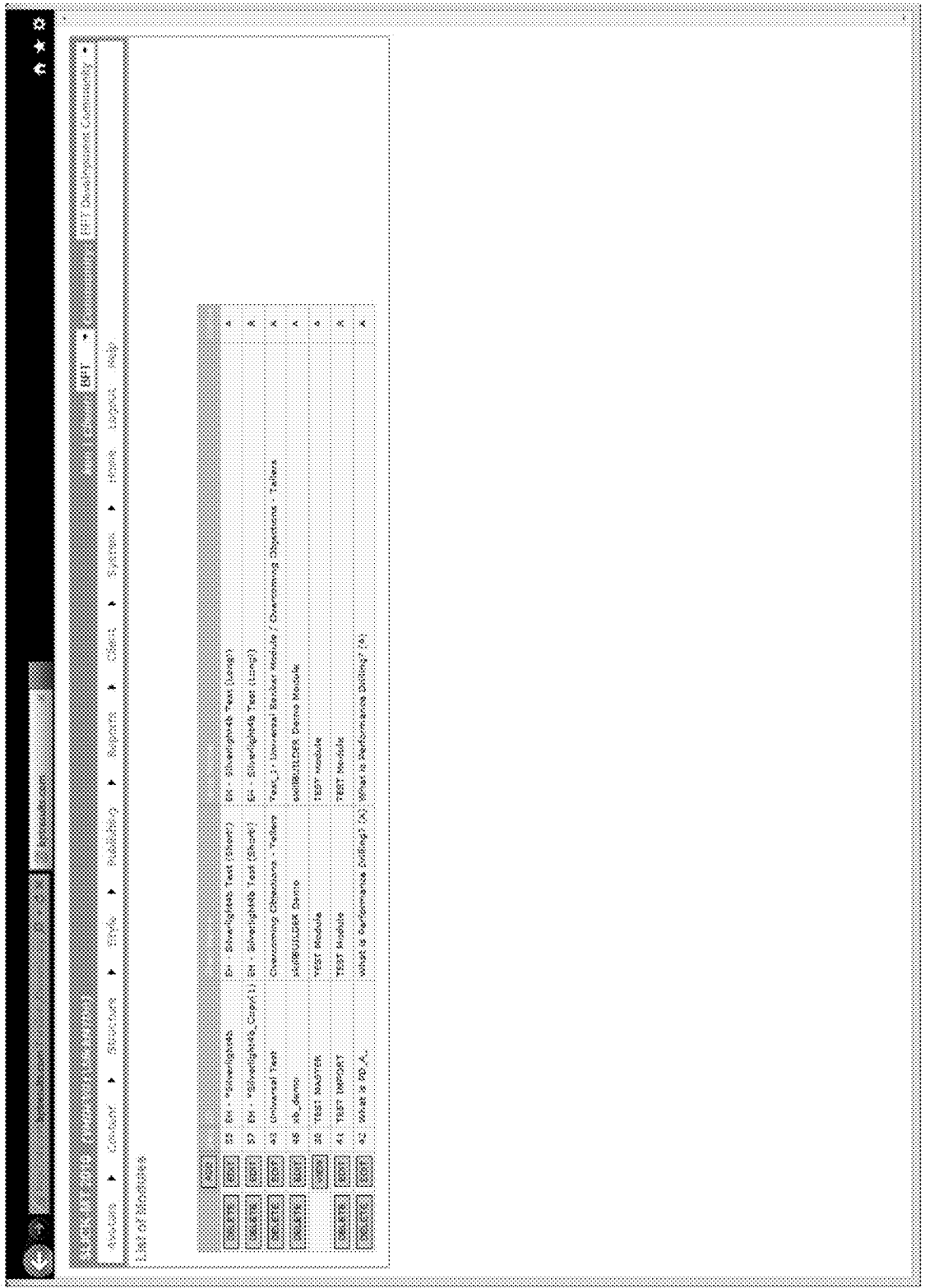
Figure 2D:
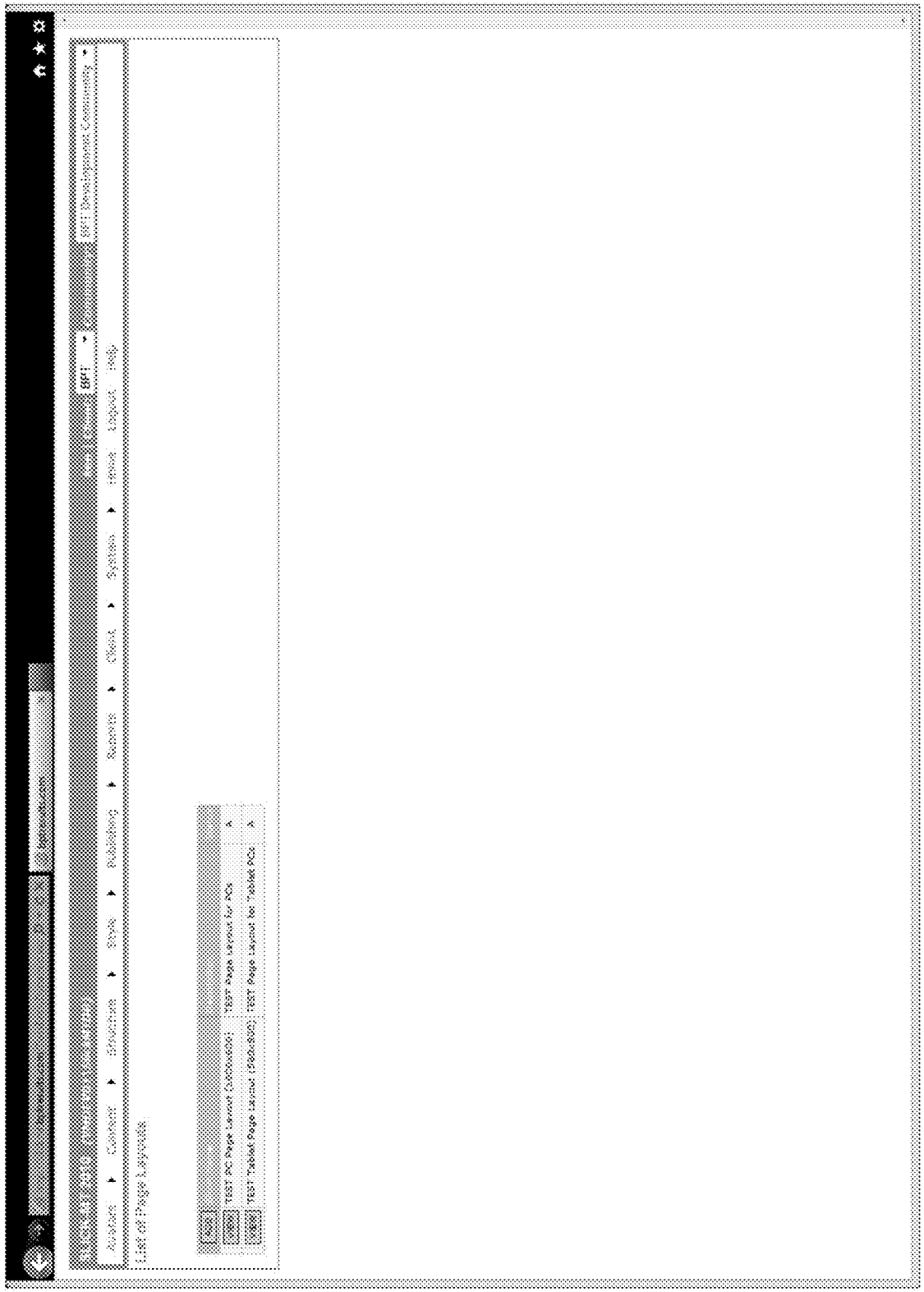

FIG. 2D illustrates an example user interface listing a variety of learning modules, including associated sequence numbers, module identifiers, short names, long names, and associated status, as similarly discussed above with respect to FIG. 2A. Edit and delete controls are provided enabling the editing or deletion of a given module. If the edit control is activated, the example module edit user interface illustrated in FIGS. 2E1-2E2 are displayed.

Figure 2E:
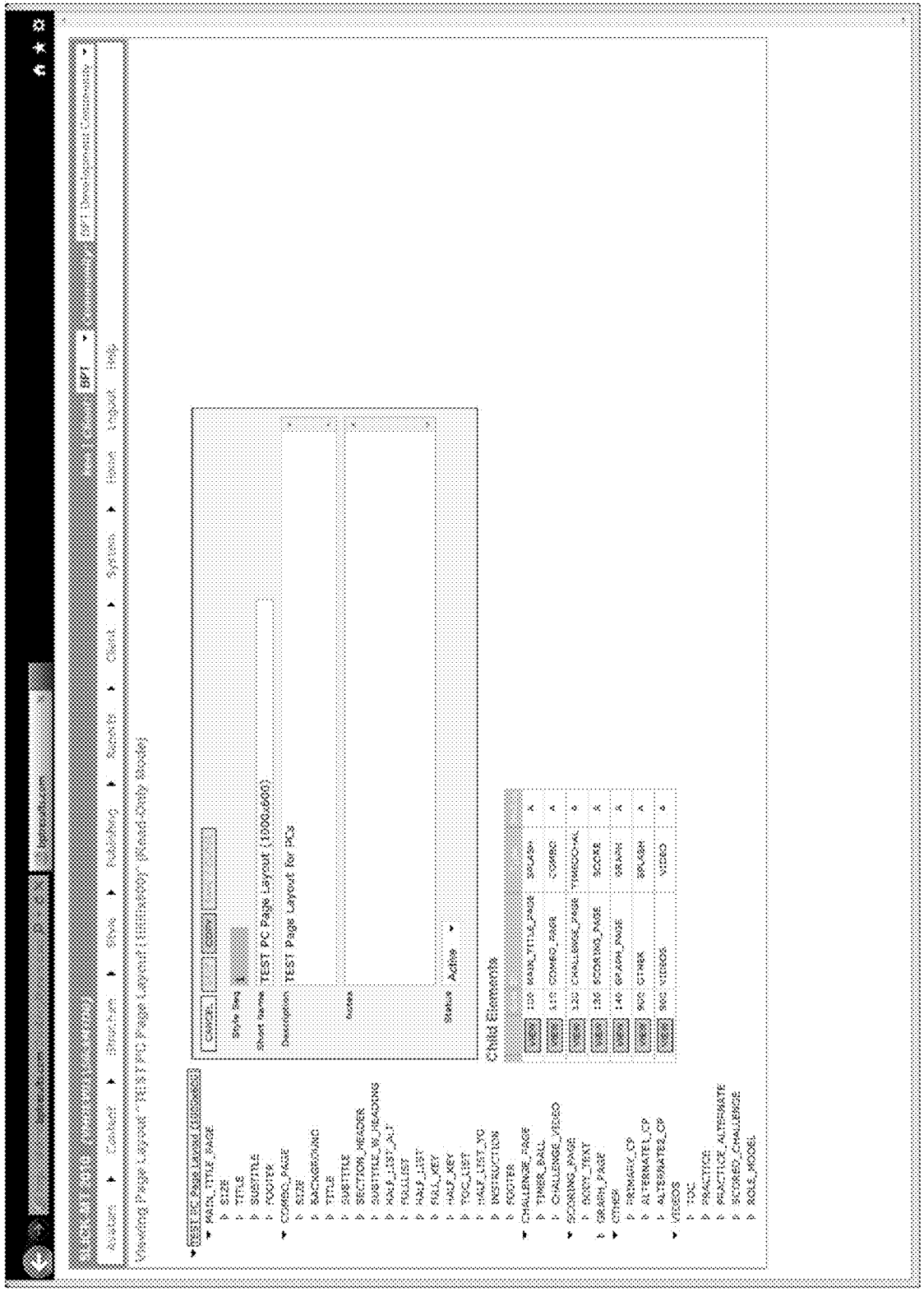

Referring the example module edit user interface illustrated in to FIGS. 2E1-2E2, editable fields are provided for the following: module sequence, module ID, module short name, module long name, notice, status, module title, module subtitle, module footer (e.g., text which is to be displayed as a footer in each module user interface), review page header (e.g., text which is to be displayed as a header in a review page user interface), a test/exercise user interface header, a module end message (to be displayed to the learner upon completion of the module), and an indication whether the module is to be presented non-randomly or randomly.

A listing of child elements, such as learning objects, are provided for display. For example, a child element listing may include a sort number, a type (e.g., a learning object, a page, etc.), a tag (which may be used to identify the purpose of the child) an image of an avatar playing a first role (e.g., an avatar presenting a challenge to a responder, such as a question or an indication that the challenger is not interested in a service or good of the responder), an image of an avatar playing a second role (e.g., an avatar responding to the first avatar), notes (e.g., name, audio, motion, scene, video information for the first avatar and for the second avatar), status, etc. A given child element listing may include an associated delete, view, or edit control, as appropriate. For example, if a view control is activated for a page child element, the example user interface of FIG. 2F may be provided for display. As described below, in addition to a utilizing a view or edit control, a hierarchical menu may be used to select an item.

A hierarchical menu is displayed on the left hand side of the user interface, listing the module name, various components included in the module, and various elements within the components. A user can navigate to one of the listed items by clicking on the item and the respective selection may be viewed or edited (as is similarly the case with other example hierarchical menus discussed herein). The user can collapse or expand the menu or portions thereof by clicking on an associated arrowhead (as is similarly the case with other example hierarchical menus discussed herein).

Figure 2F:
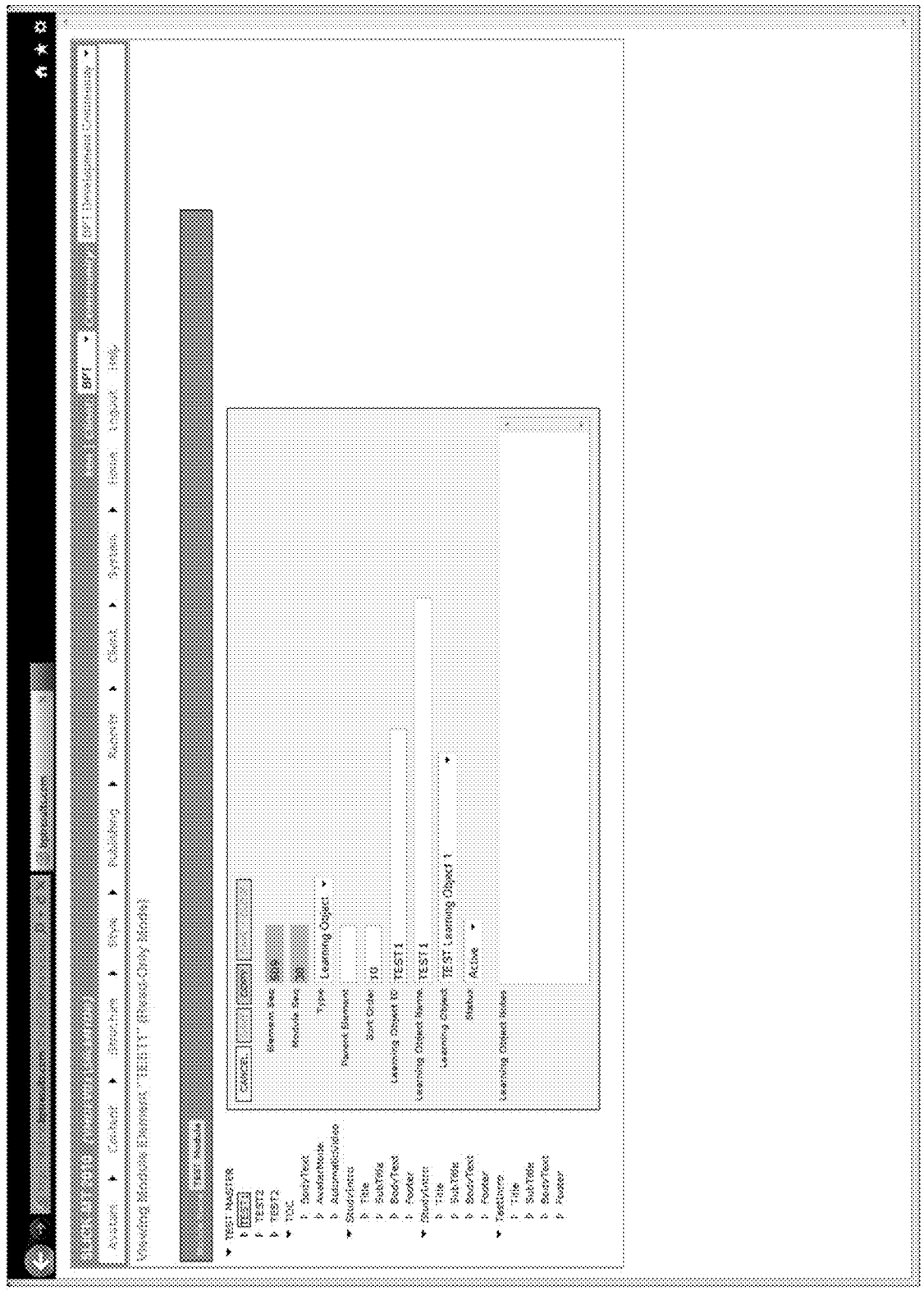
Figure 2F:
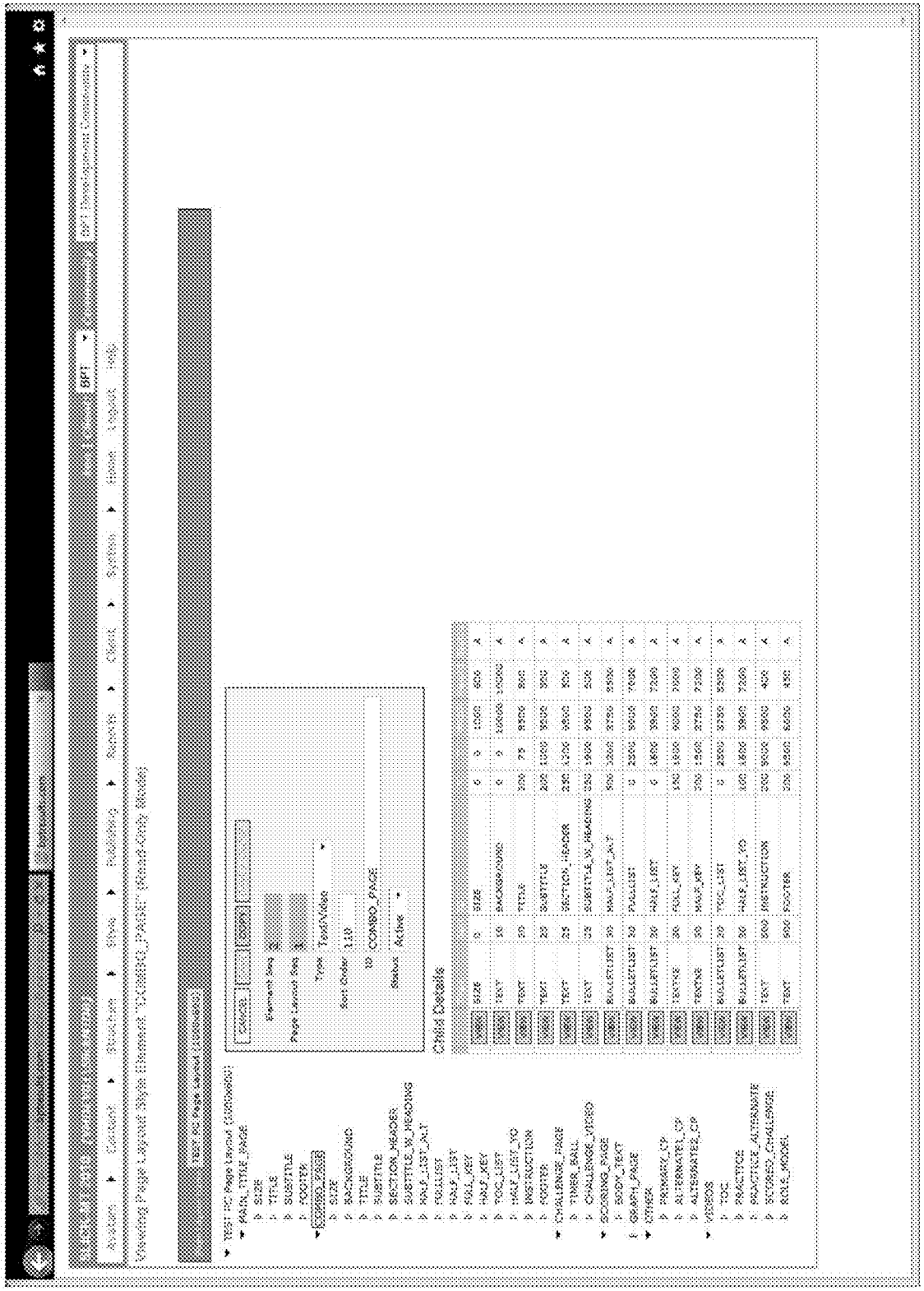

Referring to the child element viewing user interface illustrated in FIG. 2F, editable fields are provided for the following: element sequence, module sequence, type (e.g., learning object), parent element, sort order, learning object ID, learning object name, learning object status, and learning object notes. A hierarchal menu is presented on the left side of the user interface listing learning objects as defined in the module. A user can navigate to one of the listed items by clicking on the item and the respective selection may be viewed or edited. The hierarchal menu may highlight (e.g., via a box, color, animation, icon, or otherwise) a currently selected item.

Figure 2G:
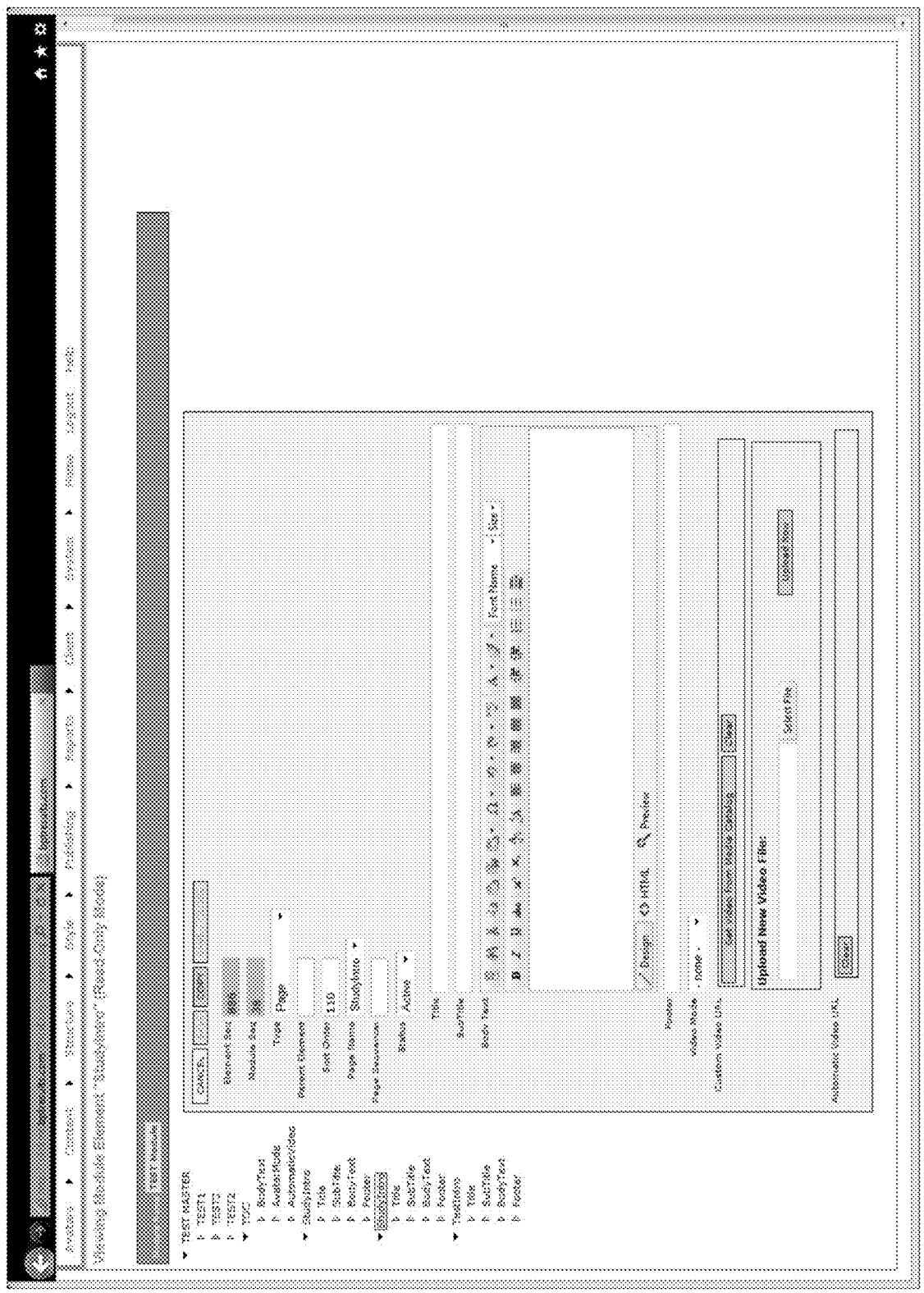
Figure 2G:
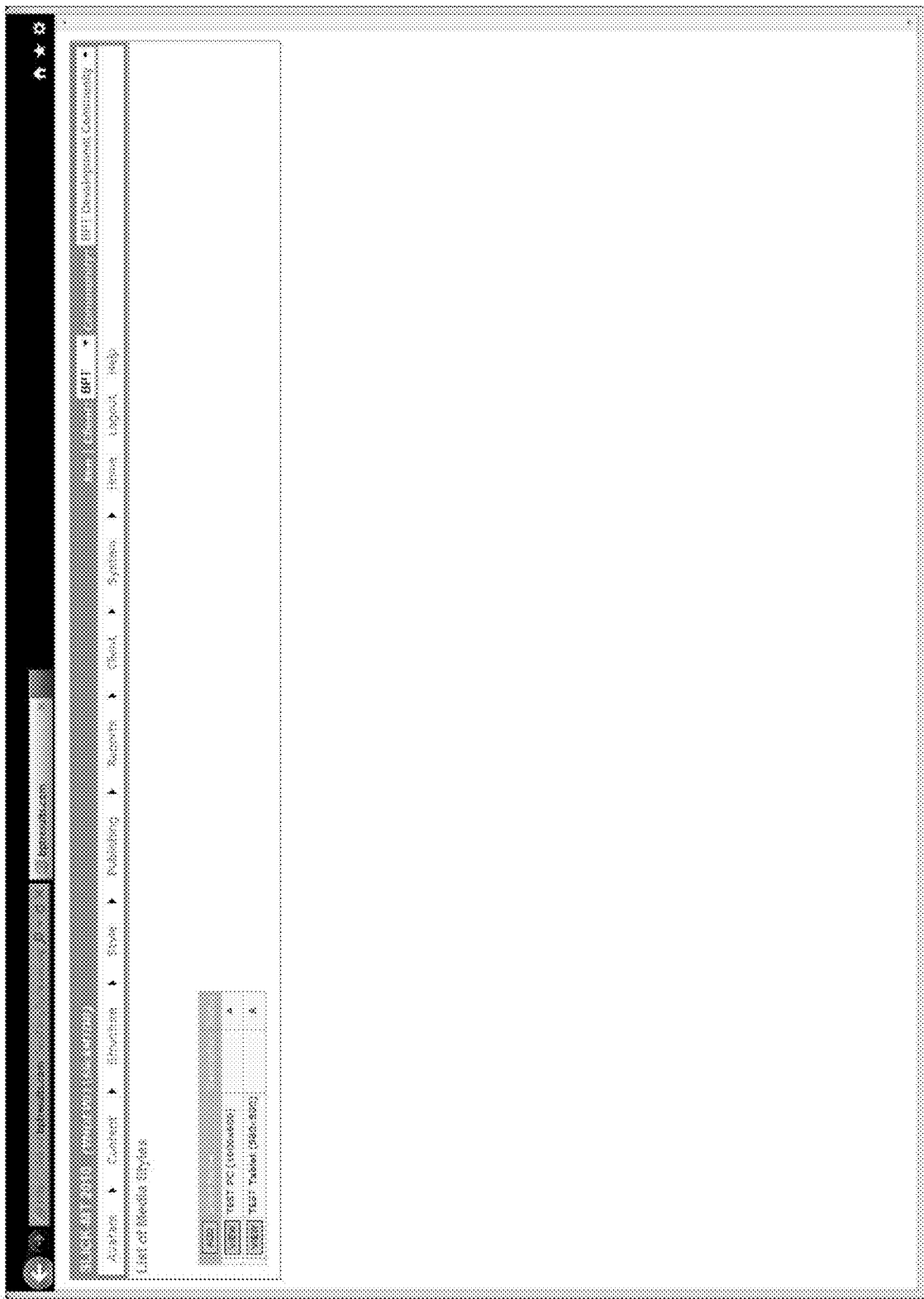

FIG. 2G illustrates an example module element edit user interface. Editable fields are provided for the following: element sequence, module sequence, type (e.g., learning object), parent element, sort order, page name, page sequence, title, subtitle, body text, footer, video mode, custom URL or other locator used to access video from media catalog, and automatic video URL. A hierarchical menu is displayed on the left hand side of the user interface, listing learning modules (e.g., Test1, Test2, .etc), pages (e.g., StudyIntro), and page elements (e.g., title, subtitle, body text, footer, etc.). The hierarchal menu may highlight the module element being viewed.

Figure 2H:
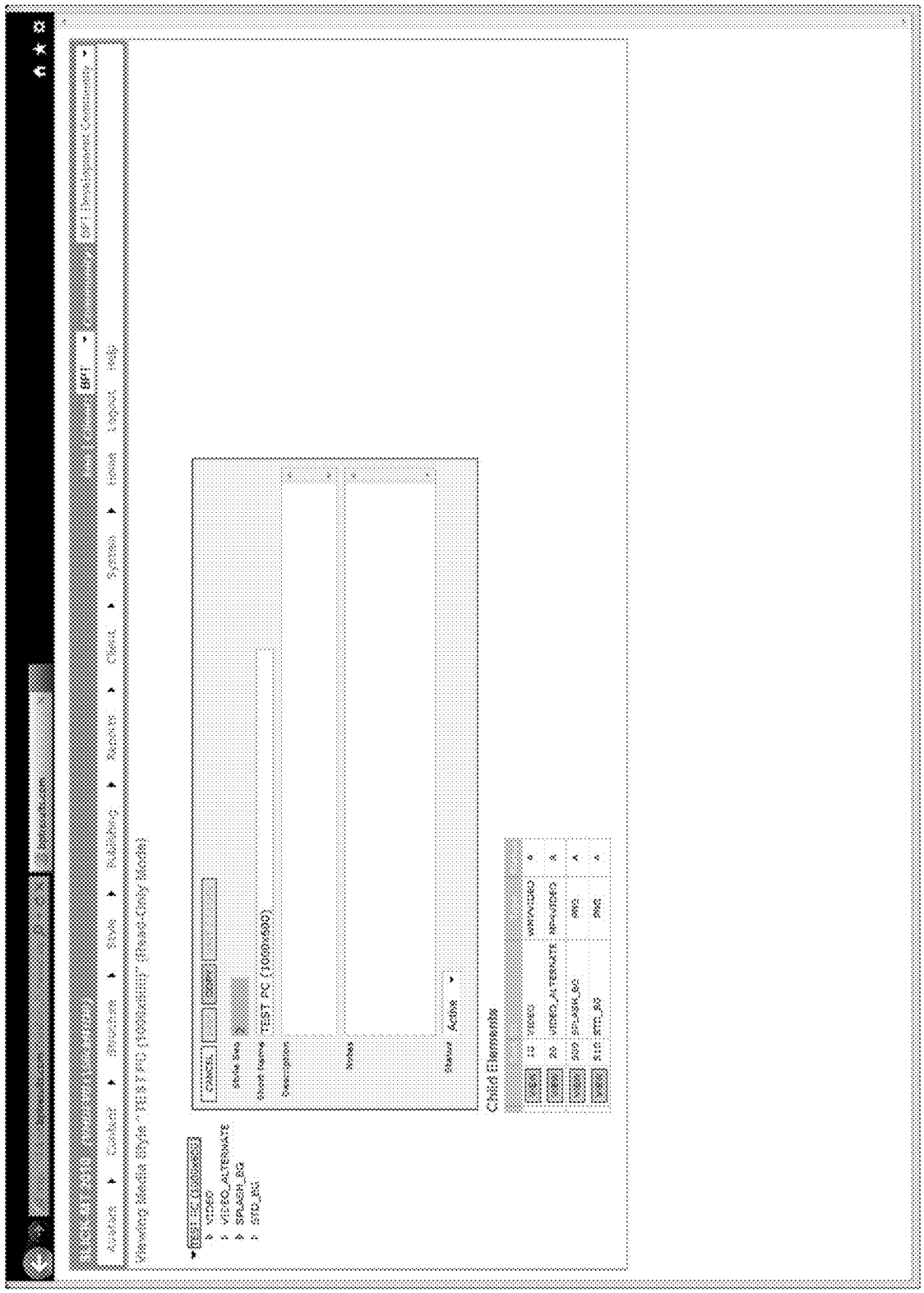

FIG. 2H1 illustrates a first user interface of a preview of content, such as of an example module. Fields are provided which display the module name, the framework being used, and the output style (which, for example, may specify the output device, the display resolution, etc.) for the rendered module. FIG. 2H2 illustrates a preview of a first user interface of the module. In this example, the module text is displayed on the left hand side of the user interface, a video included in the first user interface is also displayed. As similarly discussed with respect to FIG. 2H1, fields are provided which display the module name, the framework being used, and the output style for the rendered module. A hierarchical navigation menu is displayed on the right side.

Figure 2I:
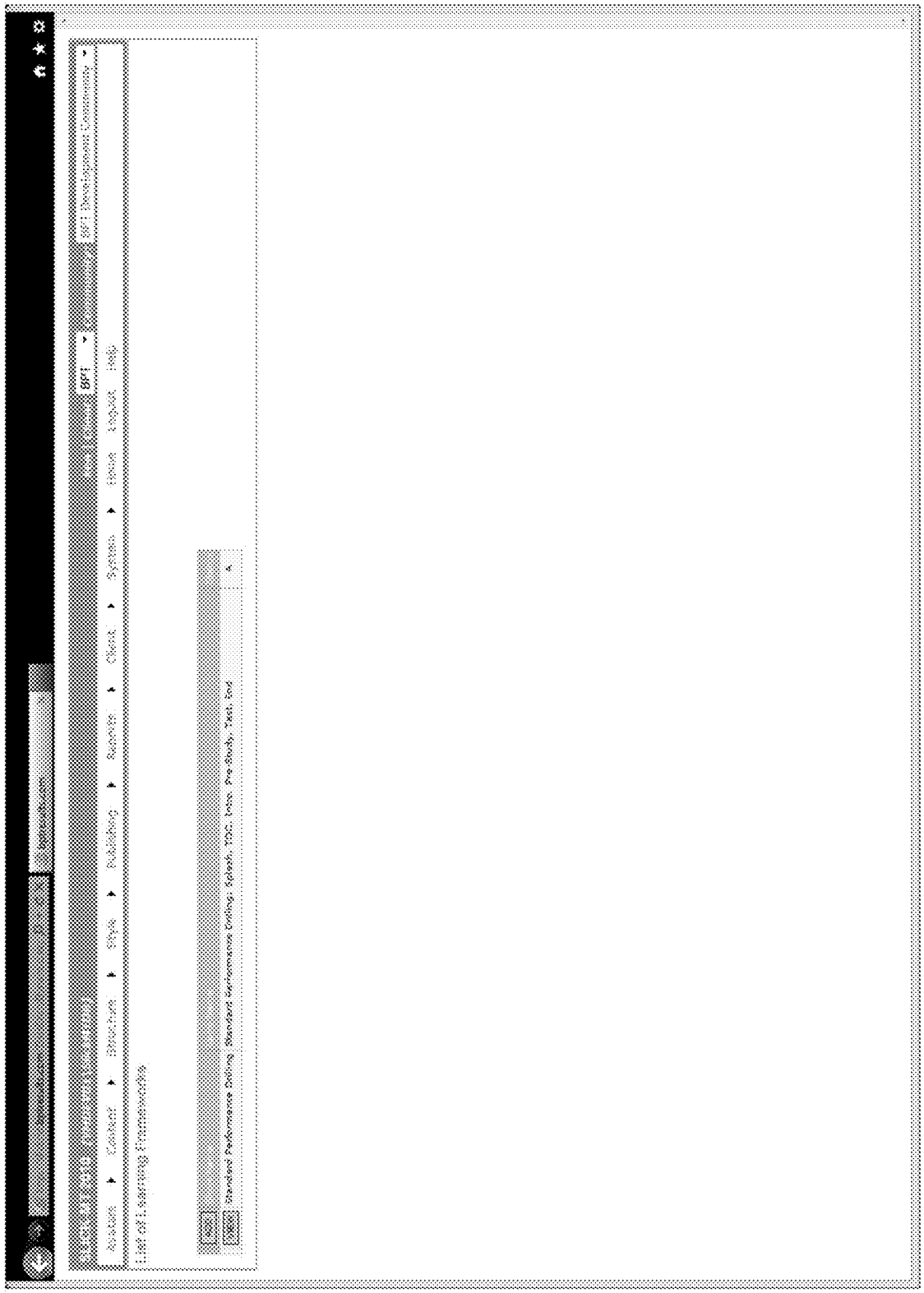
Figure 21I:
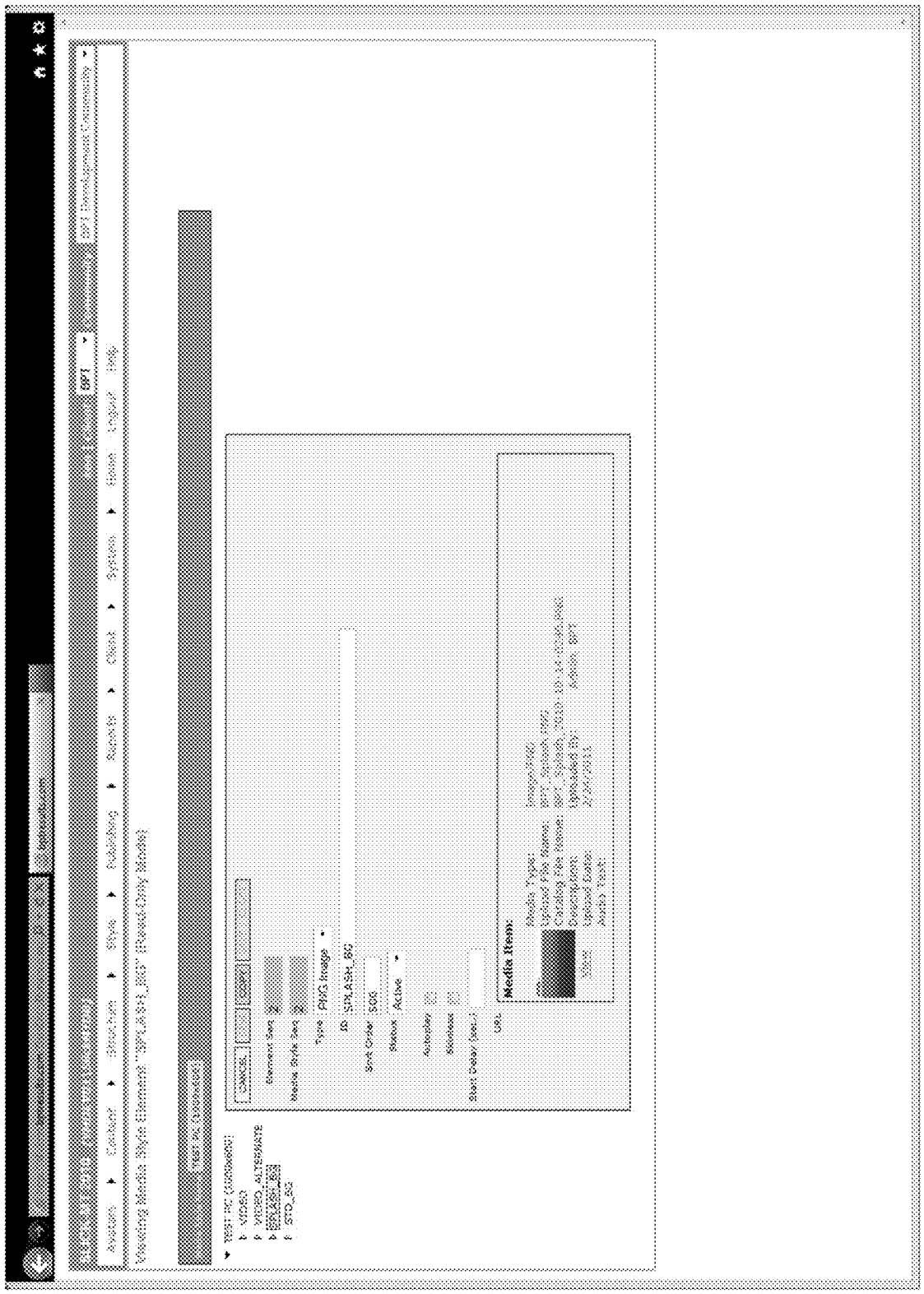
Figure 2J:
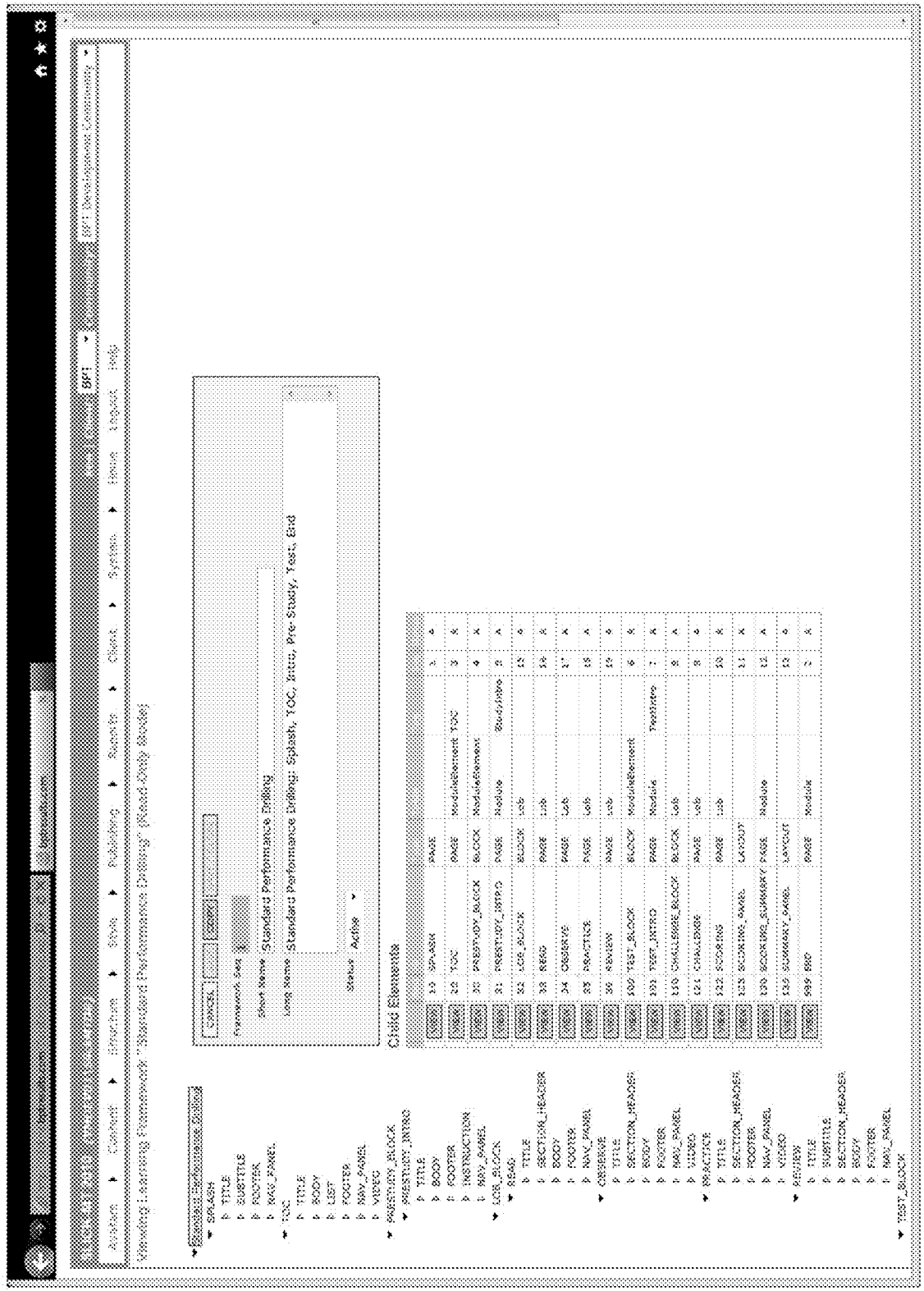
Figure 2J:
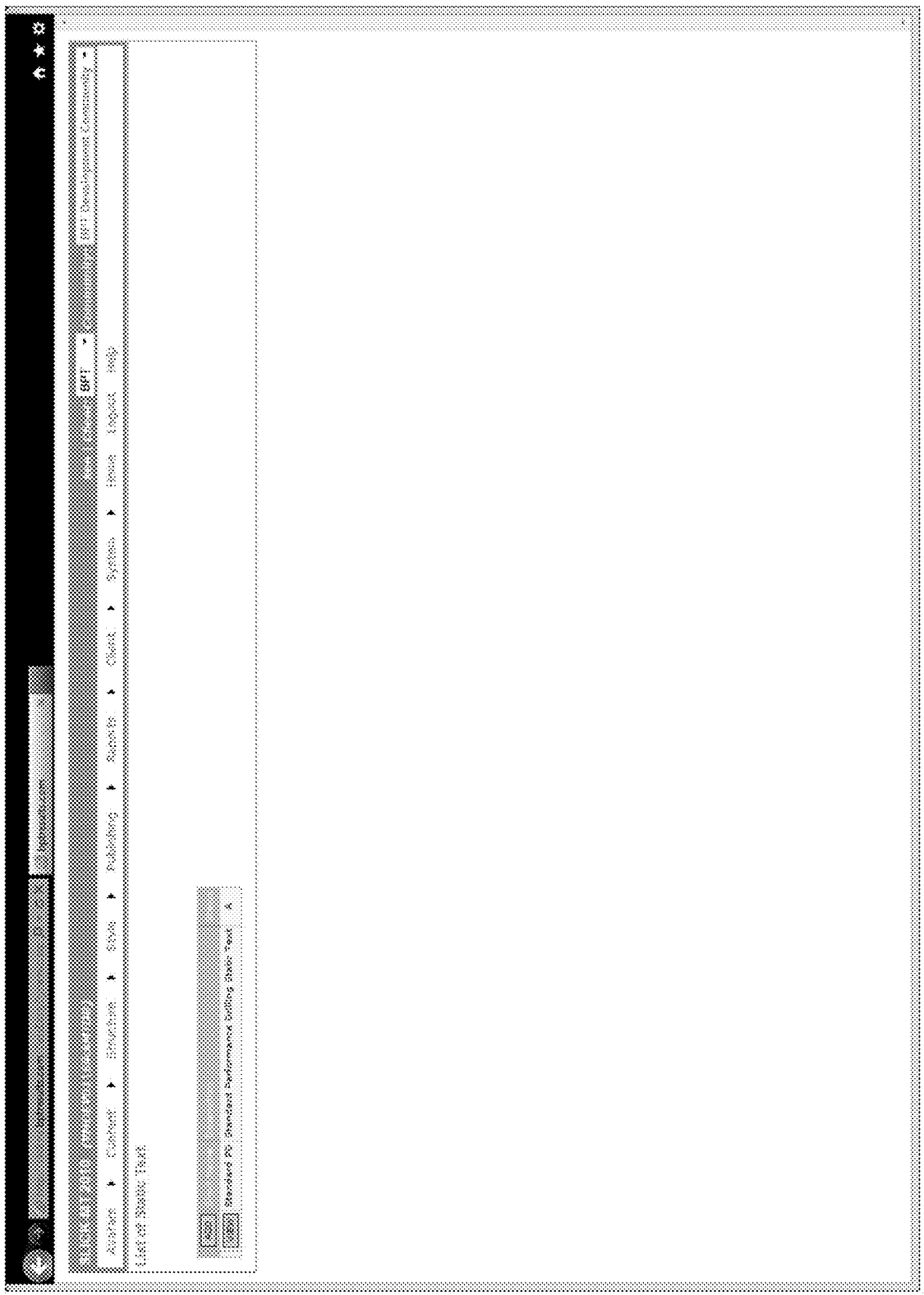

FIG. 2I illustrates an example listing of available frameworks, including the associated short name, long name, and status. A view control is provided which, when activated, causes the example user interface of FIG. 2J to be displayed. Referring to FIG. 2J, the example learning framework is displayed. Editable fields are provided for the following: framework sequence, short name, long name, status, and a listing of child elements. The listing of child elements includes the following information for a given child element: sort number, ID, type (e.g., page, block, layout, etc.), table (e.g., module element, learning object, module, etc.), and status. A hierarchical menu is displayed on the left hand side of the user interface, listing framework elements, such as pages, and sub-elements, such as introductions, learning objects, etc.

Figure 2K:
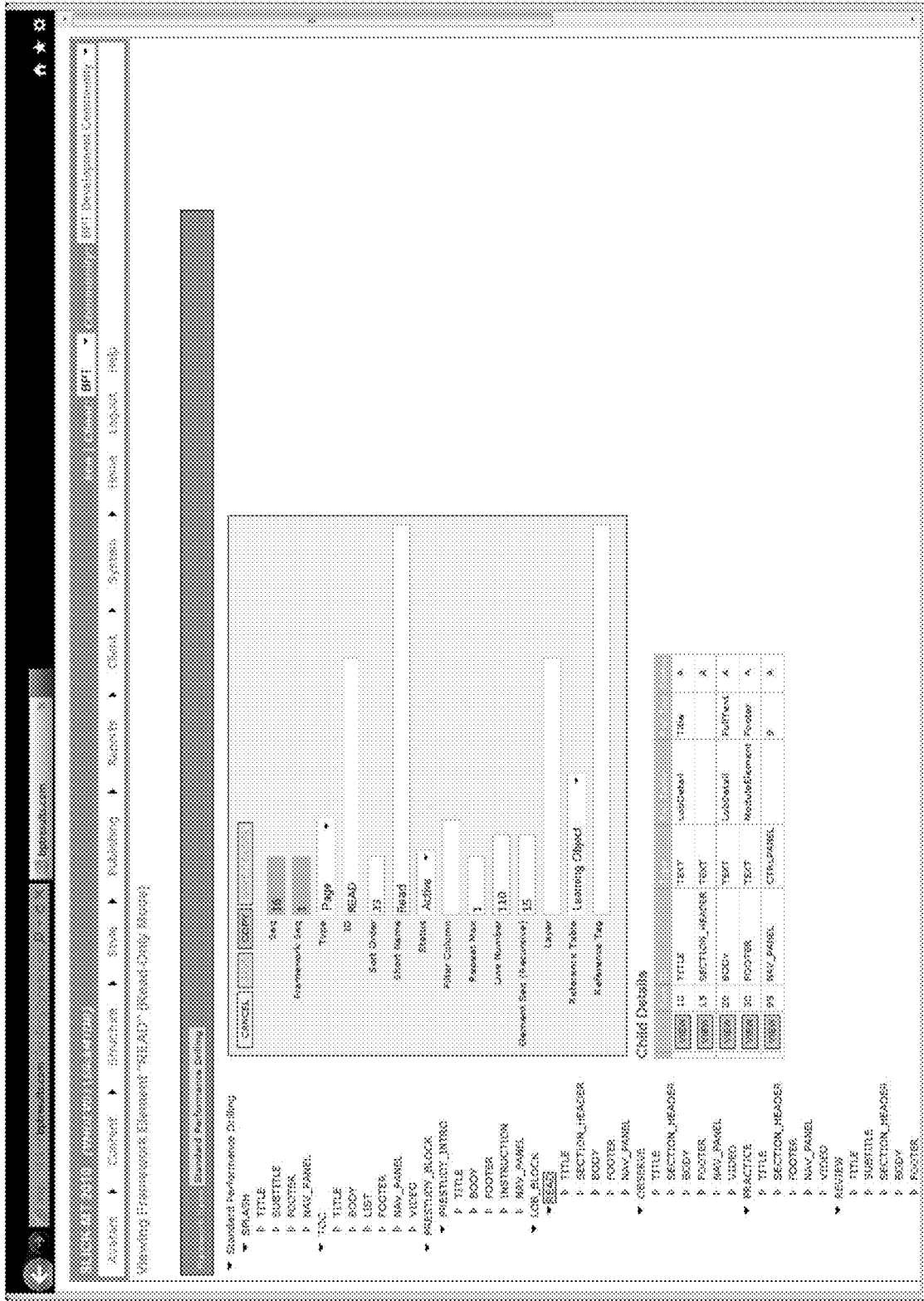
Figure 2K:
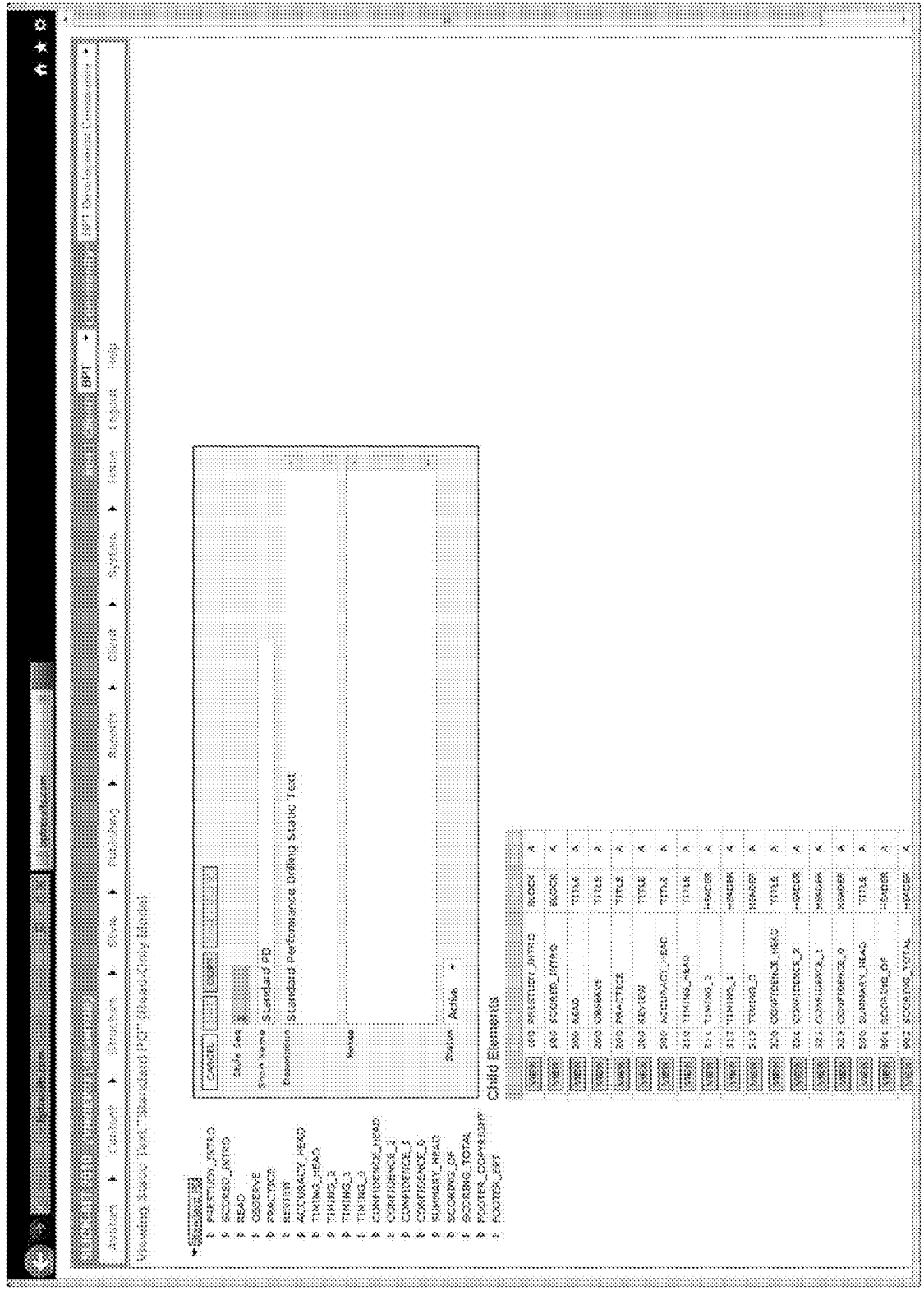
Figure 2L:
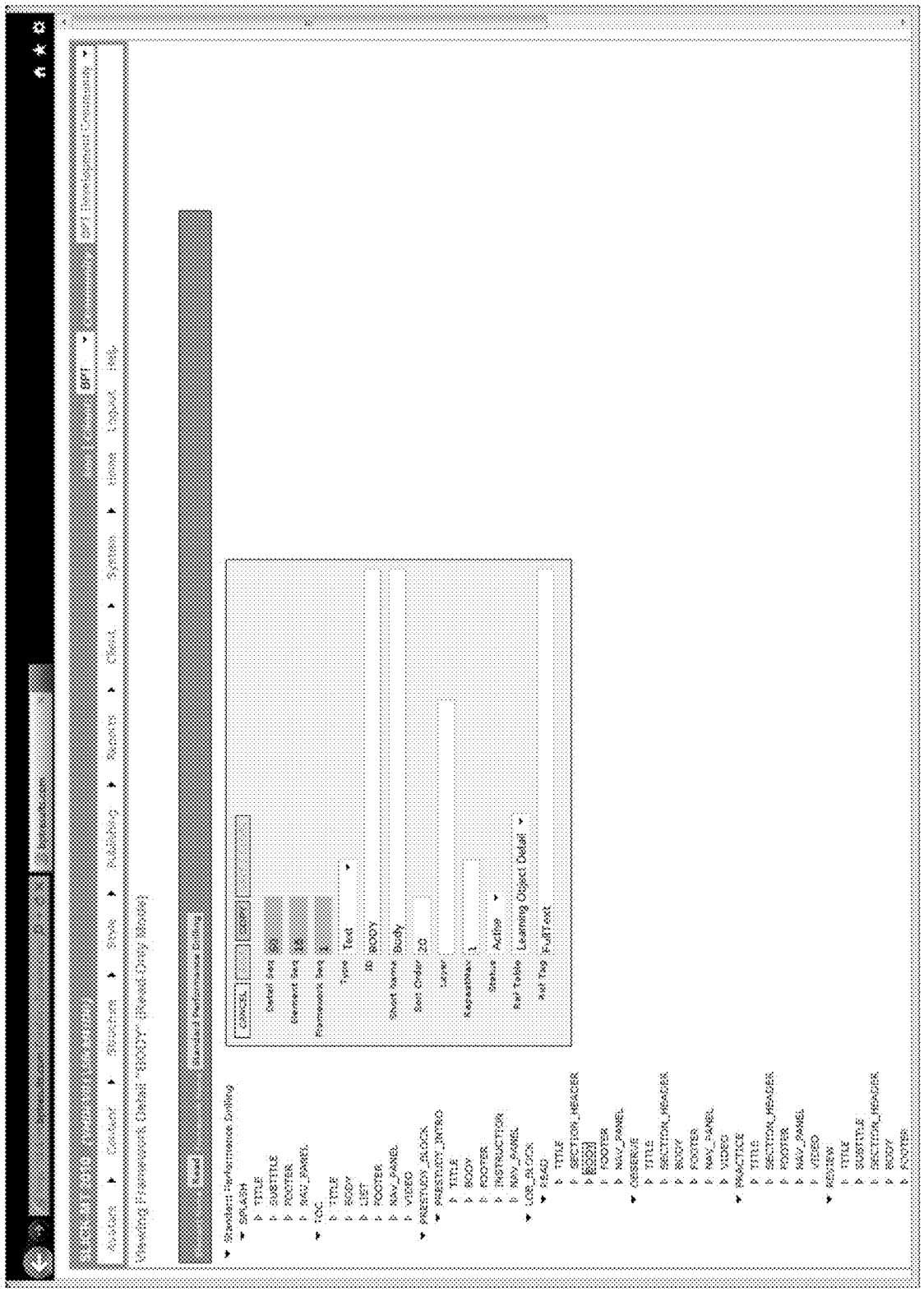
Figure 2L:
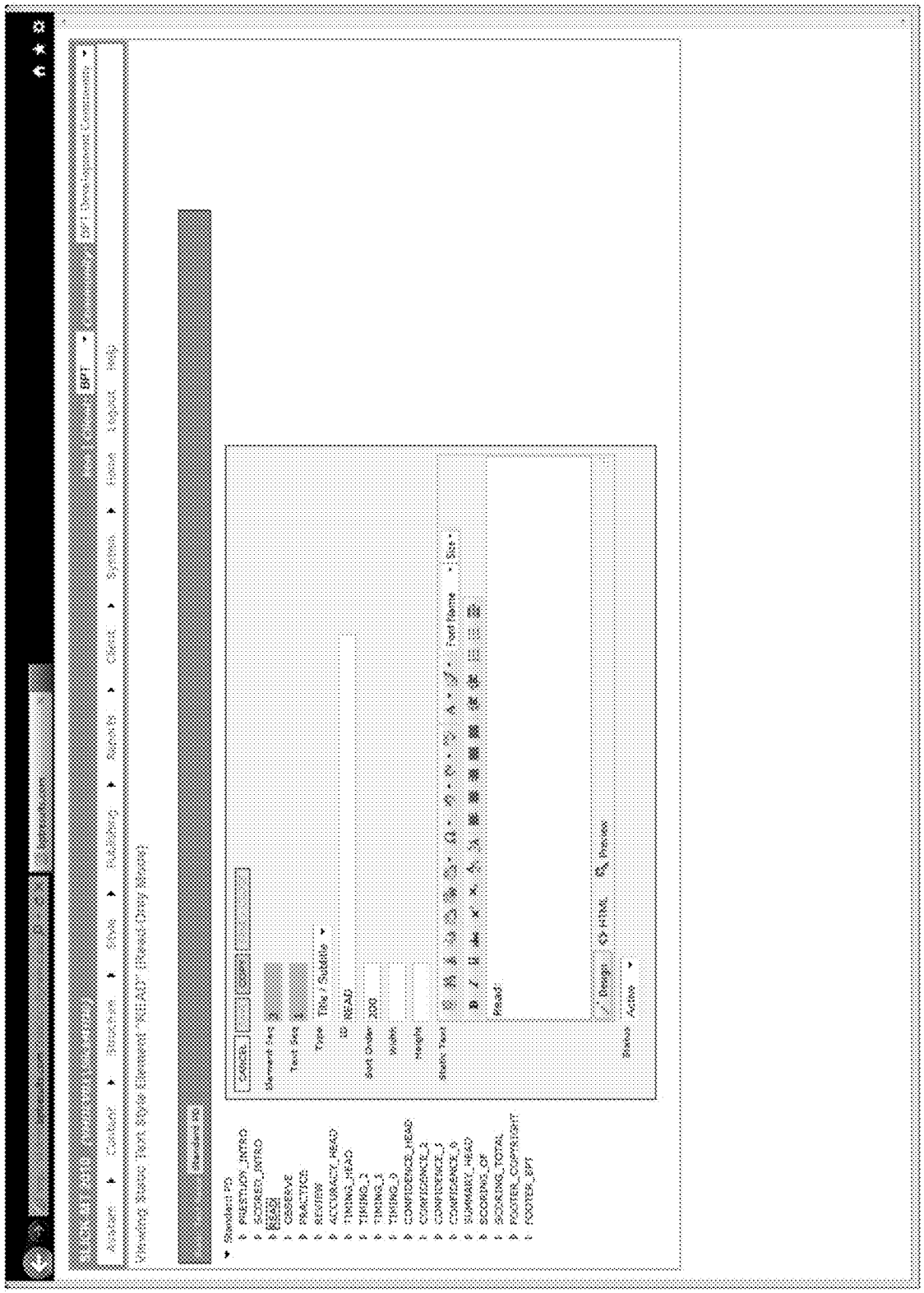

FIG. 2K illustrates another example framework. Editable fields are provided for the following: sequence, framework sequence, type, ID (which corresponds to a selected framework element listed in the hierarchical menu on the left side of the user interface (read in this example)), short name, long name, status, filter column, repeat max, line number, element sequence (recursive), layer, reference tag, and a listing of child details. The child details listing includes the following information for a given child: sort number, ID, type (e.g., text, control panel, etc.), reference table, reference tag, and status. A view control is provided in association with a respective child, which if activated, causes a user interface, such as the example user interface illustrated in FIG. 2L, to be presented. FIG. 2L illustrates the framework for the element "body". Editable fields are provided for the following: detail sequence, element sequence, framework sequence, type, ID (which corresponds to a selected framework element listed in the hierarchical menu on the left side of the user interface, "body" in this example), short name, sort order, layer, repeat max, status, reference table, and reference tag.

Figure 2M:
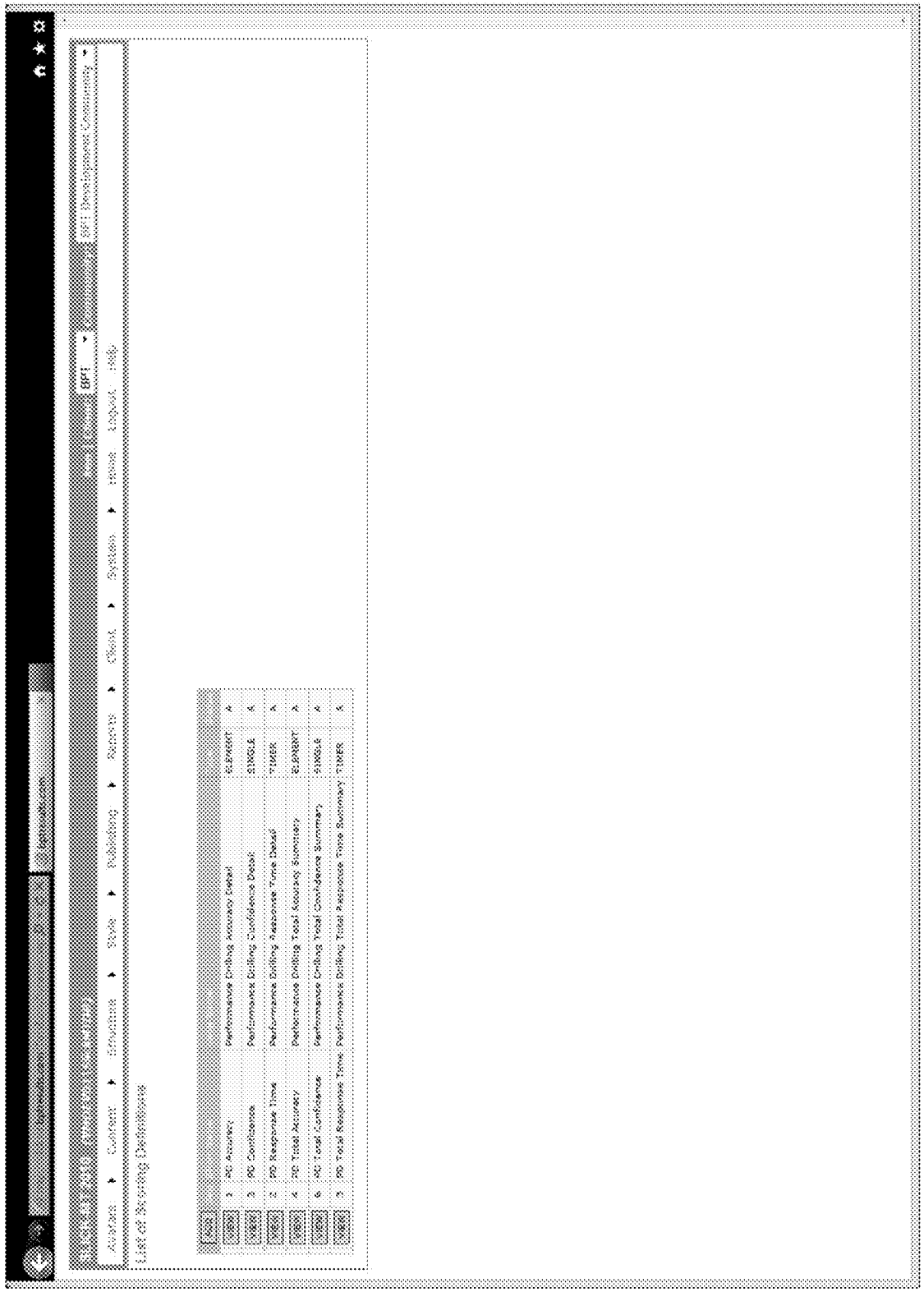
Figure 2M:
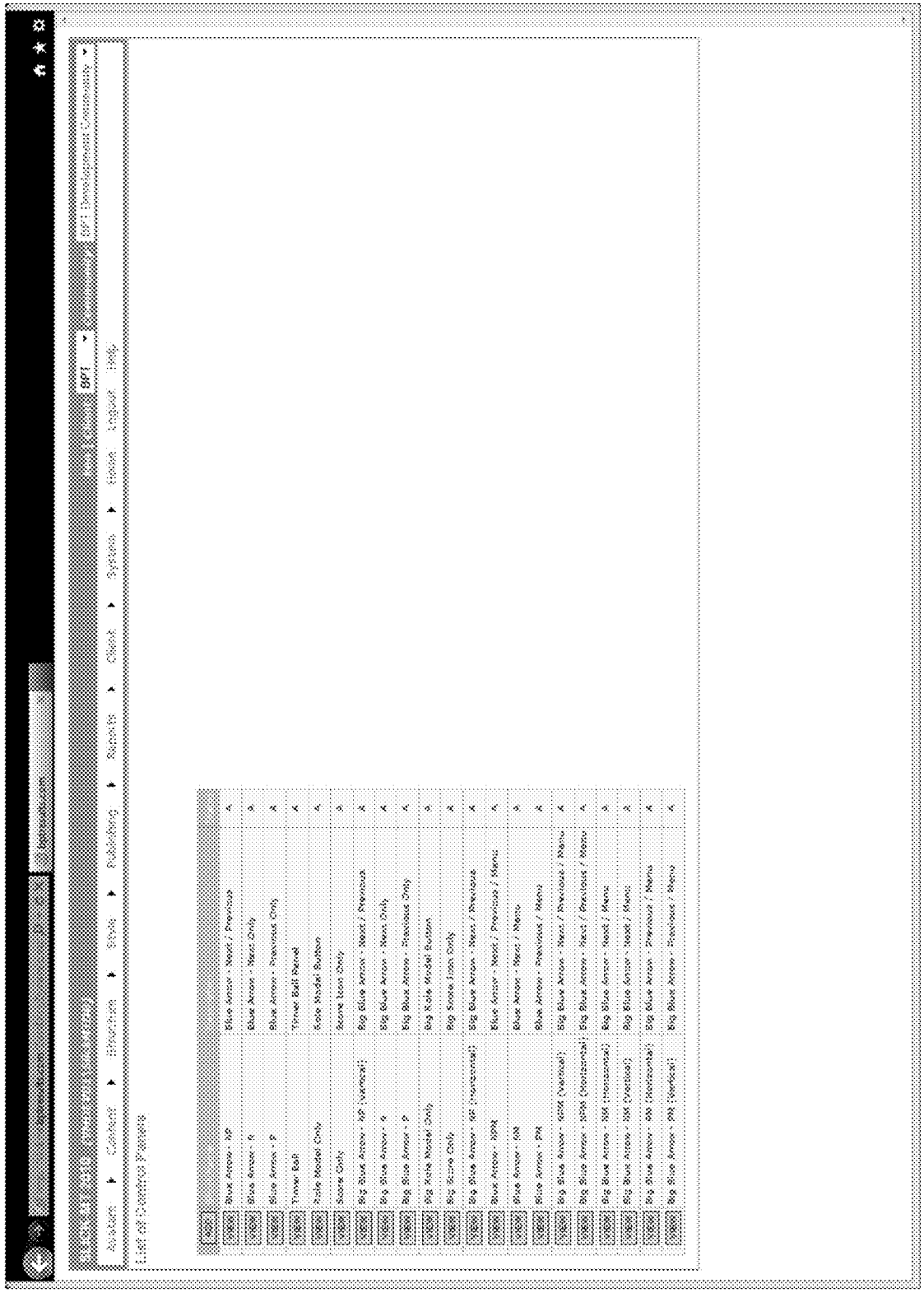
Figure 2N:
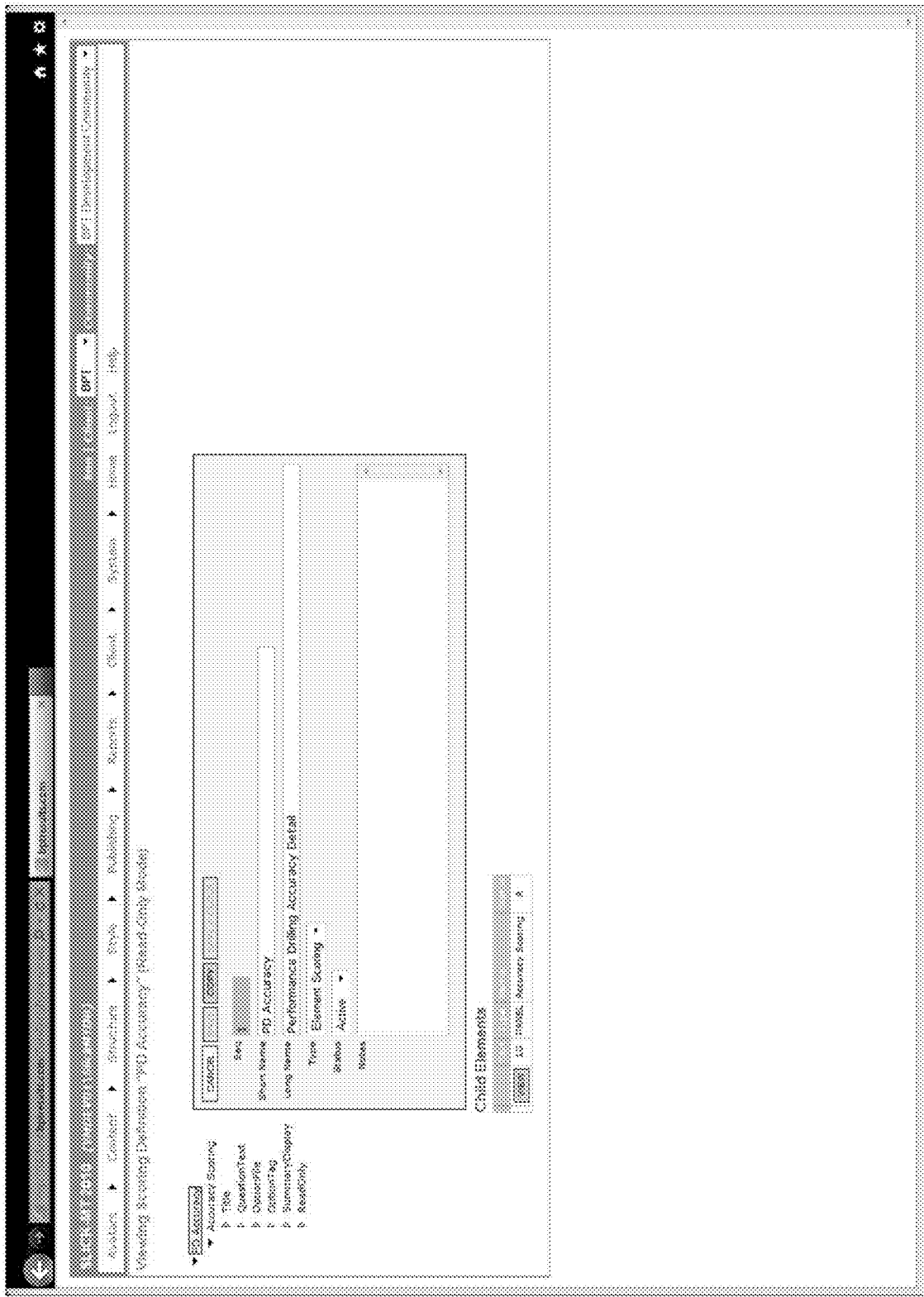
Figure 2N:
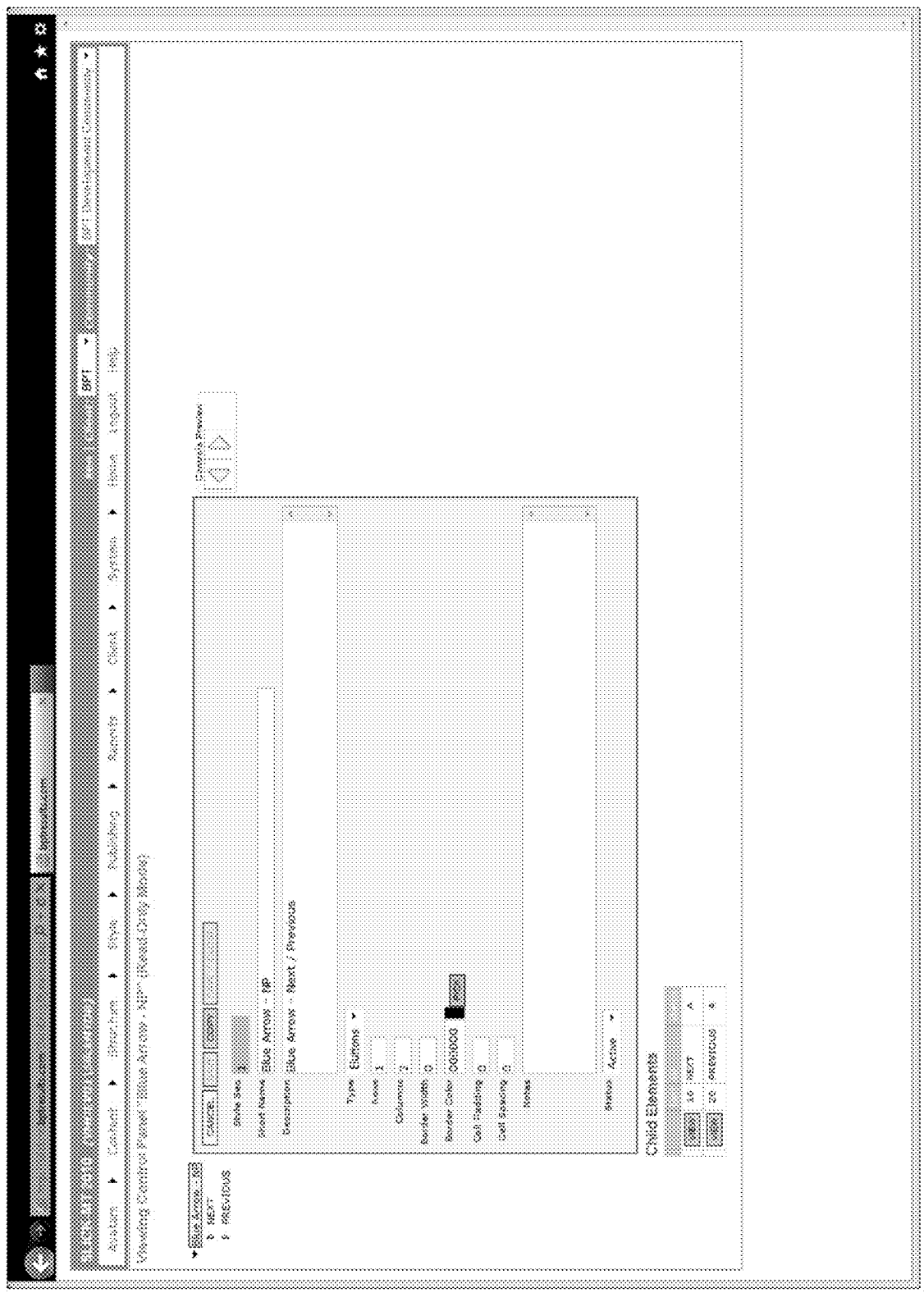
Figure 20:
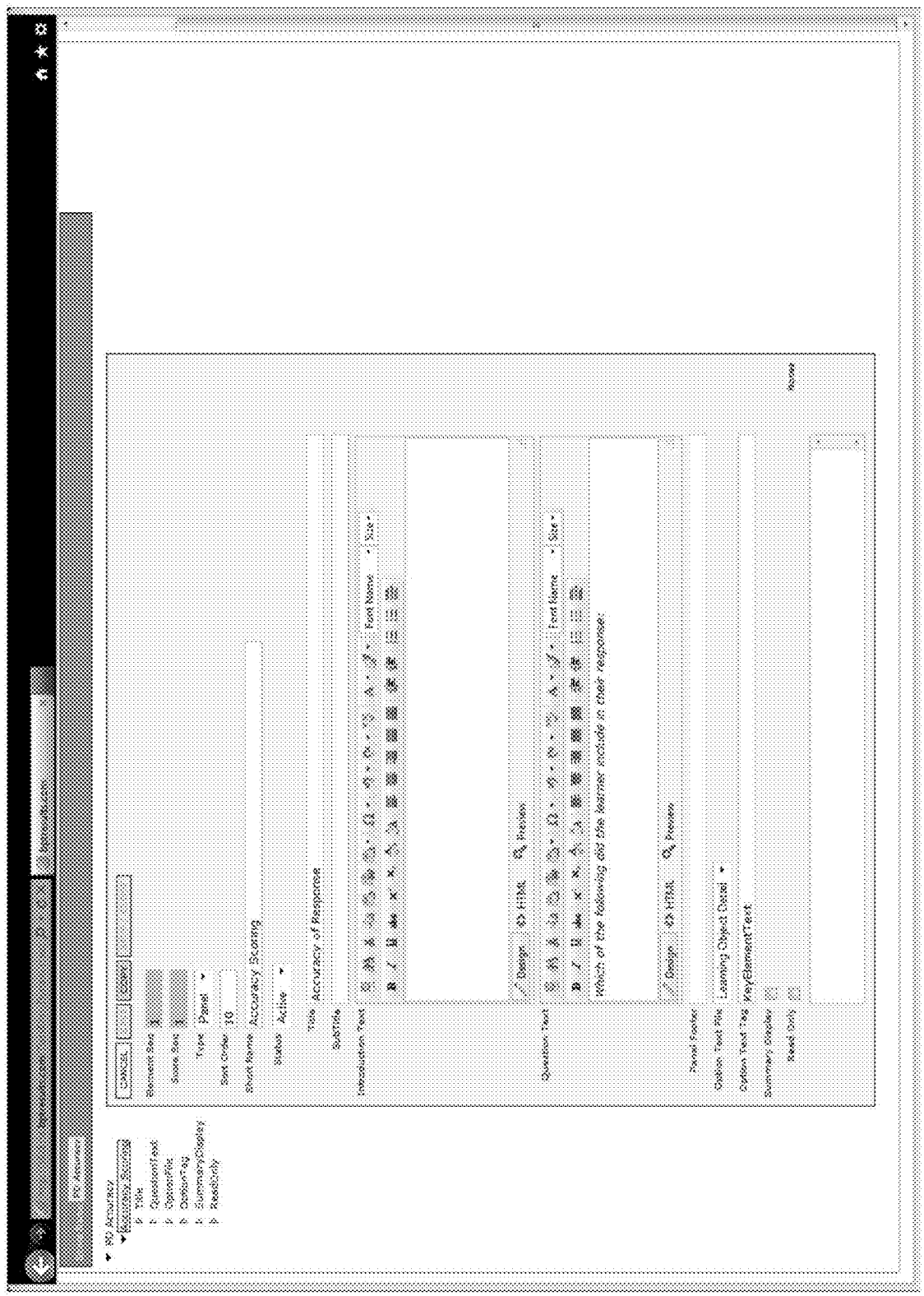
Figure 20O:
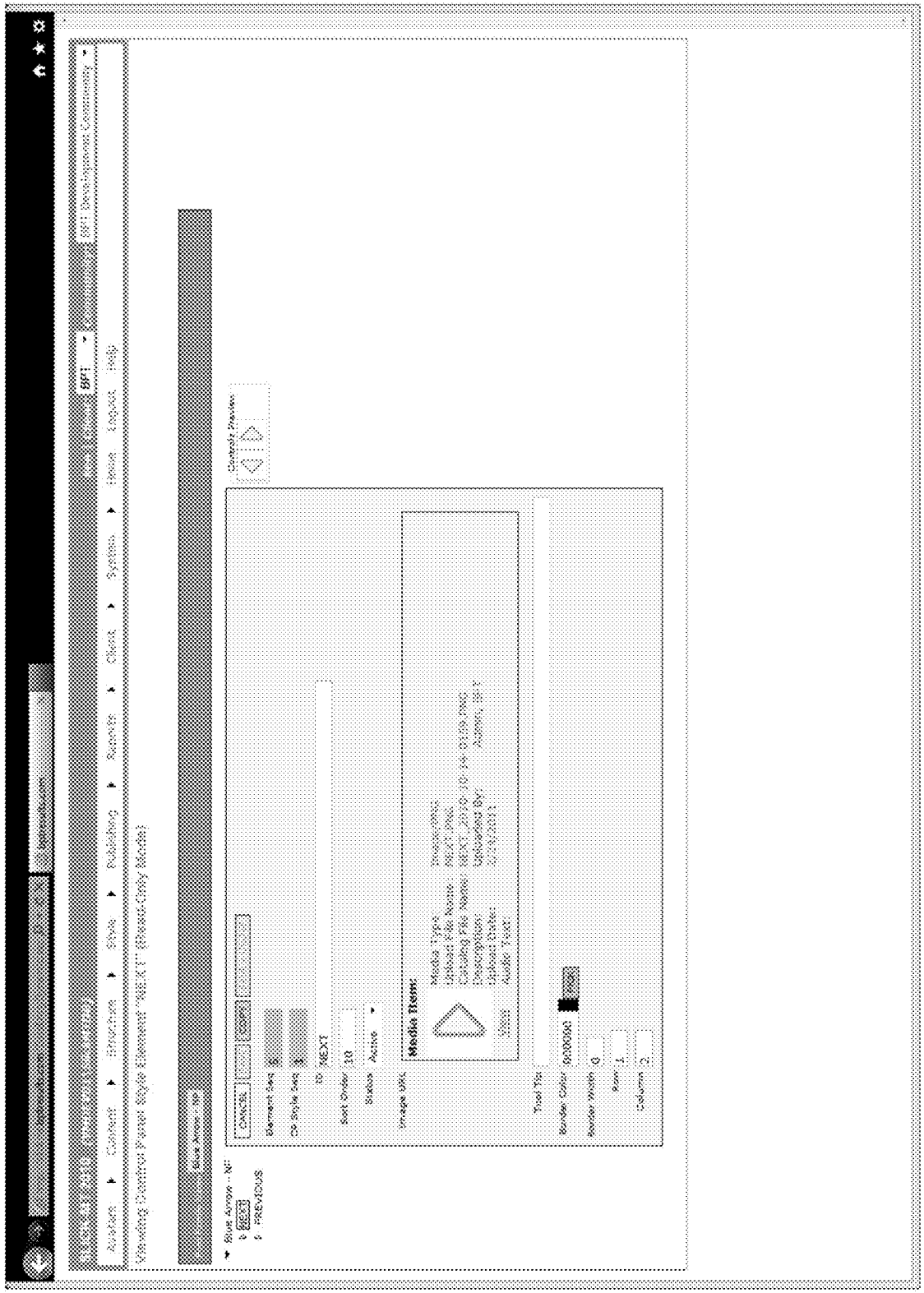

FIG. 2M illustrates an example user interface displaying a listing of scoring definitions. The following information is provided for a given scoring definition: sequence number, short name, long name, type (e.g., element, timer, etc.), and status. A view control is provided, which if activated, causes a user interface, such as the example user interface illustrated in FIG. 2N, to be presented. FIG. 2N illustrates the scoring definition for "PD Accuracy." Editable fields are provided for the following: sequence number, short name, long name, type (e.g., element scoring), status, notes, and a listing of child elements. The child details listing includes the following information for a given child: sort number, type (e.g., control panel, etc.), and status. A view control is provided in association with a respective child, which if activated, causes a user interface, such as the example user interface illustrated in FIG. 2O, to be presented. A hierarchical menu is displayed on the left hand side of the user interface, listing scoring styles and child elements.

FIG. 2O illustrates the accuracy scoring definition for "PD Accuracy." Editable fields are provided for the following: element sequence number, score sequence, type, sort order, short name, status, title, subtitle, introduction text, question text, panel footer, option text file, option text tag, summary display, notes.

Figure 2P:
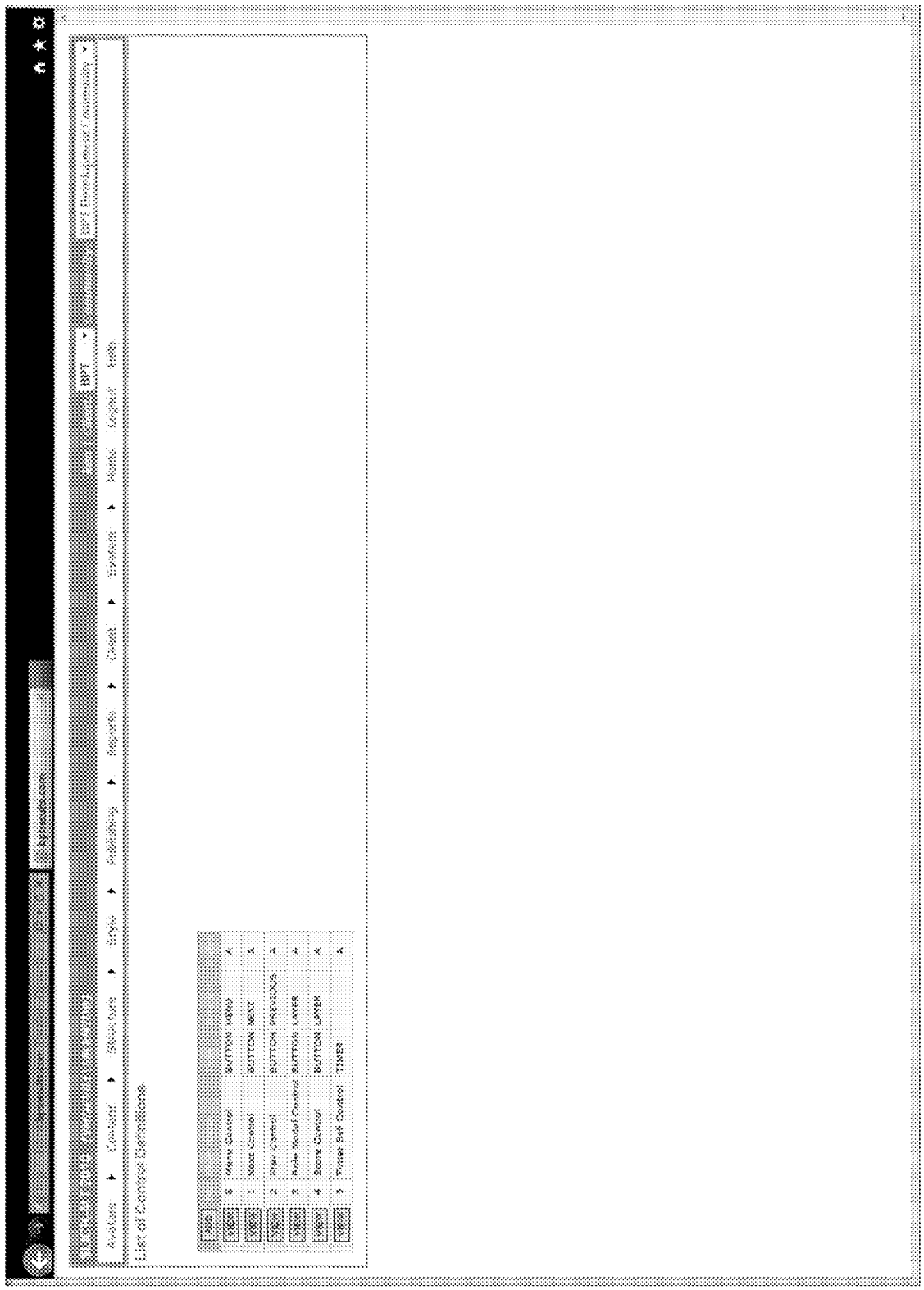
Figure 2P:
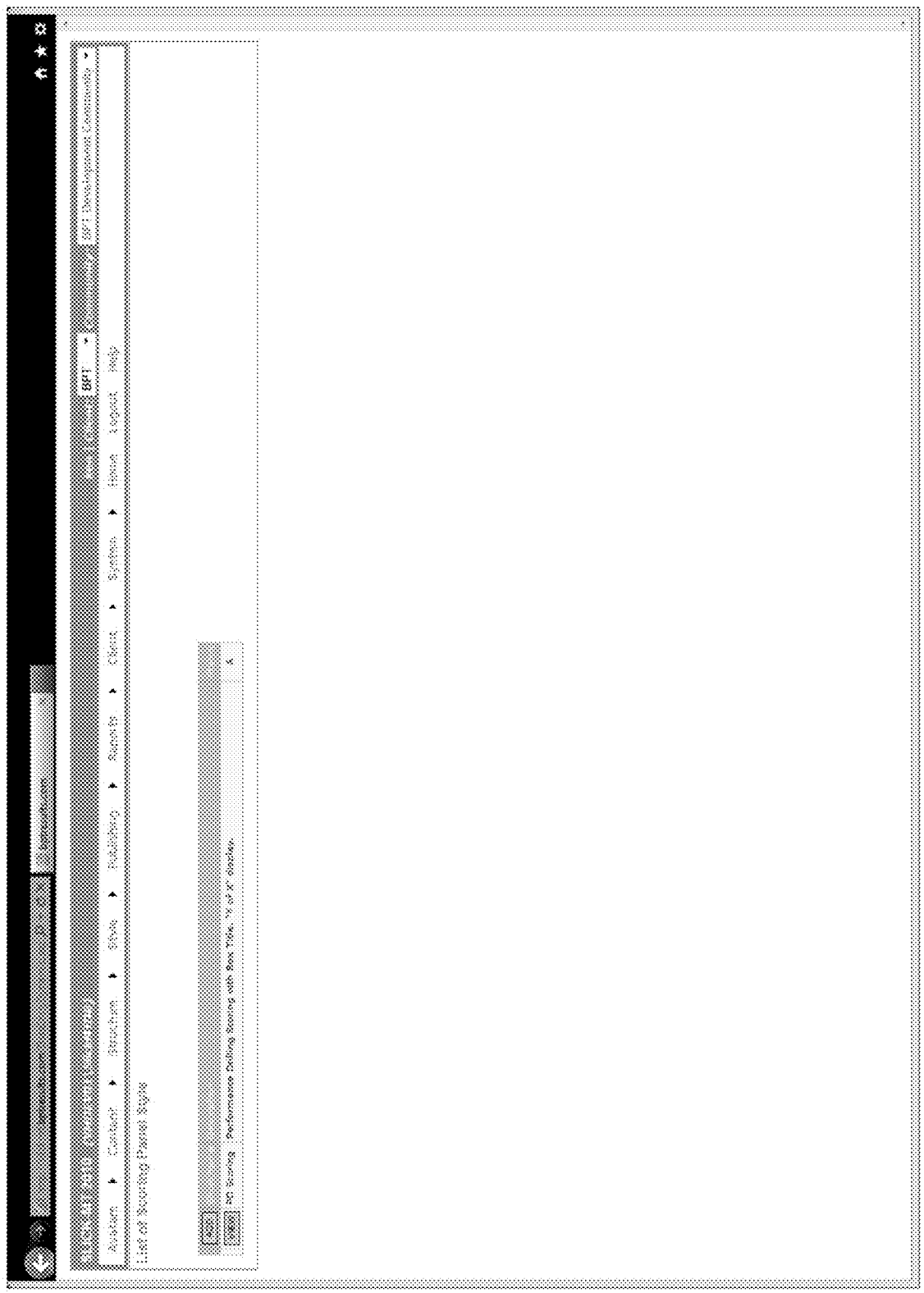
Figure 2Q:
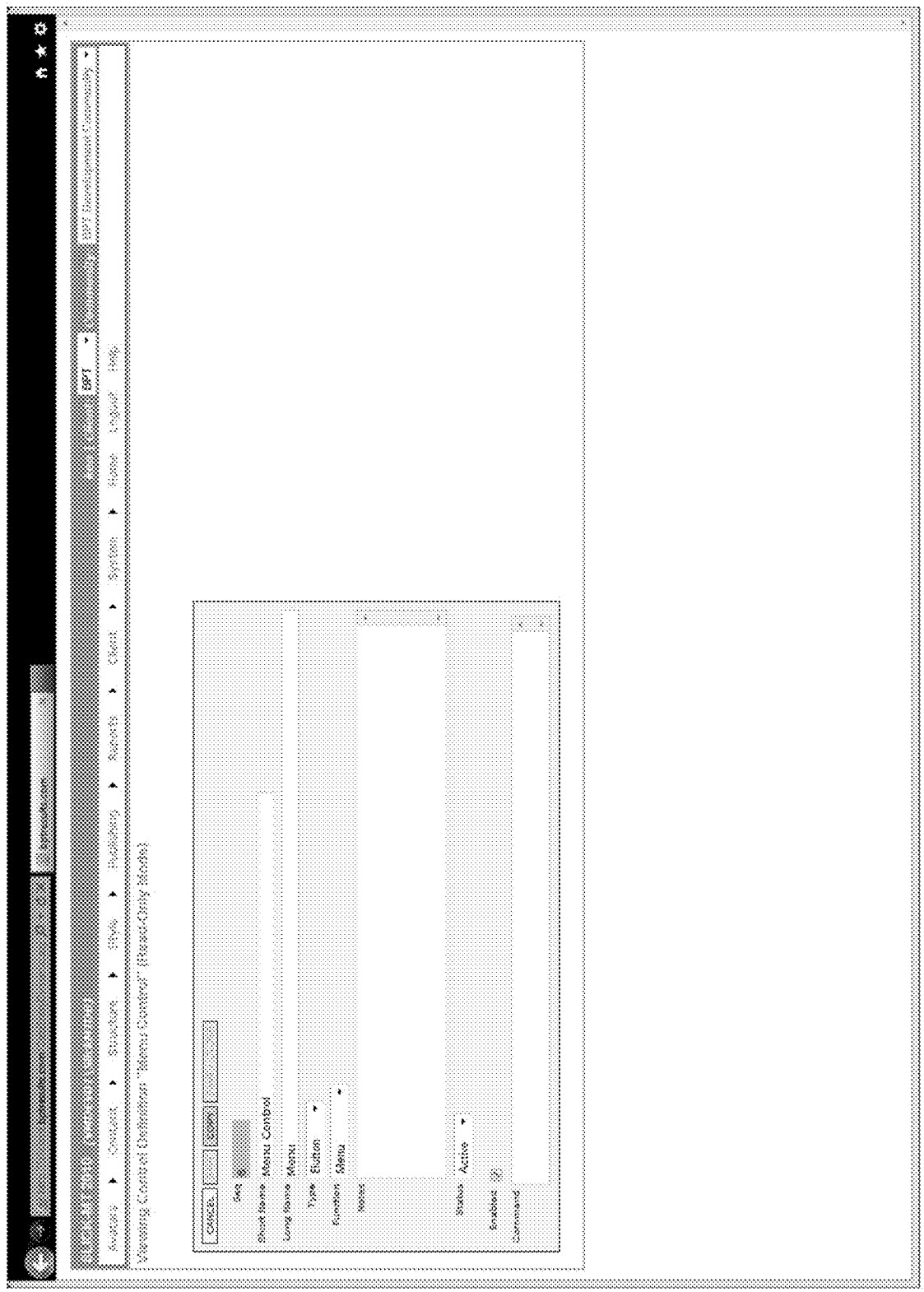
Figure 2Q:
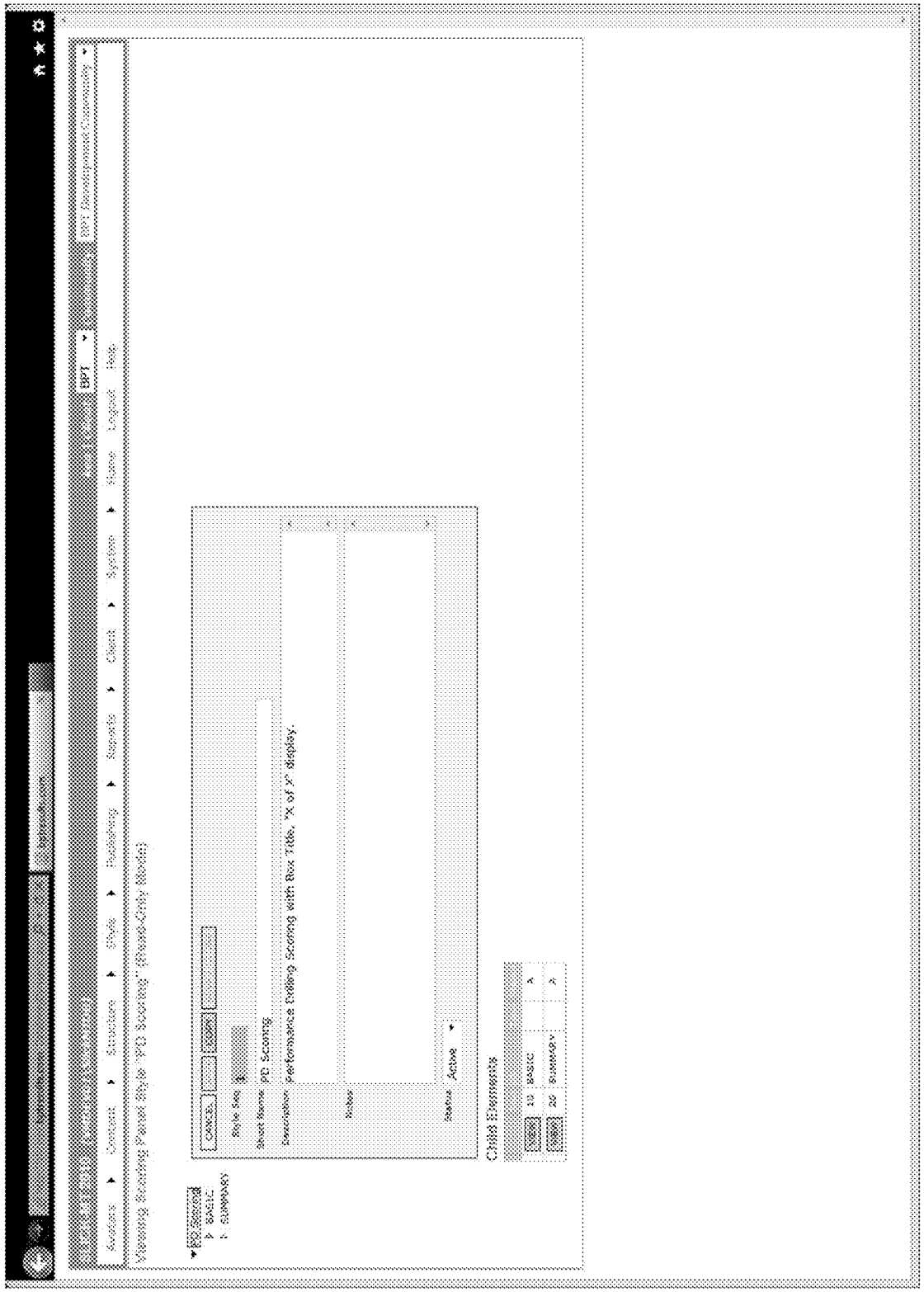

FIG. 2P illustrates an example user interface displaying a list of definitions of controls and related information, including sequence number, short name, type (e.g., button, timer, etc.), function (e.g., menu, next, previous, layer, etc.). A view control is provided in association with a respective control, which if activated, causes a user interface, such as the example user interface illustrated in FIG. 2Q, to be presented. FIG. 2Q illustrates the scoring definition for "menu control". Editable fields are provided for the following: sequence number, short name, long name, type, function (e.g., menu), notes, status, enabled/disabled, and command.

Figure 2R:
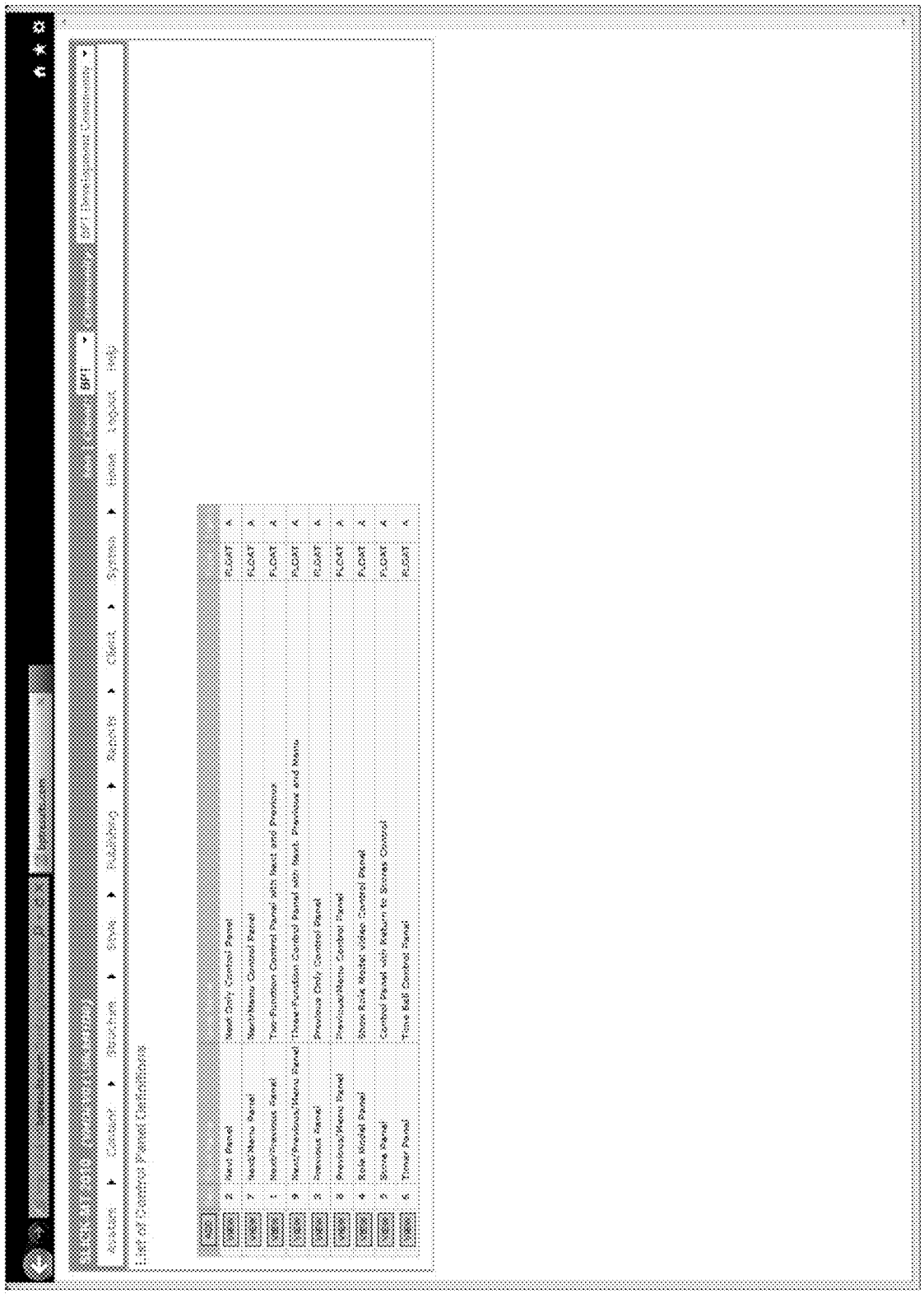
Figure 2R:
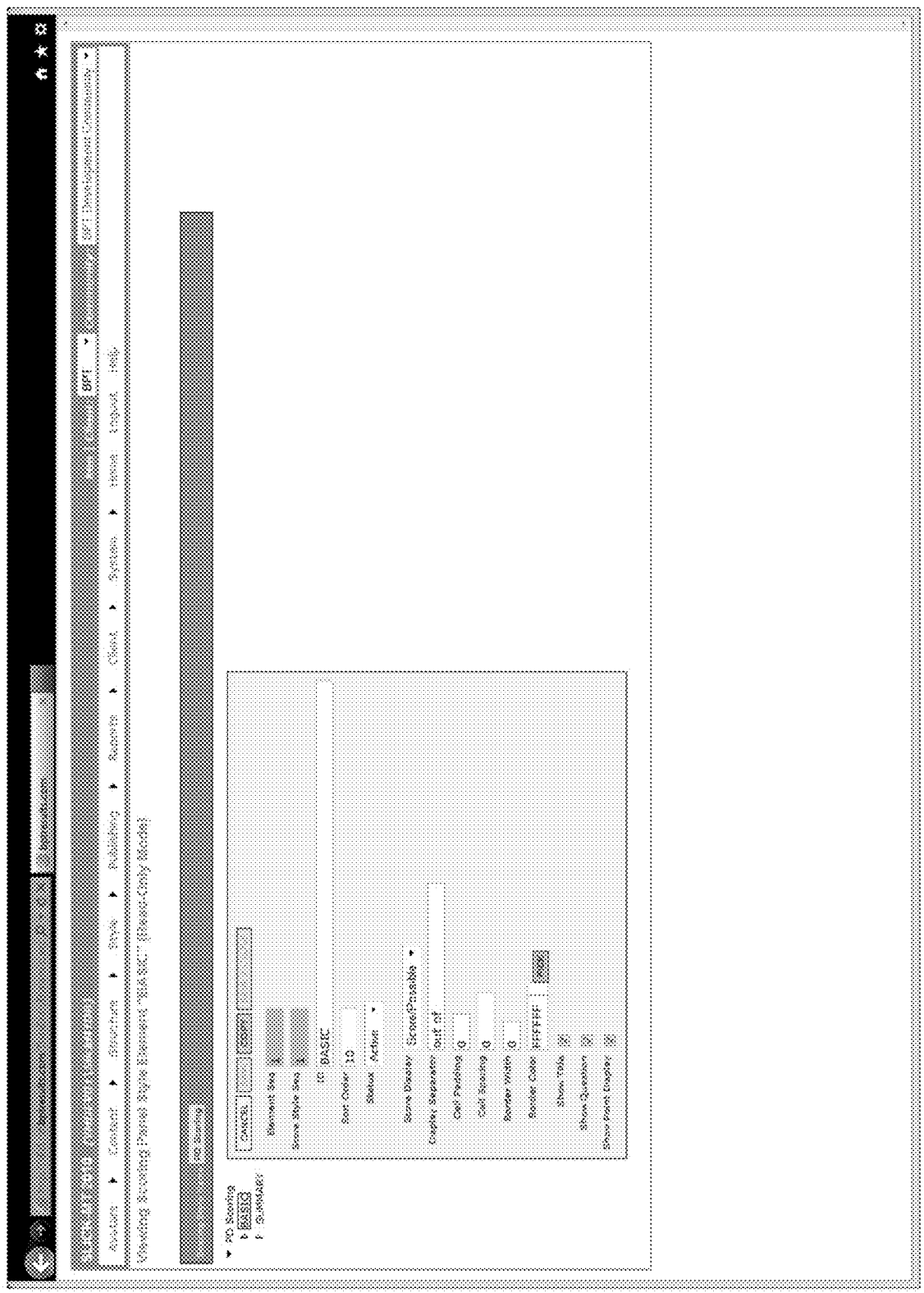
Figure 2S:
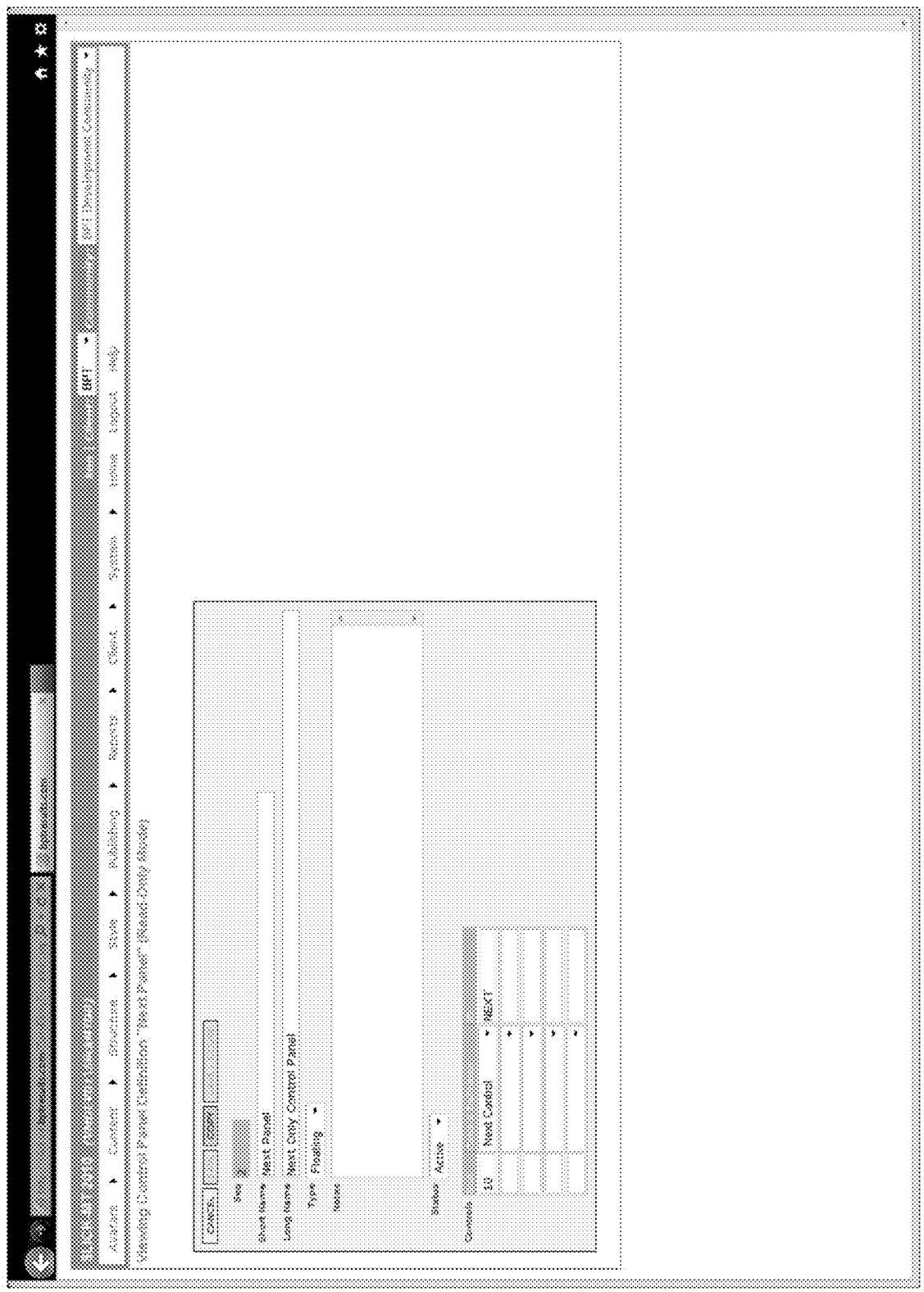
Figure 2S:
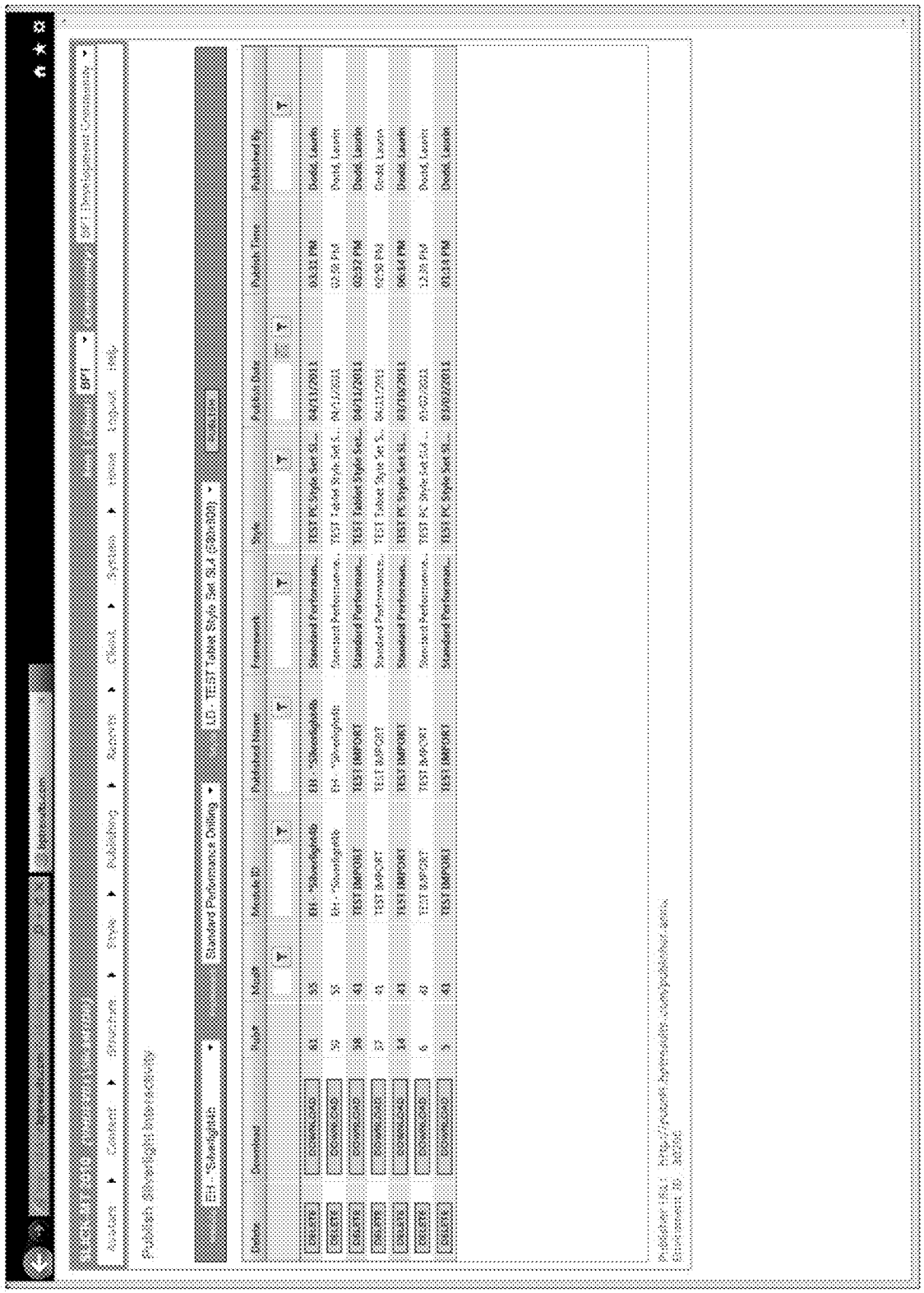

FIG. 2R illustrates an example user interface displaying a list of control panel definitions and related information, including sequence number, short name, long name, type (e.g., floating, fixed, etc.). A view control is provided in association with a respective control panel definition, which if activated, causes a user interface, such as the example user interface illustrated in FIG. 2S, to be presented. FIG. 2S illustrates the control definition for "Next Panel", including the flowing fields: sequence, short name, long type, type, notes, and a listing of controls. A given control has an associated sequence number, control definition, and ID.

Figure 2T:
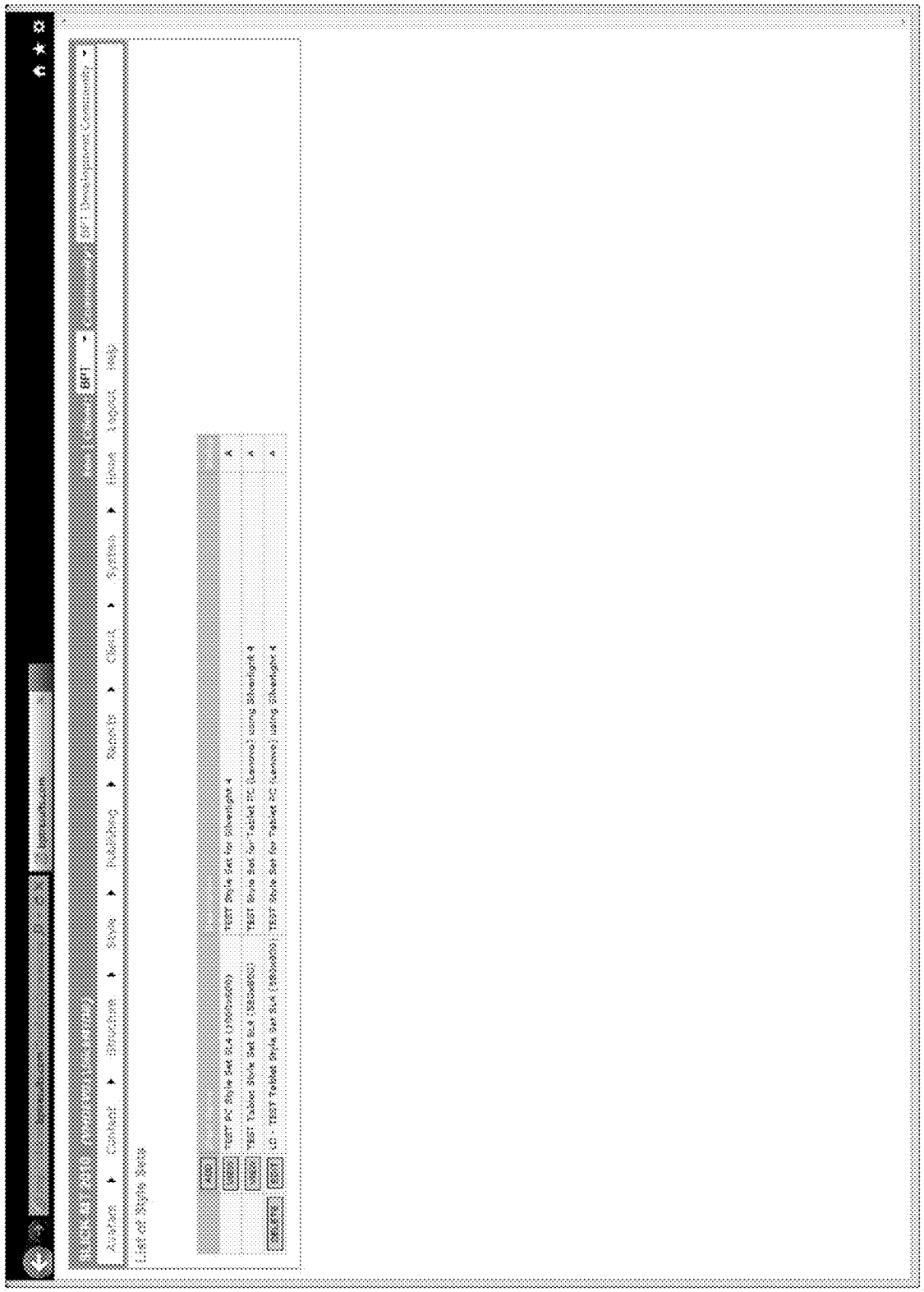
Figure 2T:
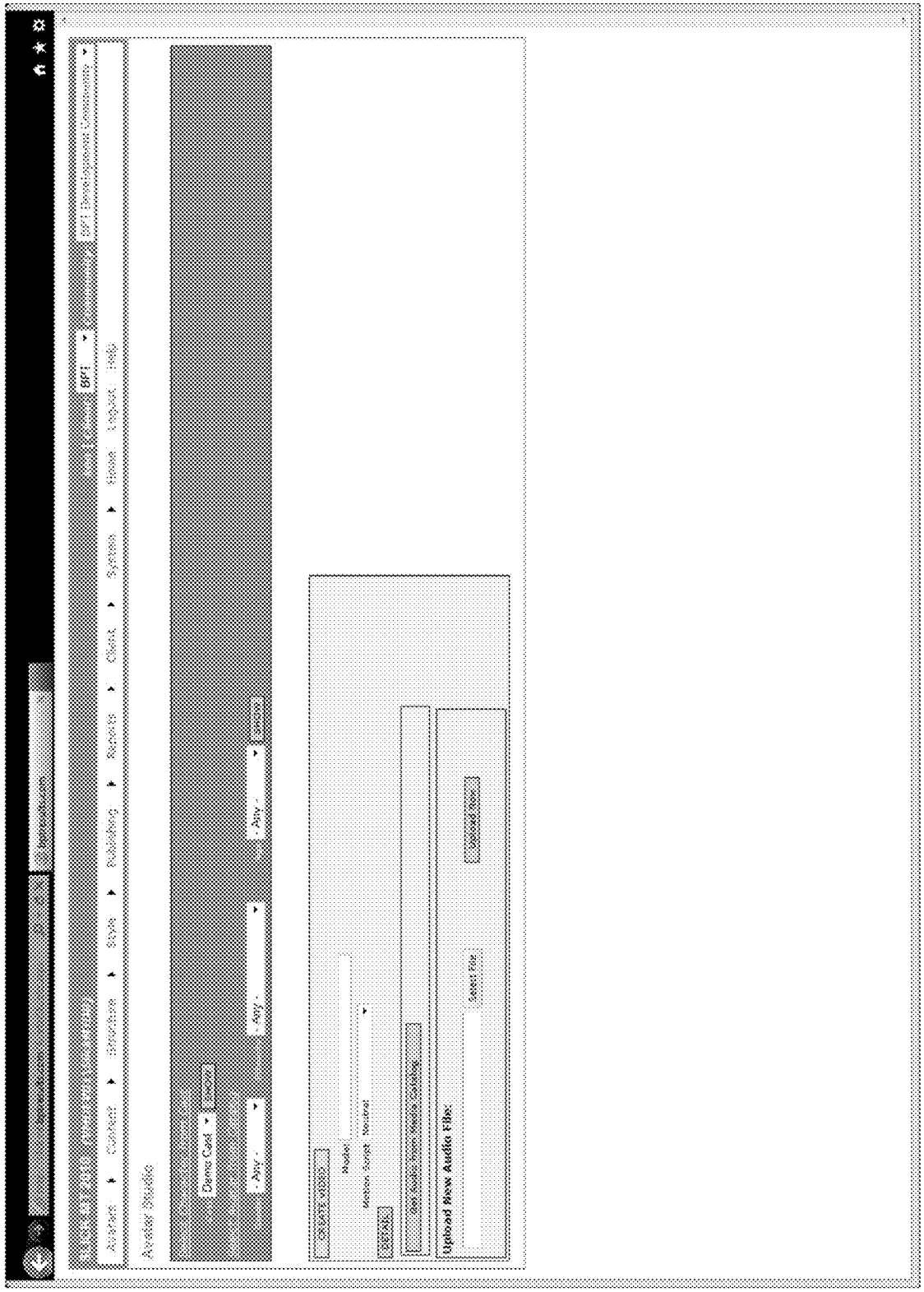

FIG. 2T illustrates an example user interface displaying a list of styles and related information, including sequence number, short name, long name, description. A view control and/edit control are provided in association with a respective style, which if activated, causes a user interface, such as the example user interface illustrated in FIG. 2U, to be presented.

Figure 2U:
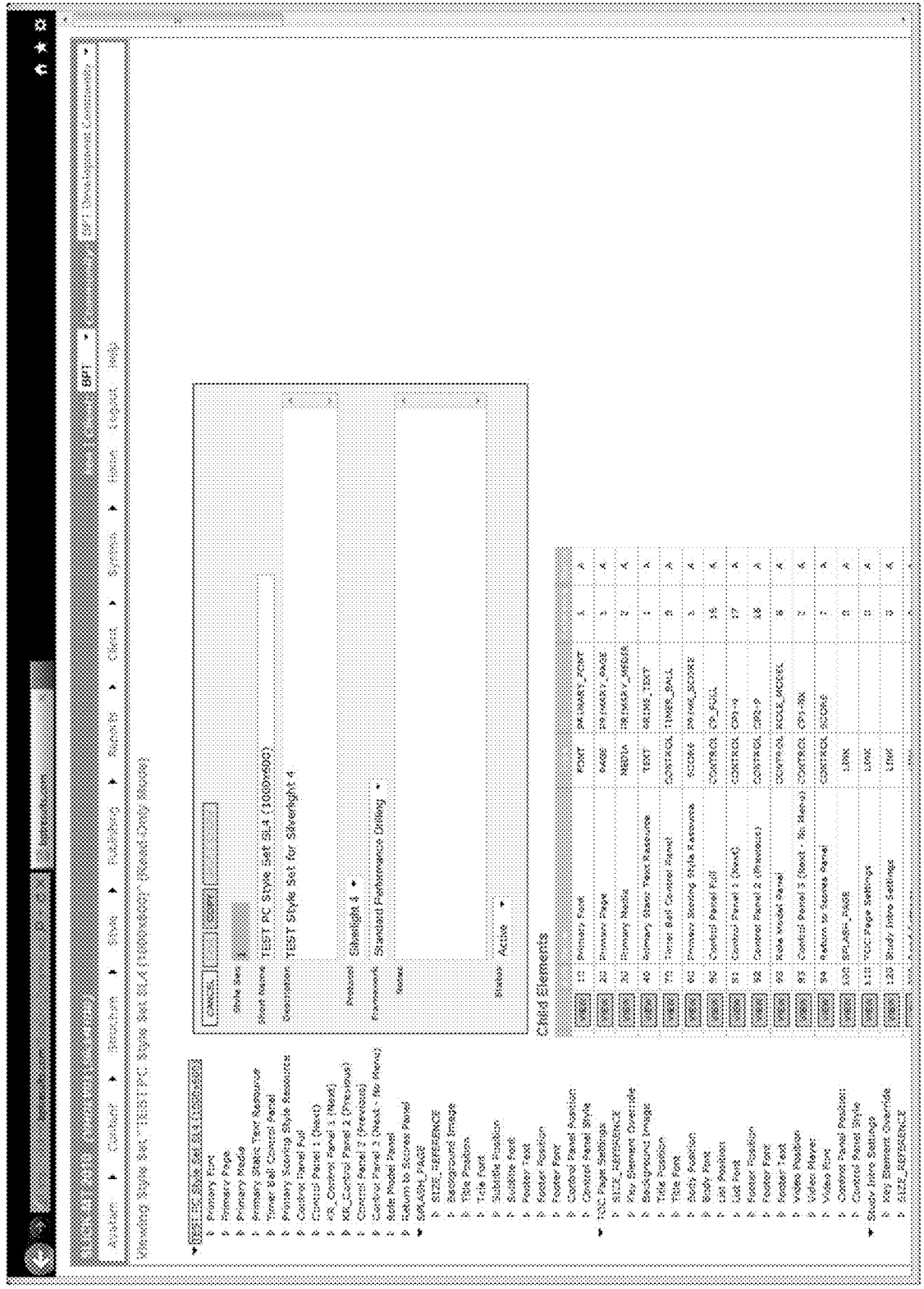
Figure 2U:
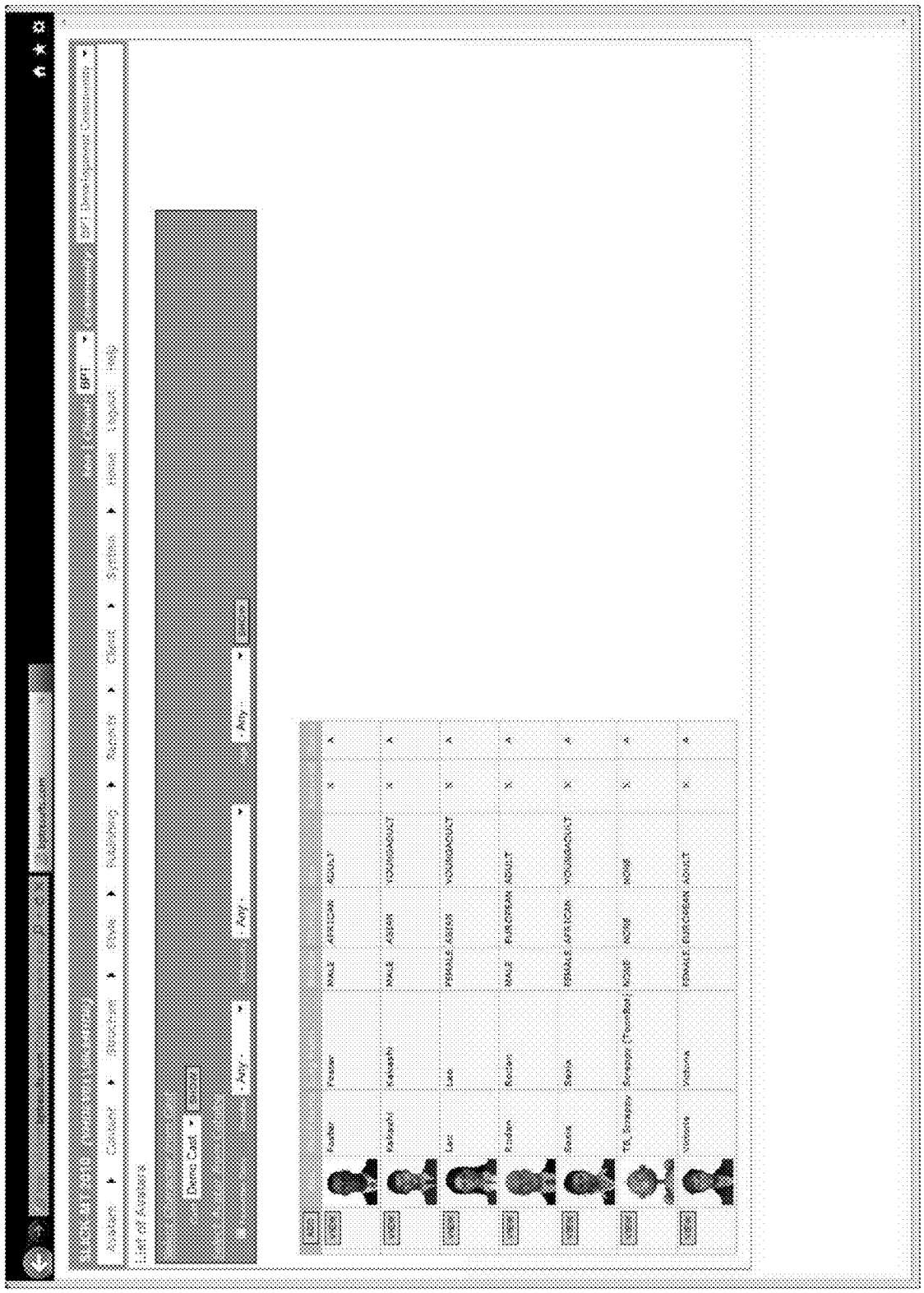
Figure 2V:
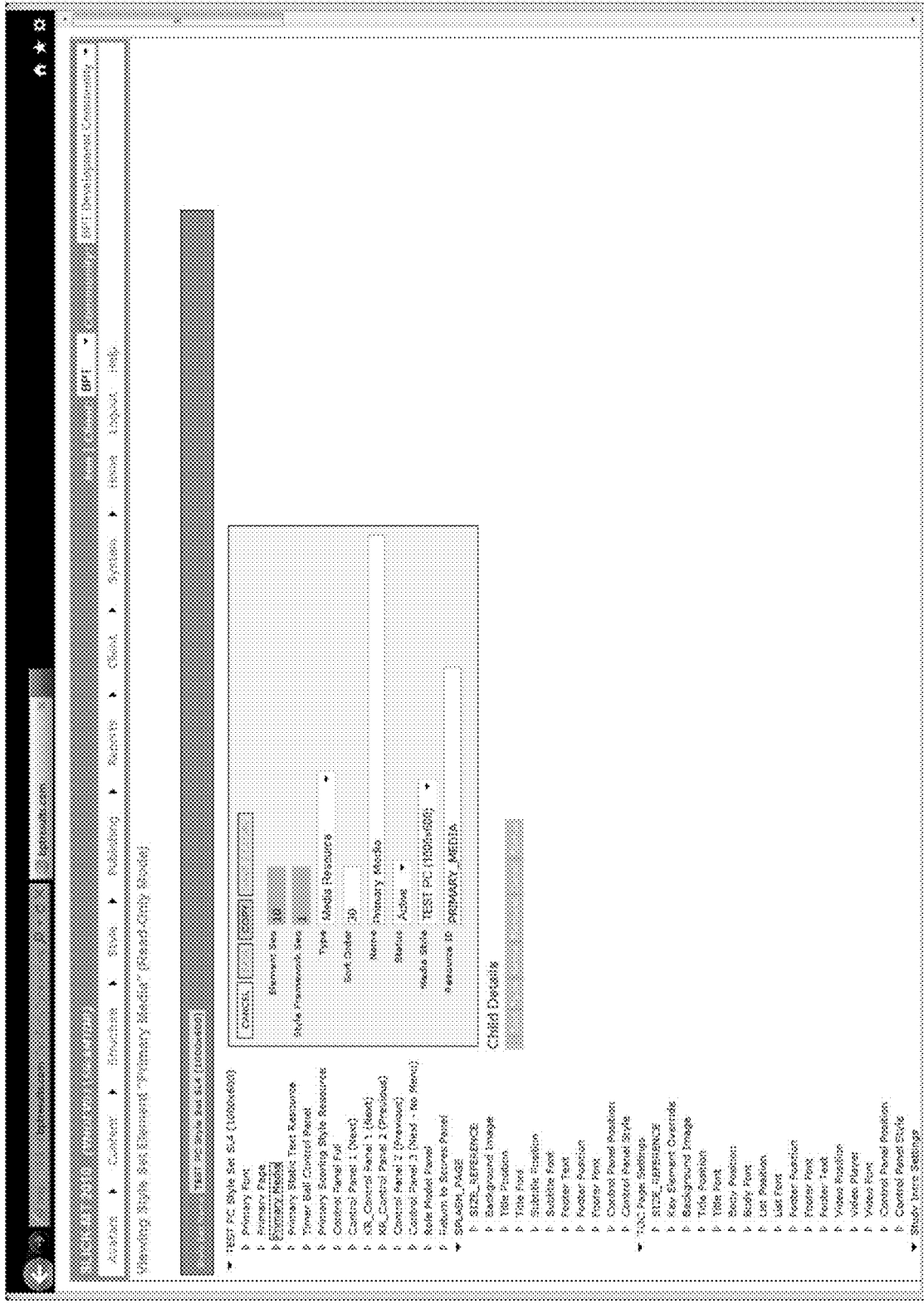
Figure 2V:
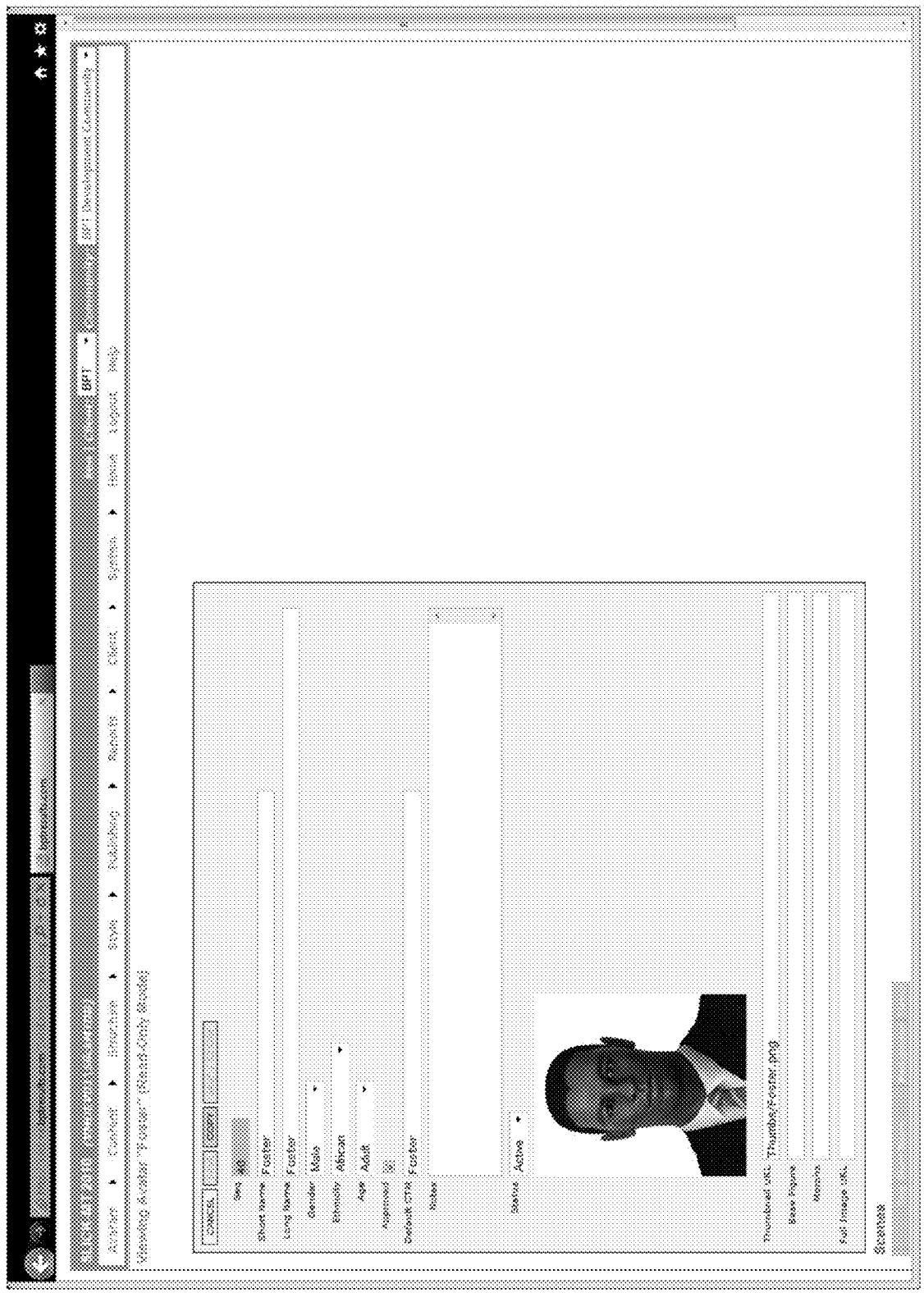

FIG. 2U illustrates an example style set, including the following fields: style sequence, short name, description, protocol (e.g., SILVERLIGHT protocol, FLASH protocol, etc.), notes, status, and a list of child elements. The list of child elements includes: sort, name (e.g., page name, media name, text resource name, control panel name, settings name, etc.), type (e.g. Font, page, media, control, score, link, etc.), ID, reference, and status. A hierarchal menu is presented on the left side of the user interface lists resources (e.g., fonts, pages, media, static text, control panels, scoring styles, etc.) and links to frameworks (e.g., splash pages, page settings, study intro settings, etc.). A view control is provided in association with a respective child element, which if activated, causes a user interface, such as the example user interface illustrated in FIG. 2V, to be presented. A hierarchal menu is presented on the left side of the user interface listing resources (e.g., fonts, pages, media, static text, control panels, scoring styles, etc.) and links to frameworks (e.g., splash pages, page settings, study intro settings, etc.).

Figure 2W:
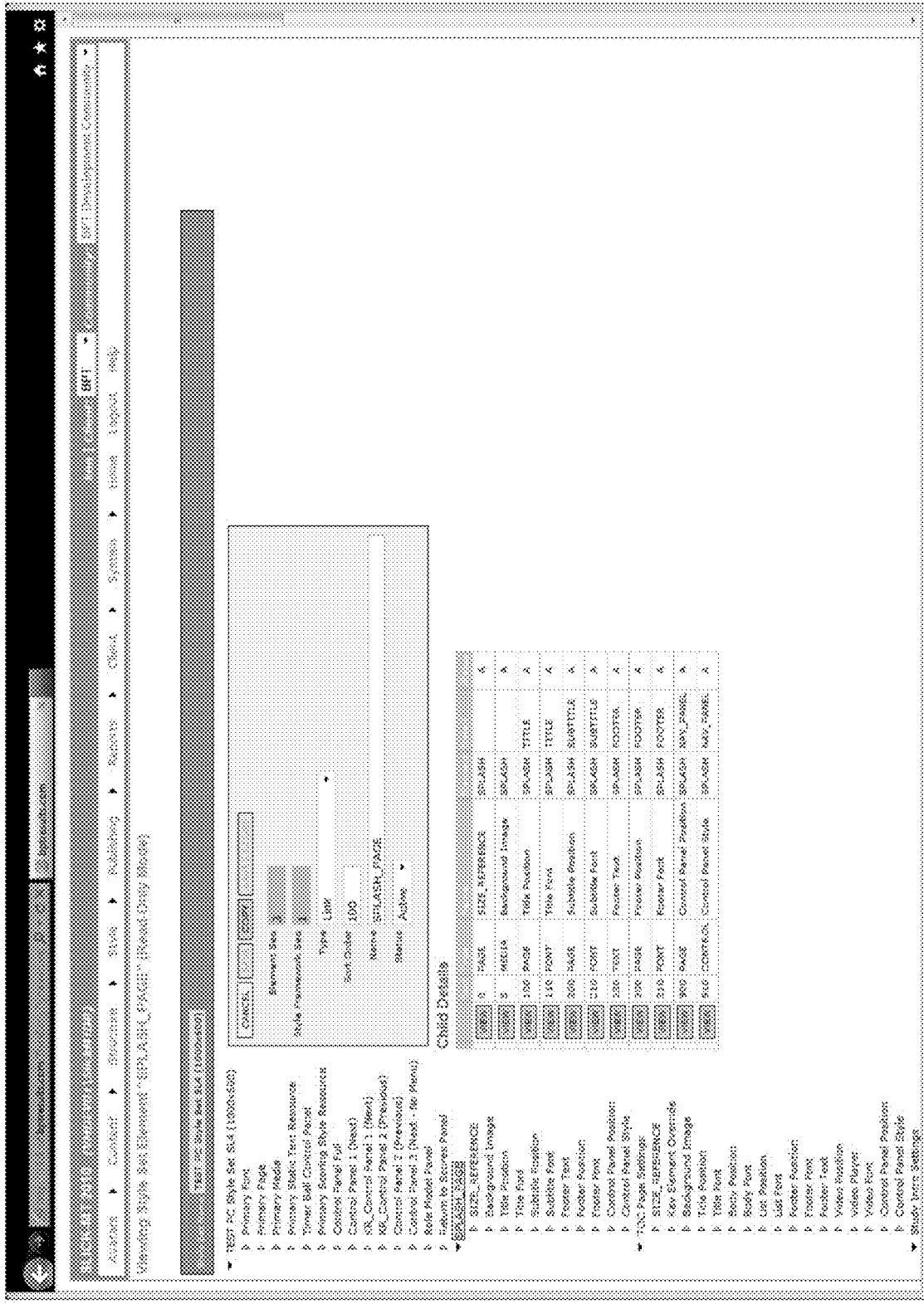
Figure 2W:
Figure 2X:
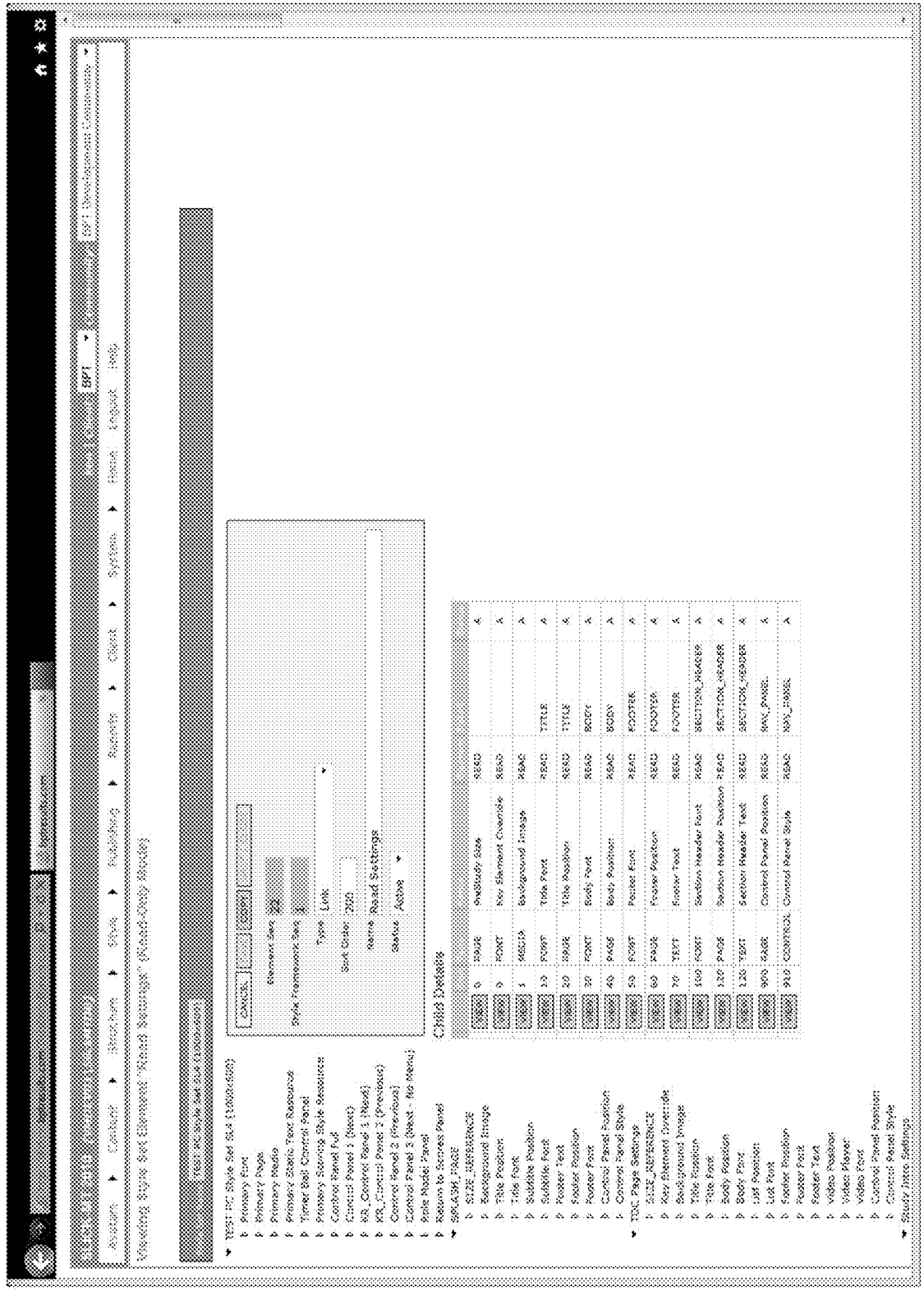
Figure 2X:
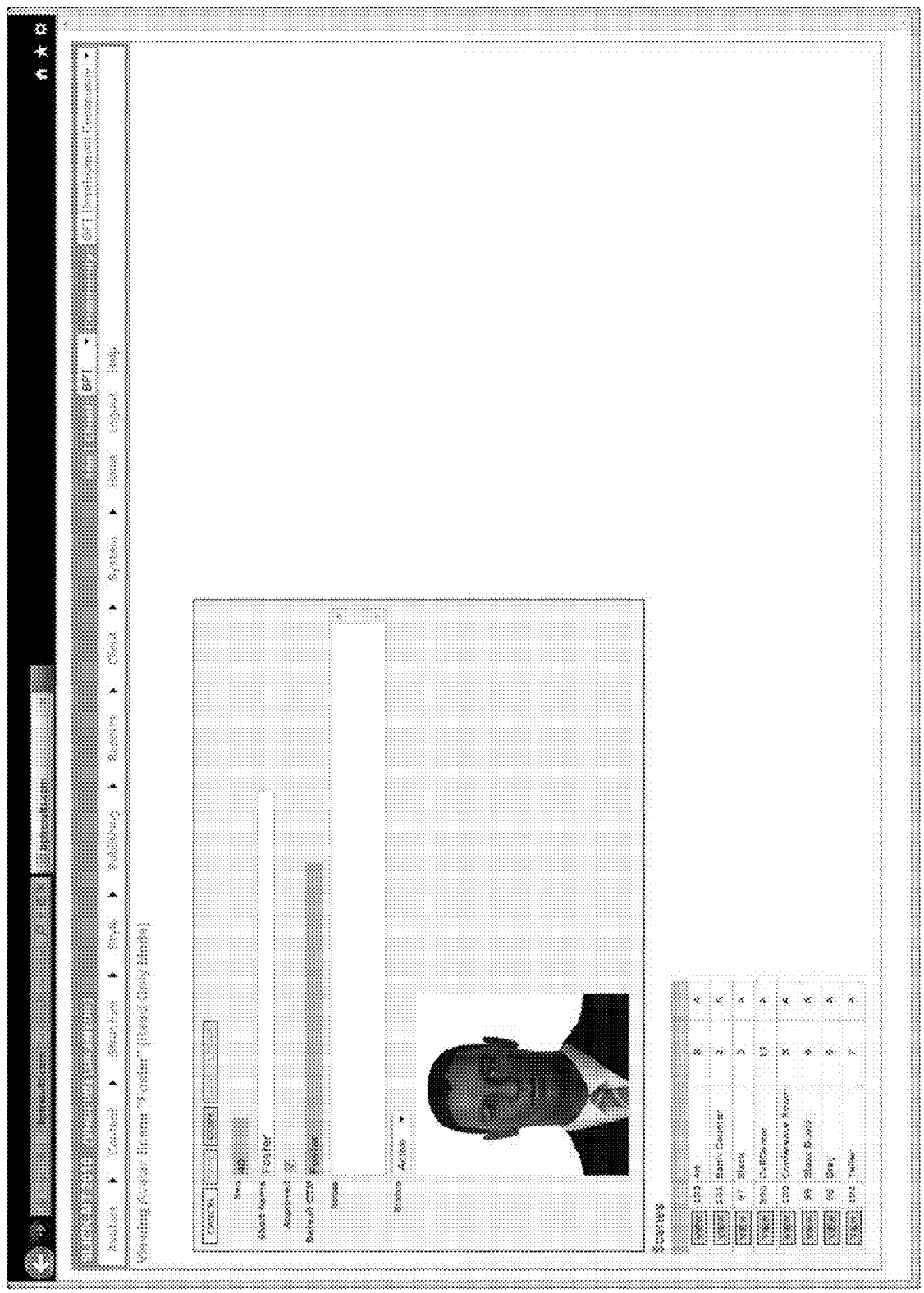
Figure 2Y:
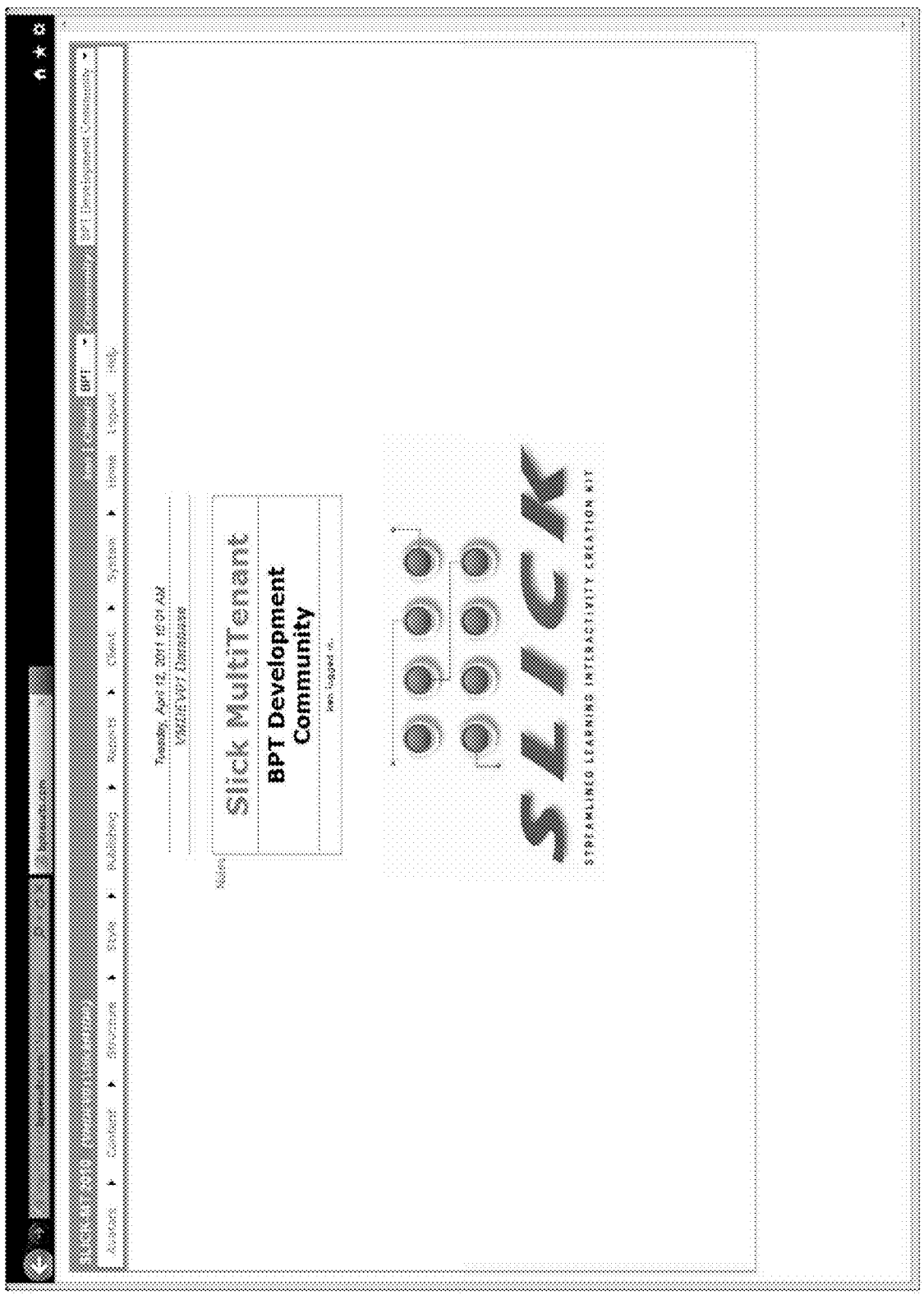
Figure 2Z:
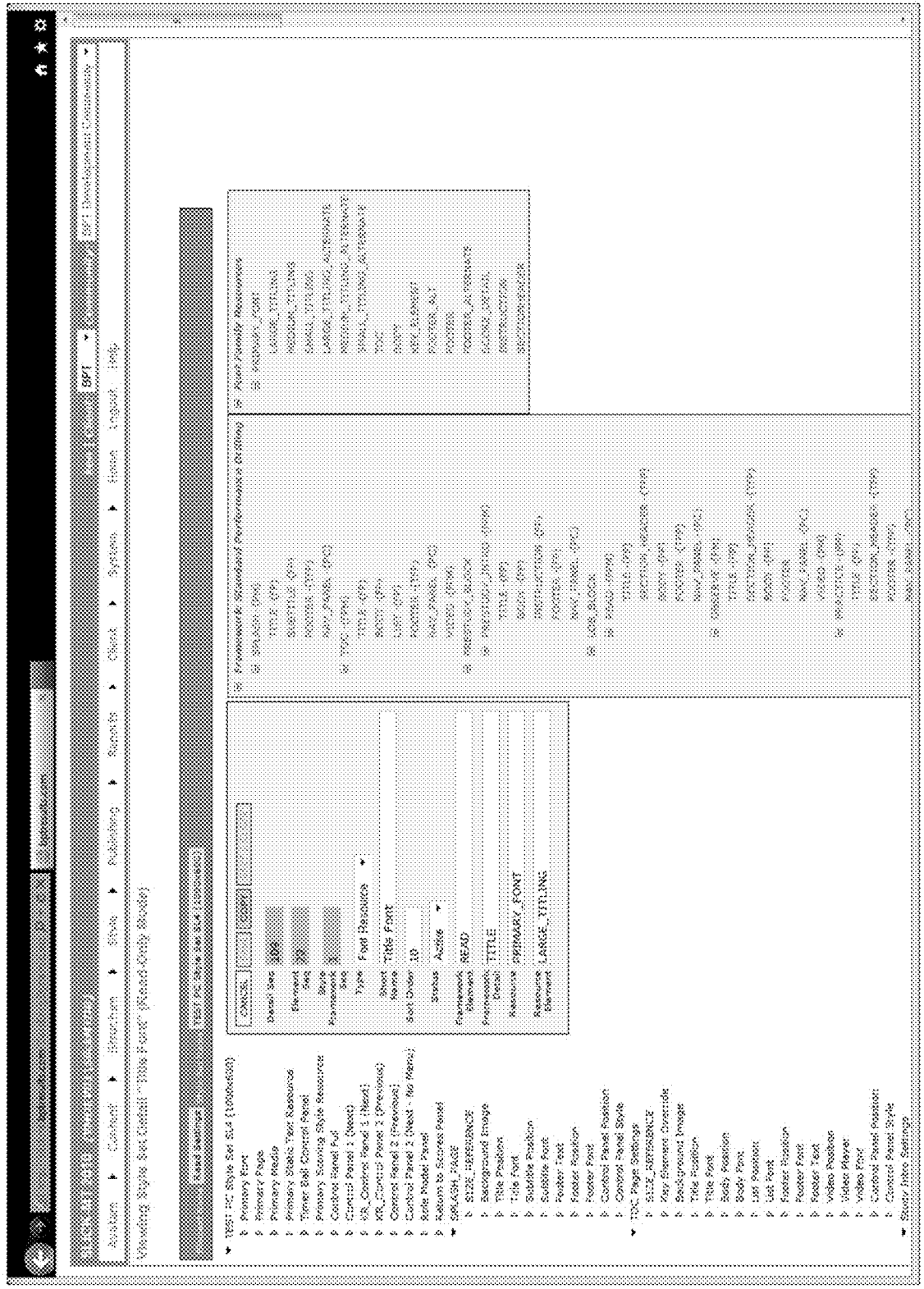
Figure 2Z:
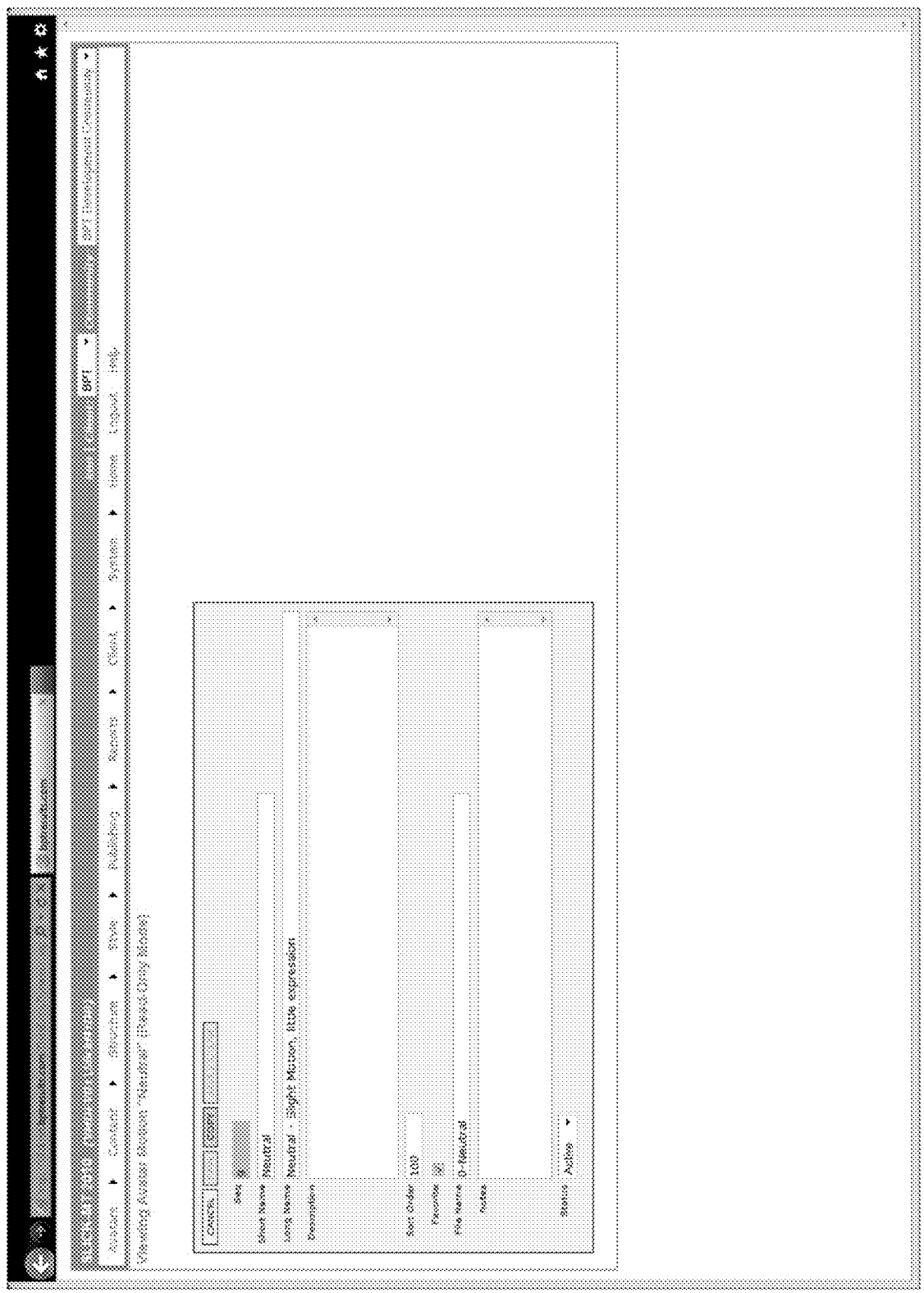

FIG. 2W illustrates an example style set element (for "Splash_Page"), including an element sequence number, style framework sequence, type (e.g., link, etc.), sort order, name, status, and a list of child elements. The child details listing includes the following information for a given child: sort number, type (e.g., page, media, font, text, etc.), name, element, detail, status. FIG. 2X illustrates another example style set element (for "Read Settings"). FIG. 2Z illustrates an example style set detail (for "Title Font"), including detail sequence number, element sequence, style framework sequence, type (e.g., font resource), short name, sort order, framework element (e.g., read), framework detail (e.g., title), resource (e.g., primary front), and resource element (e.g., large titling). In addition, a hierarchical listing of frameworks and a hierarchical list of font resources are displayed, via which a user may select one of the listed items to view and/or edit. FIG. 2Y is intentionally omitted.

FIG. 2AA illustrates an example listing of font families, including related information, such as short name, description, and status. A view control is provided in association with a respective font family, which if activated, causes a user interface, such as the example user interface illustrated in FIG. 2BB, to be presented. FIG. 2BB illustrates an example font family (for the "TEST PC" Font family), including style sequence number, short name, description, notes, and status. Examples of the various available fonts and their respective names are displayed as well. FIG. 2CC illustrates a font family style element (for the "Large_Titling" font), including the element sequence, font style sequence, type (e.g., font), ID, sort order, status, font family (e.g., Arial), size (e.g., large, medium, small, or 10 point, 14 point, 18 point, etc.), color (e.g., expressed as a hexadecimal value, a color name, or a visual color sample), special effects/styles (e.g., bold, italic, underline). Controls are provided which enables a user a specify background options (e.g., white, grey, black). In addition, a hierarchical listing of available font family members is displayed.

FIG. 2DD illustrates an example listing of page layouts, including related information, such as short name, description, and status. A view control is provided in association with a respective page layout, which if activated, causes a user interface, such as the example user interface illustrated in FIG. 2EE, to be presented. FIG. 2EE illustrates an example page layout (for the "TEST PC" page layout), including style sequence number, short name, description, notes, status, and a listing of child elements. The listing of child elements includes the following information for a given child element: sort number, ID, type (e.g., splash, combo, timed challenges, score, graph, video, etc.). A view control is provided in association with a child element, which if activated, causes a user interface, such as the example user interface illustrated in FIG. 2FF, to be presented. In addition, a hierarchical listing of page layouts, child elements, and grandchild elements, is displayed, via which a user may select one of the listed items to view and/or edit.

FIG. 2FF illustrates an example page layout element (for the "Combo_Page" page layout style element), including element sequence, page layout sequence, type (e.g., text/video, audio, animation, etc.), sort order, ID, status, and a listing of child details. The listing of child details includes the following information for a given child detail: type (e.g., size, text, bullet list, etc.), sort number, ID, X position, Y position, width, height, and status. In addition, a hierarchical listing of page layouts, child elements, and grandchild elements, is displayed, via which a user may select one of the listed items to view and/or edit. In this example, the items under "Combo_Page" correspond to the child details listed in the child details table.

FIG. 2GG illustrates an example listing of media styles, including related information, such as short name, description, and status. A view control is provided in association with a media style, which if activated, causes a user interface, such as the example user interface illustrated in FIG. 2HH, to be presented. FIG. 2HH illustrates an example media style (for the "Test PC" media style), including style sequence, short name, description, notes, status, and a listing of child elements. The listing of child elements includes the following information for a given child element: sort number, ID (e.g., WM/video, video alternate, splash BG, standard PG), media type (e.g., WM video, MP4 video, PNG image, JPG image, etc.). A view control is provided in association with a child element, which if activated, causes a user interface, such as the example user interface illustrated in FIG. 2II, to be presented. In addition, a hierarchical listing of media styles and child elements is displayed, via which a user may select one of the listed items to view and/or edit.

FIG. 2II illustrates an example media style element (for the "SPLASH_BG" media style element), including element sequence, media style sequence, type, ID sort order, status, with the media is an autoplay media (e.g., that is automatically played without the user having to activate a play control), a skinless media, a start delay time, an a URL to access the media. In addition, a thumbnail image of the media is previewed. A view control is provided, which when activated, causes a larger, optionally full resolution version of the image to be presented. If the media is video and/or audio media, a control may be provided via which the user can playback the media. Other media related information is provided as well, including upload file name, catalog file name, media description, an identification of who uploaded the media, when the media was uploaded, and a sampling or all of the audio text (if any) included in the media.

FIG. 2JJ illustrates an example listing of static text, including related information, such as short name, description, and status. A view control is provided in association with a static text item, which if activated, causes a user interface, such as the example user interface illustrated in FIG. 2KK, to be presented. FIG. 2KK illustrates an example static text item (for the "Standard PC" static text), including style sequence, short name, description, notes, status, and a listing of child elements. The listing of child elements includes the following information for a given child element: sort number, ID, type (e.g., block, title, header, footer, etc.), and status. A view control is provided in association with a child element, which if activated, causes a user interface, such as the example user interface illustrated in FIG. 2LL, to be presented.

FIG. 2LL illustrates an example static text element (for the "Read" static element), including element sequence, text sequence, type (e.g., block, title, header, footer, etc.), ID, sort order, width, height, the static text itself, and the status. A full functioned word processor (e.g., with spell checking, text formatting, font selection, drawing features, HTML output, preview functions, etc.) may be provided to edit the static text.

FIG. 2MM illustrates an example listing of control panels, including related information, such as short name, description, and status. A view control is provided in association with a static text item, which if activated, causes a user interface, such as the example user interface illustrated in FIG. 2NN, to be presented. FIG. 2NN illustrates an example control panel item (for the "Blue Arrow-NP" control panel), including style sequence, short name, description, type (e.g., buttons, sliders, etc.), number of rows, number of columns, border width, border color, cell padding, cell spacing, notes, status, and child elements. The listing of child elements includes the following information for a given child element: sort number, ID, and status. A view control is provided in association with a child element, which if activated, causes a user interface, such as the example user interface illustrated in FIG. 2OO, to be presented.

FIG. 2OO illustrates an example control panel style element (for the "Next" control panel style element), including element sequence, CP style sequence, ID, sort order, status, image URL. In addition, a thumbnail image of the control media is previewed (a "next" arrow, in this example). A view control is provided, which when activated, causes a larger, optionally full resolution version of the image to be presented. If the control media is video and/or audio control media, a control may be provided via which the user can playback the control media. Other control media related information is provided as well, including upload file name, catalog file name, control media description, an identification of who uploaded the control media, when the control media was uploaded, and a sampling or all of the audio text (if any) included in the control media.

FIG. 2PP illustrates an example listing of scoring panel styles, including related information, such as short name, description, and status. A view control is provided in association with a scoring panel style, which if activated, causes a user interface, such as the example user interface illustrated in FIG. 2QQ, to be presented. FIG. 2QQ illustrates an example scoring panel style (for the "PD Scoring" scoring panel style), including style sequence, short name, description, notes, status, and child elements. The listing of child elements includes the following information for a given child element: sort number, ID, and status. A view control is provided in association with a child element, which if activated, causes a user interface, such as the example user interface illustrated in FIG. 2RR, to be presented.

FIG. 2RR illustrates an example scoring panel style element (for the "Basic" scoring panel style element), including element sequence, score style sequence, ID, sort order, status, score display type (e.g., score/possible, percentage correct, ranking, letter grade, etc.), cell padding, cell spacing, boarder width, border color, an indication as to whether the title, question, and/or point display are to be shown.

FIG. 2SS illustrates an example listing of items for publication, including related information, such as publication number, module number, module ID, published name, framework, style, publication date, publication time, and which user published the item. A download control is provided in association with a given item, which if activated, causes the item to be downloaded. Delete controls are provided as well. The user may specify what the table is to display by selecting a module, framework, and style, via the respective drop down menus toward the top of the table. A publish control is provided, which, when activated, causes the respective item to be published.

Example avatar studio user interfaces will now be described. FIG. 2TT illustrates a user interface via which a user may specify/select an avatar from an existing case, or from a catalog of avatars (e.g., by specifying gender, ethnicity, and/or age). A user interface is provided for creating a video/animation using the selected avatar(s). Fields are provided via which the user can specify a model, a motion script, and audio. A control is provided via which a user may specify and upload an audio file. FIG. 2UU illustrates a list of avatars from which one or more avatar characters can be selected for a course module. The list is in a table format, and includes an image of the avatar, a short name, a long name, gender, ethnicity, age, and indication as to whether the avatar has been approved, and status. The list may be filtered in response to user specified criteria (e.g., gender, ethnicity, age, favorites only, etc.).

FIG. 2VV illustrates an example user interface for an avatar (the "Foster" avatar). The user interface includes a sequence number, short name, long name, gender, ethnicity, age, an approval indication, a default CTM, notes, status, URL for the thumbnail image of the avatar, base figure, morphs, and URL of the full resolution avatar image. FIG. 2WW illustrates an example user interface listing avatar scenes. A thumbnail is presented from each scene in which a given avatar appears (is included in). FIG. 2XX illustrates an avatar scene user interface for a selected avatar ("Foster" in this example), and provides the following related information: sequence number, short name, an indication as to whether the avatar is approved, default CTM, notes, status, and a listing of scenes in which the avatar appears (including related information, such as sequence number, short name, background number, and status).

FIG. 2YY illustrates an example list of avatar motions, including the following related information: sequence number, sort number, short name, long name, file name, an indication of the user designated the respective motion as a favorite, and status. A view control is provided in association with an avatar motion, which if activated, causes a user interface, such as the example user interface illustrated in FIG. 2ZZ, to be presented. The user interface illustrated in FIG. 2ZZ is for an example avatar motion (the "neutral" avatar motion in this example). The user interface includes the following fields: sequence number, short name, long name, description, sort order, favorite indication, file name, notes, and status.

Figure 3A:
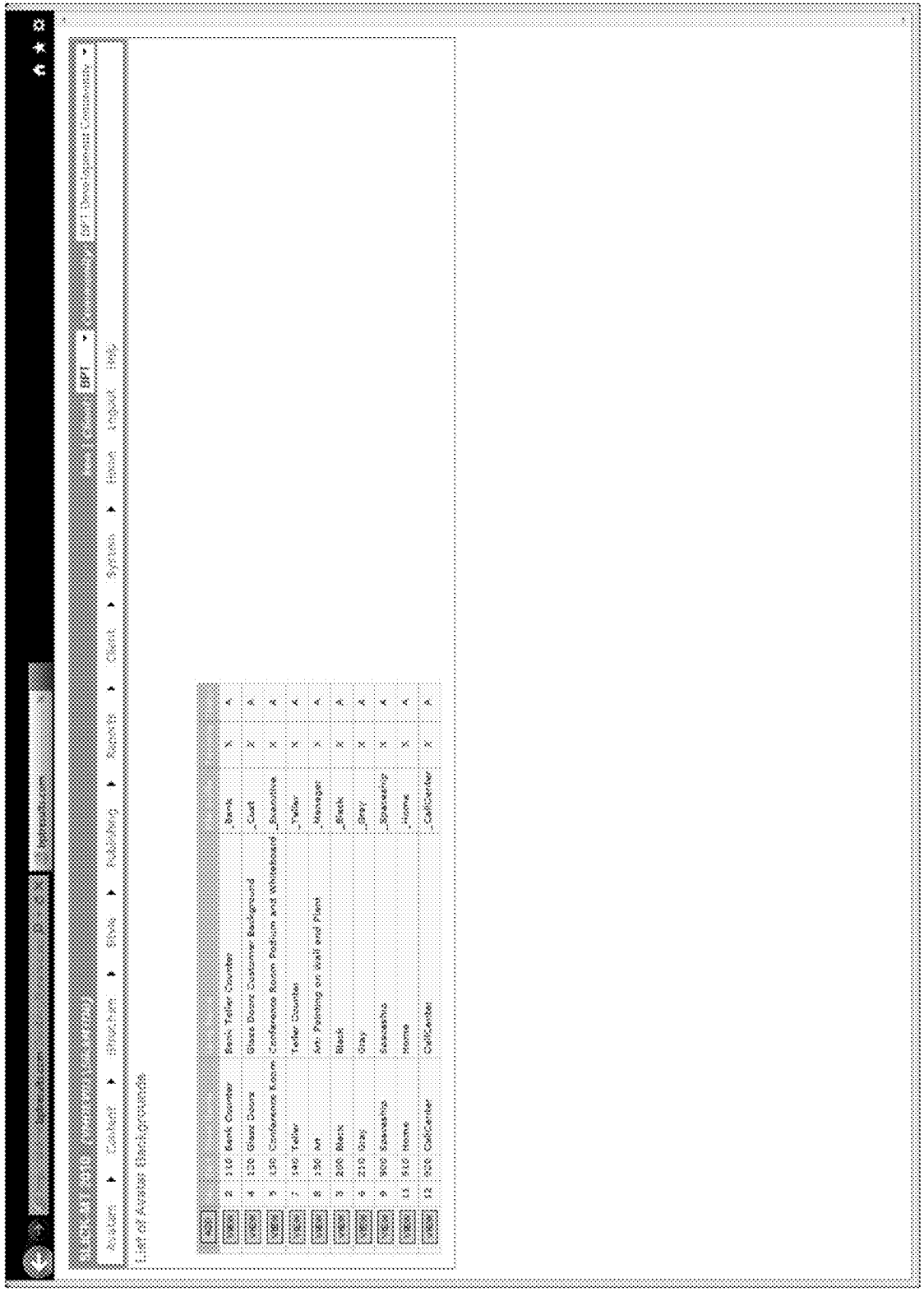
Figure 3B:
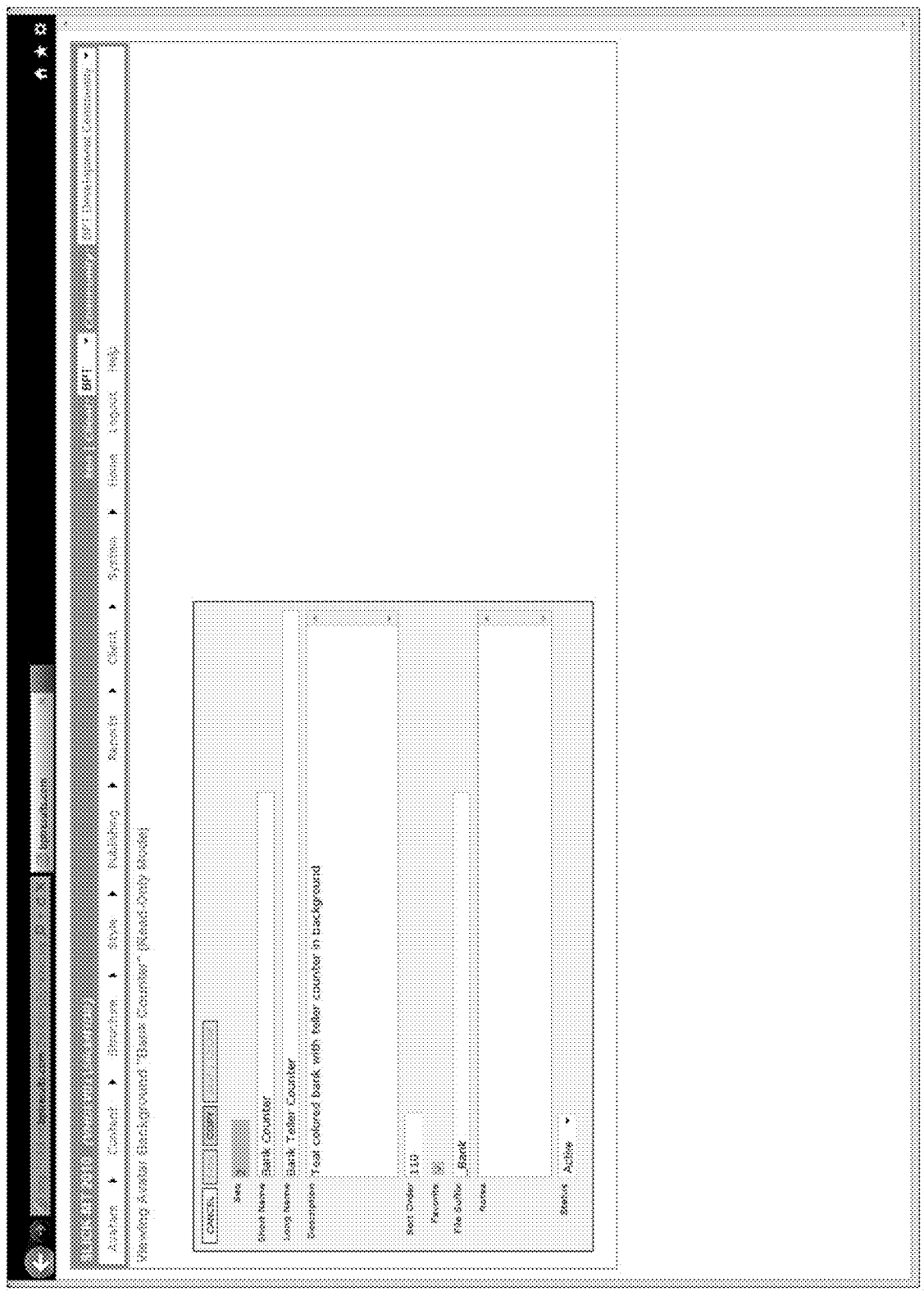

FIG. 3A illustrates an example listing of avatar backgrounds, including related information, such as sequence number, sort number, short name, long name, file suffix, favorite indication, and status. A view control is provided in association with an avatar background, which if activated, causes a user interface, such as the example user interface illustrated in FIG. 3B, to be presented. FIG. 3B illustrates an example avatar background user interface (for the "Bank Counter" background in this example). The example user interface includes the following fields: sequence number, short name, long name, description, sort order, favorite indication, file suffix, notes, and status.

Figure 3D:
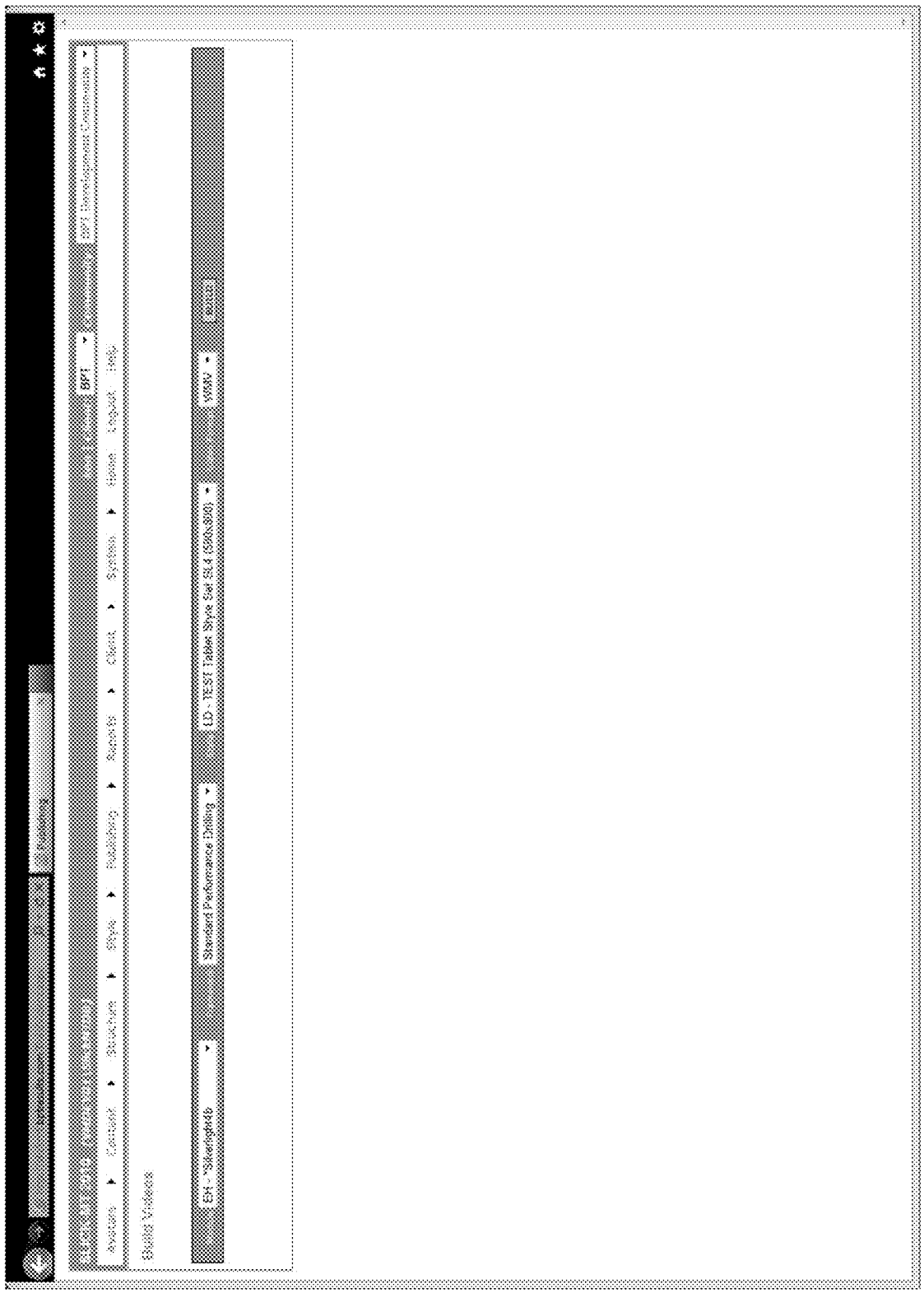

FIG. 3C illustrates an example listing of media in a media catalog, including related information, such as type (e.g., image, audio, video, animation, etc.), a visual representation of the media (e.g., a thumbnail of an image, a clip of a video, a waveform of an audio track, etc.), an original file name, a new file name, a description, an upload date, an indication as to who uploaded the media, and the media format (e.g., JPEG, PNG, GIF, WAV, MP4, etc.). FIG. 3D illustrates an example build video user interface, wherein the user can specify/select a module, framework, style, and video format. The user can then activate a build control and the system will build the video using the selected module, framework, style, and video format.

Figure 4:
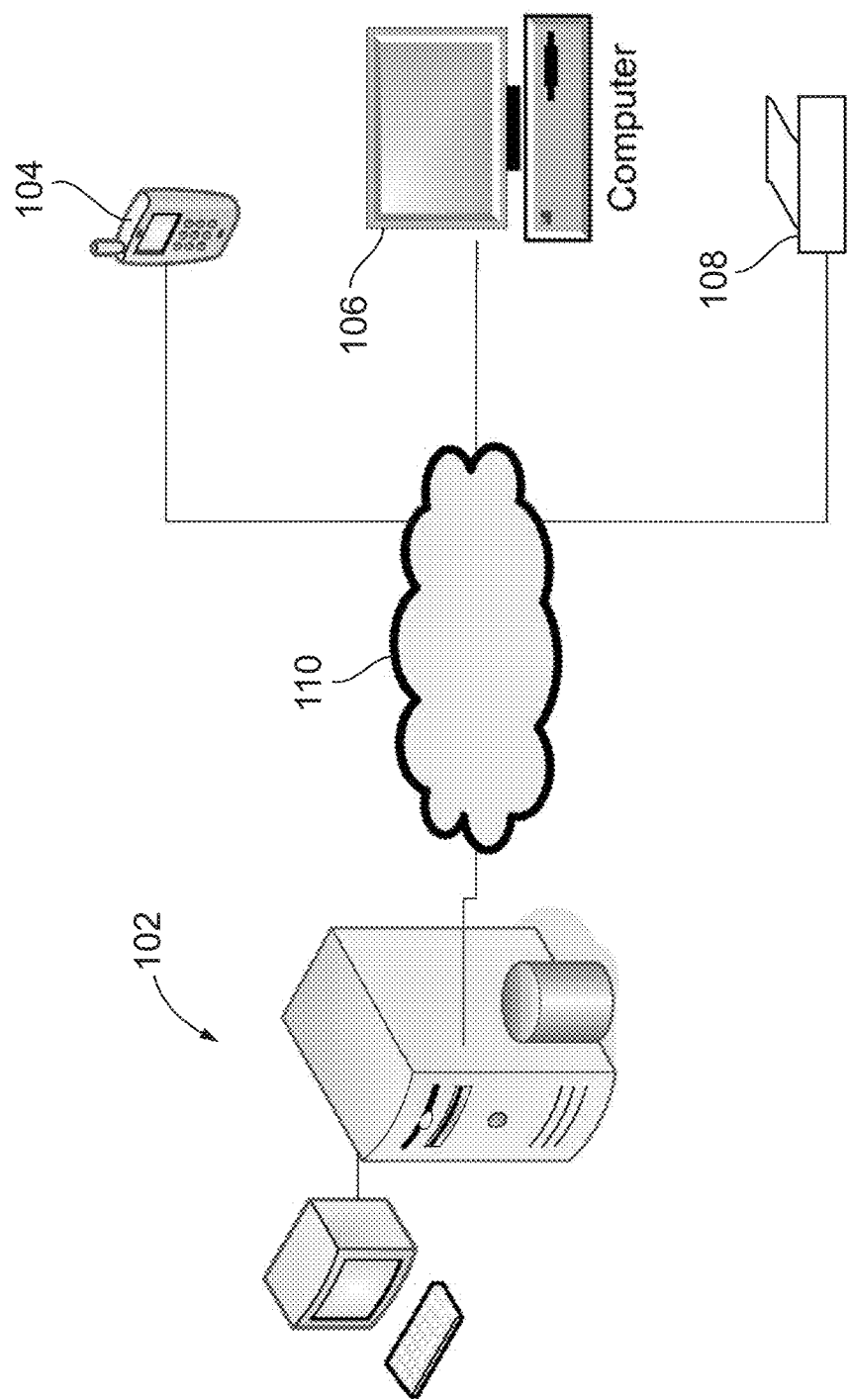
FIG. 4 illustrates an example network system.

FIG. 4 illustrates an example networked system architecture. An authoring system 102 may host the authoring software providing some or all of the functions described elsewhere herein. The authoring system may include a server and a data store. The data store may store content, code for rendering user interfaces, templates, frameworks, fonts, and/or other types of data discussed herein. The authoring system 102 may host a website via which the authoring system, applications, and user interfaces may be accessed over a network. The authoring system 102 may include one or more user terminals, optionally including displays, keyboards, mice, printers, speakers, local processors, and the like. The authoring system 102 may be accessible over a network, such as the Internet, to one or more other terminals, which may be associated with content authors, administrators, and/or end users (e.g., trainees, students, etc.). The user terminals may be in the form of a mobile device 104 (which may be in the form of a wireless smart phone), a computer 106 (which may be in the form of a desktop computer, laptop, tablet, smart TV, etc.), a printer 108, or other device. Certain user terminals may be able to reproduce audio and video content as well as text content from the authoring system, while other terminals may be able to only reproduce text and/or audio.

Figure 5:
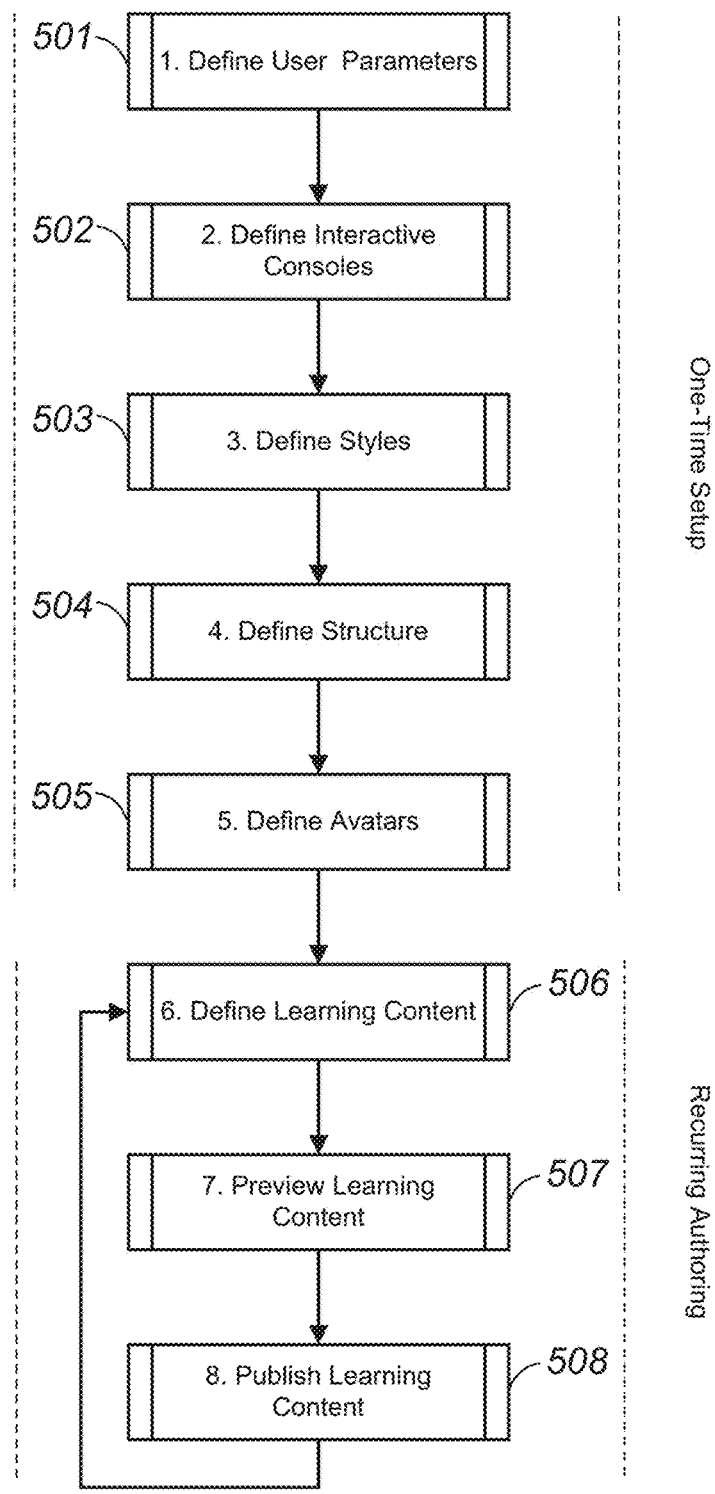
FIG. 5 illustrates an example process overview for defining and publishing learning content.

FIG. 5 illustrates an example process overview for defining and publishing learning content. At state 501, a user may define user parameters via the authoring system (e.g., login data/credentials, communities, access rights, etc.) which are stored by the authoring system, as explained in greater detail with reference to FIG. 6. At state 502, the user (who will be referred to as an author although the user may be an administrator rather than a content author) can define interactive consoles via the authoring system (e.g., maintenance console, styles consoles, structures console, avatar consoles, learning content consoles, etc.) which are stored by the authoring system, as explained in greater detail with reference to FIG. 7. At state 503, the author can define styles via the authoring system (e.g., font definitions, page layouts, media formats, static text sets, control panel appearance, scoring panel appearance, style set collection, etc.) which are stored by the authoring system, as explained in greater detail with reference to FIG. 8. At state 504, the author can define structures via the authoring system (e.g., learning frameworks, learning content, scoring systems, control functions, control panel groupings, etc.) which are stored by the authoring system, as explained in greater detail with reference to FIG. 9.

At state 505, the author can define avatars via the authoring system (e.g., avatar models, avatar scenes, avatar motions, avatar casts, etc.) which are stored by the authoring system, as explained in greater detail with reference to FIG. 10. At state 506, the author can define structure (e.g., learning objects, modules of learning objects, course of modules, series of courses, etc.) which are stored by the authoring system, as explained in greater detail with reference to FIG. 11. At state 507, the user can preview the learning content via the authoring system, as explained in greater detail with reference to FIG. 12. At state 508, the user can publish the learning content via the authoring system, as explained in greater detail with reference to FIG. 13.

Optionally, some of the states (e.g., states 501-505) may only need to be performed by a given author once, during a set-up phase, although optionally a user may repeat the states. Other states are optionally performed as new content is being authored and published (e.g., states 506-508).

Figure 6:
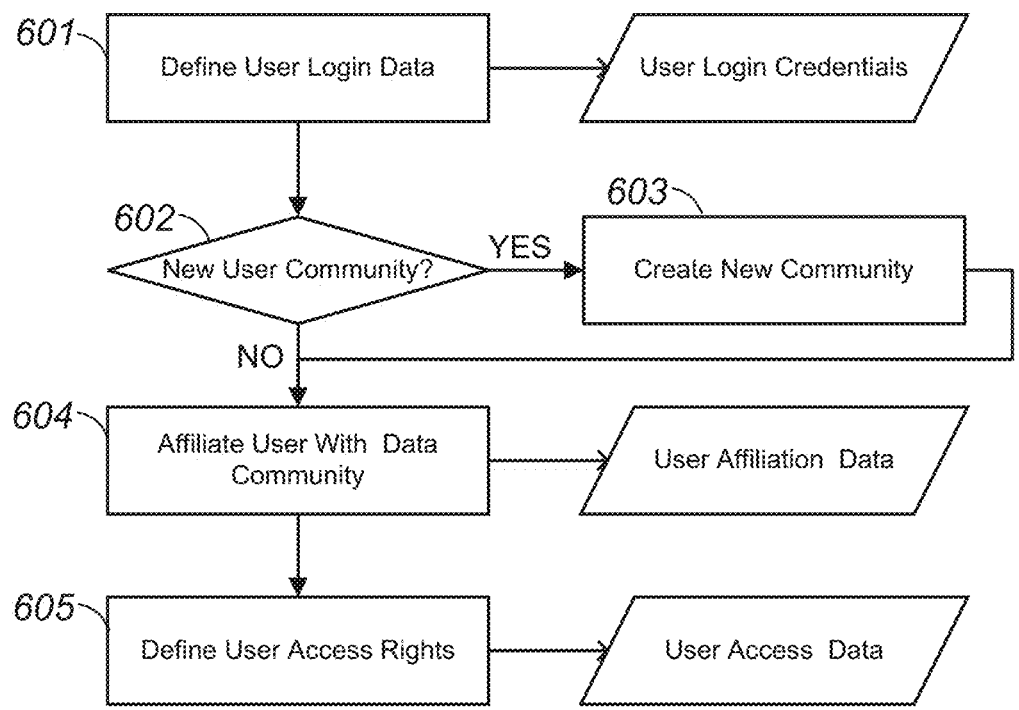
FIG. 6 illustrates an example process for defining parameters.

FIG. 6 illustrates an example process for defining parameters. At state 601, an author may define login data/credentials that will be needed by users (e.g., students/trainees) to login to access learning course (e.g., a userID and password). At state 602, a determination is made as to whether the author is defining a new community. The authoring system may be hosted on a multi-tenant Internet-based server system, enabling multiple organizations (e.g., companies or other entities) to share the authoring platform, wherein a given organization may have a private, secure space inaccessible to other organizations while other resources are shared "public" areas, available to all or a plurality of selected organizations/companies. A given organization can specify which of its resources are public or private, and can specify which other organizations can access what resources. The organization's specification may then be stored in memory. The operator of the authoring system may likewise offer resources and specify which resources are public. Examples of resources include learning content, style sets, custom avatars, etc.

If the author is defining a new community, the process proceeds to state 603, and a new community is defined by the author. Creating a new community may be performed by creating a new database entry that is used as a registration of a separate "space" within the multi-tenant platform. If, at state 602, a determination is made that the author is utilizing an existing community, the process proceeds to data 603. The author affiliates with a data community and specified user affiliation data. At this point, a "community" exists (either pre-existing or newly created), and so the user is assigned to the specific community so that they can have access to both the private and public resources of that community. At state 605, the author can define user access rights, specifying what data a given user or class of user can access.

Figure 7:
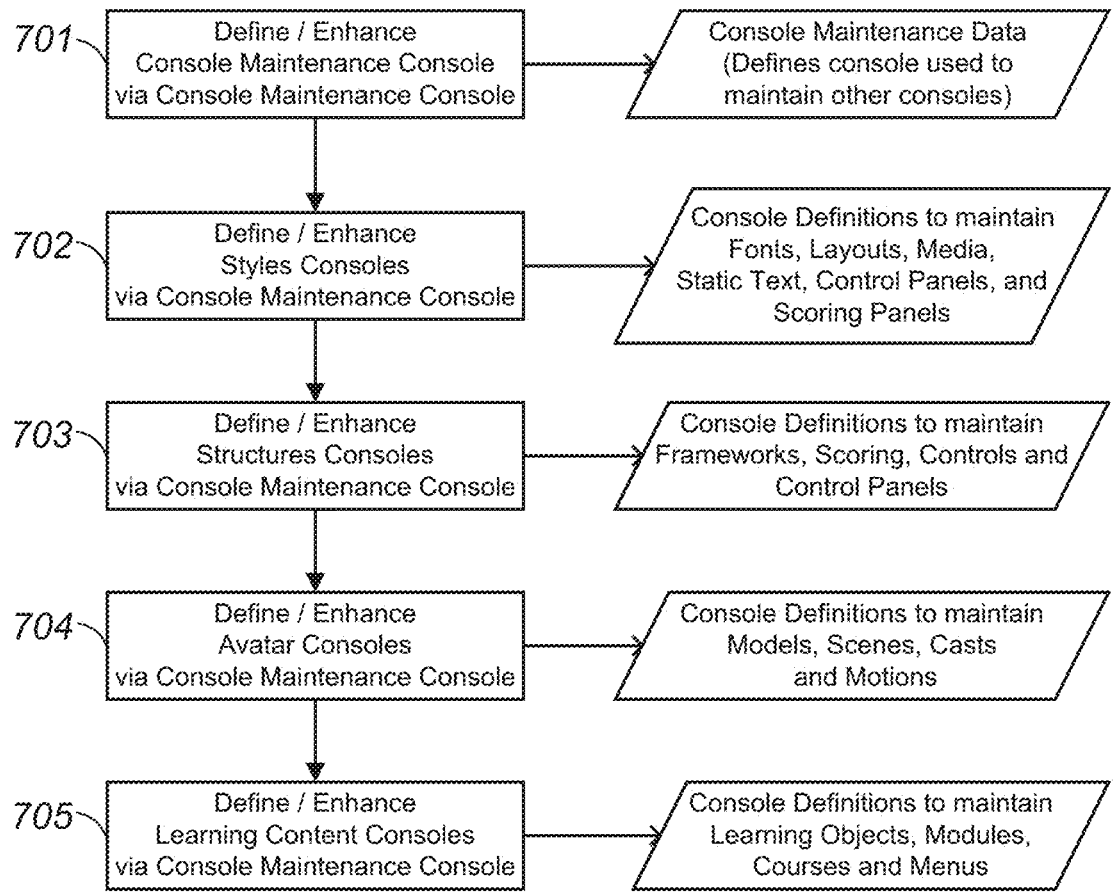
FIG. 7 illustrates an example process for defining interactive consoles.

FIG. 7 illustrates an example process for defining interactive consoles. At state 701, an author can define and/or edit a console used to maintain other consoles. At state 702, the author may define/edit styles consoles using the console maintenance console defined at state 701. The style consoles may be used to define and maintain fonts, layouts, media, static text, control panels, and scoring panels. At state 703, the author may define/edit structures consoles which may be used to define and maintain various panels such as frameworks, scoring, and controls panels. At state 704, the author may define/edit avatar consoles which may be used to define and maintain models, scenes, casts, and motions. At state 705, the author may define/edit learning content consoles which may be used to define and maintain learning objects, modules, courses, and manuals.

By way of illustration, a "maintenance console" may be used to define elements that comprise the system that is used to maintain the relevant data. By way of example, if the data was an "address file" or electronic address card, the corresponding console may comprise a text box for name, a text box for address, a text box that only accepted numbers for ZIP code, a dropdown box for a selection of state. A user may be able to add controls (e.g., buttons) to the console that enables a user to delete the address card, make a copy of the address card, save the address after making changes, or print the address card. Thus, in this example application, that console comprises assorted text boxes, some buttons, a dropdown list, etc.

The console editor enables the user to define the desired elements and specify how user interface elements are to be laid out. For example, the user may want buttons to save, delete, copy to be positioned towards that top of the user interface; then below the buttons, a text box may be positioned to receive or display the name of the person on the address card. Positioned below the foregoing text box, a multi-line box may be positioned for the street address, then a box for city, a dropdown for state, and a box for ZIP code. Thus, the console editor enables the user to define various controls to build the user interfaces for maintaining user specified data. The foregoing process may be used for multiple types of data definitions, and as in the illustrated example, the user interface to define the console optionally grouped in one area (e.g., on the left), and the data that defines that console optionally grouped in another area (e.g., on the right)—with each console containing a definition of the appropriate controls to perform that maintenance task.

Thus, for example, at state 702, a user can define the controls needed to maintain styles. At state 703, a user can define the controls needed to define structures. At state 704, a user can define the controls needed to maintain avatar definitions. At state 705, a user can define the controls needed to maintain the learning content.

At state 701, the console maintenance console may be used to define a console (as similarly discussed with respect to states 702 through 705) but in this case the console that is being defined is used to define consoles. As such, the tool to define consoles is flexible, in that it is used to define itself.

Figure 8:
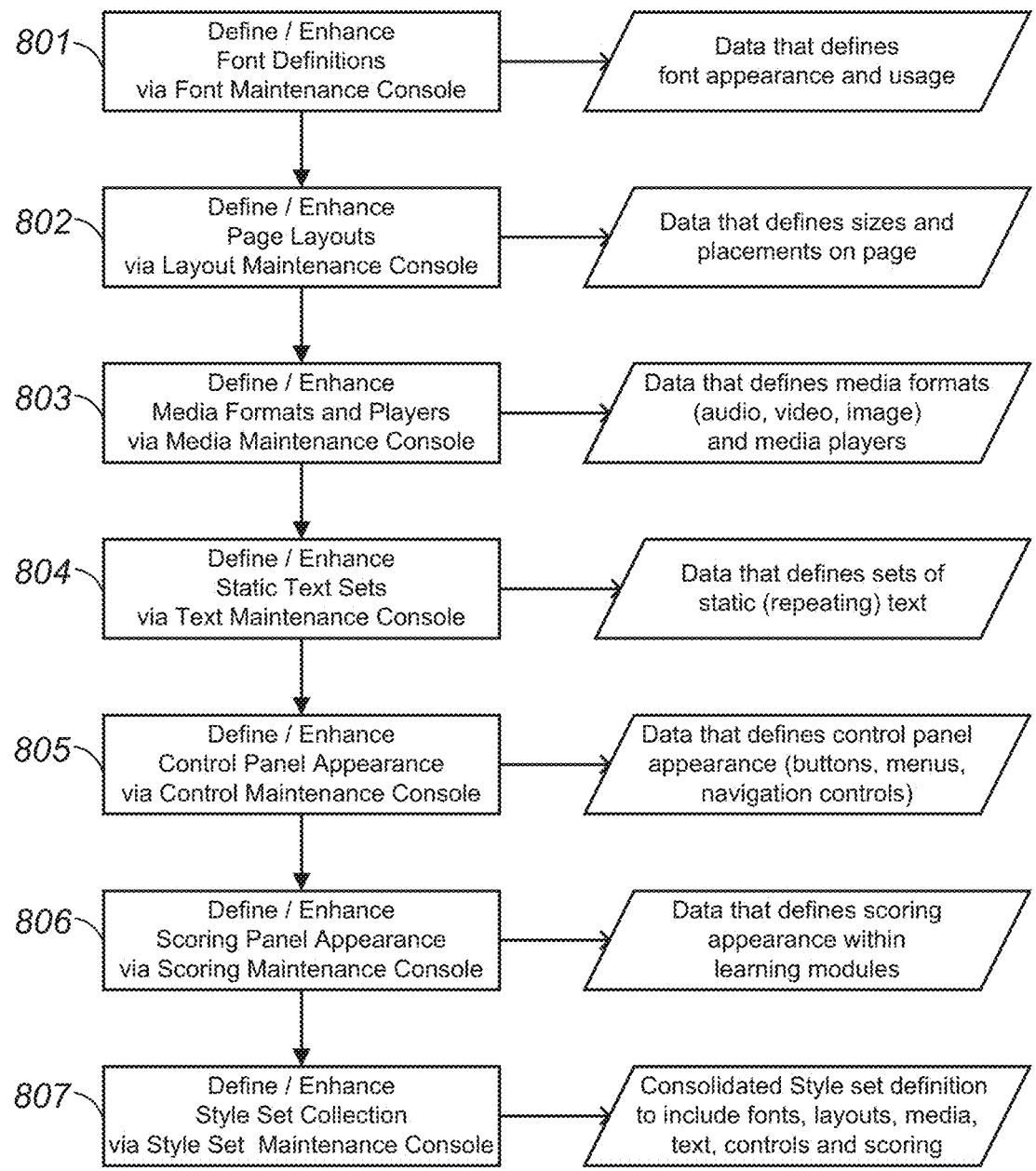
FIG. 8 illustrates an example process for defining styles.

FIG. 8 illustrates an example process for defining styles. At state 801, the author may define/edit font definitions via a font maintenance console to define font appearance (e.g., font family (e.g., Arial), size (e.g., large, medium, small, or 10 point, 14 point, 18 point, etc.), color (e.g., expressed as a hexadecimal value, a color name, or a visual color sample), special effects/styles (e.g., bold, italic, underline)) and usage. At state 802, the author may define/edit page layouts via a layout maintenance console to define dimensions and placement on a given "page." At state 803, the author may define/edit page media formats and media players via a media maintenance console to define media formats (e.g., for audio, video, still images, etc.). At state 804, the author may define/edit static text sets via a text maintenance console to define sets of static text (which may be text that is repeatedly used, such as "Next" and "Previous" that may appear on each user interface in a learning module). At state 805, the author may define/edit control panel appearance via a control maintenance console to define the appearance of control panels (e.g., color, buttons, menus, navigation controls, etc.). At state 806, the author may define/edit scoring panel appearance via a scoring maintenance console to define the appearance of scoring (e.g., a grade score, a numerical score, a pass fail score, etc.) for use with learning modules. At state 807, the author may define/edit a style set collection via a style set console to define a consolidated style set to include fonts, layout, media, text, controls, and/or scoring.

Figure 9:
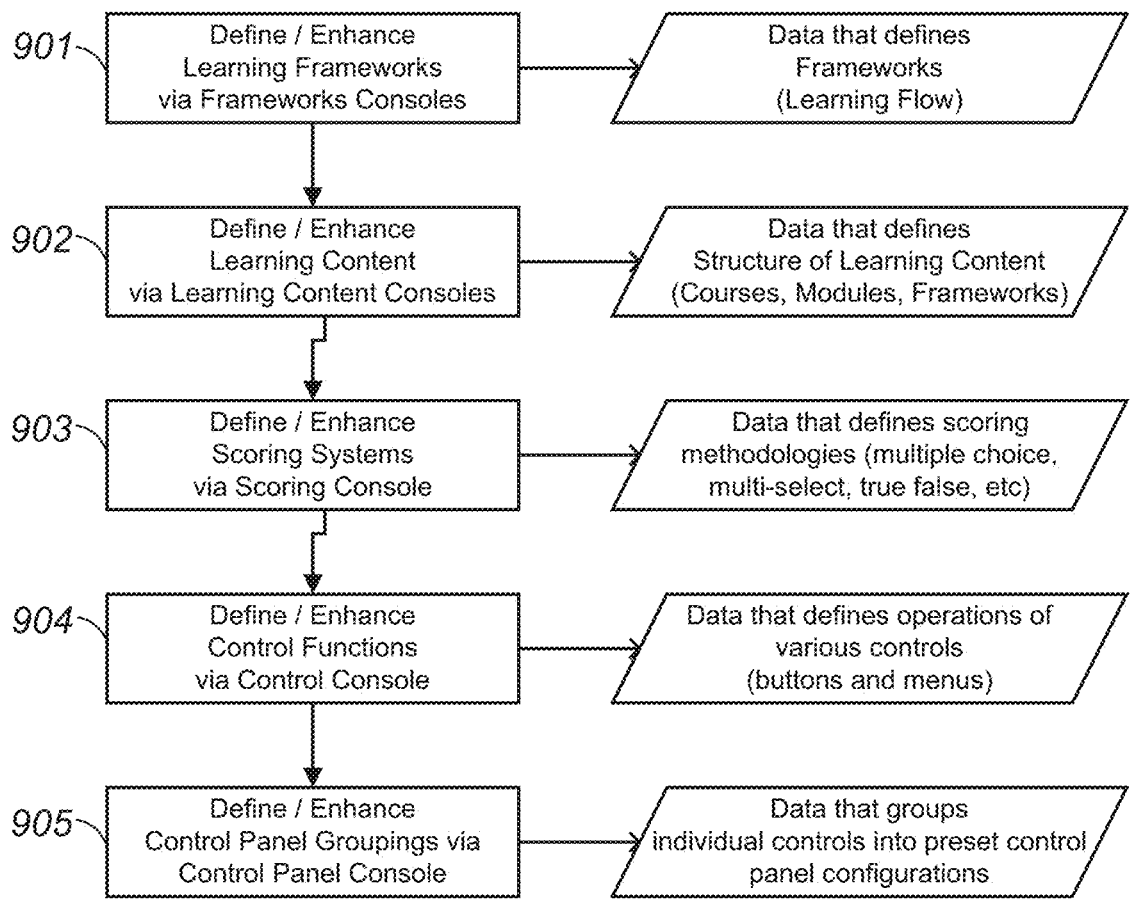
FIG. 9 illustrates an example process for defining structure.

FIG. 9 illustrates an example process for defining content structure, including learning flow, learning content, scoring systems, control functions, and control panel groupings. At state 902, the author may define/edit learning frameworks via a framework console to define data that defines frameworks/learning flows (e.g., an order or flow of presentation of content to a learner). At state 903, the author may define/edit learning content via a learning content console to define the learning content structure, including, for example, courses, modules, and frameworks. At state 903, the author may define/edit learning scoring systems via a scoring console to define scoring methodologies (e.g., multiple choice, multi-select, true/false, etc.). At state 904, the author may define/edit control functions via a control console to define controls, (e.g., buttons, menus, hotspots, etc.). At state 905, the author may define/edit control panel groupings via a control panel console to define individual controls into preset control panel configurations.

Figure 10:
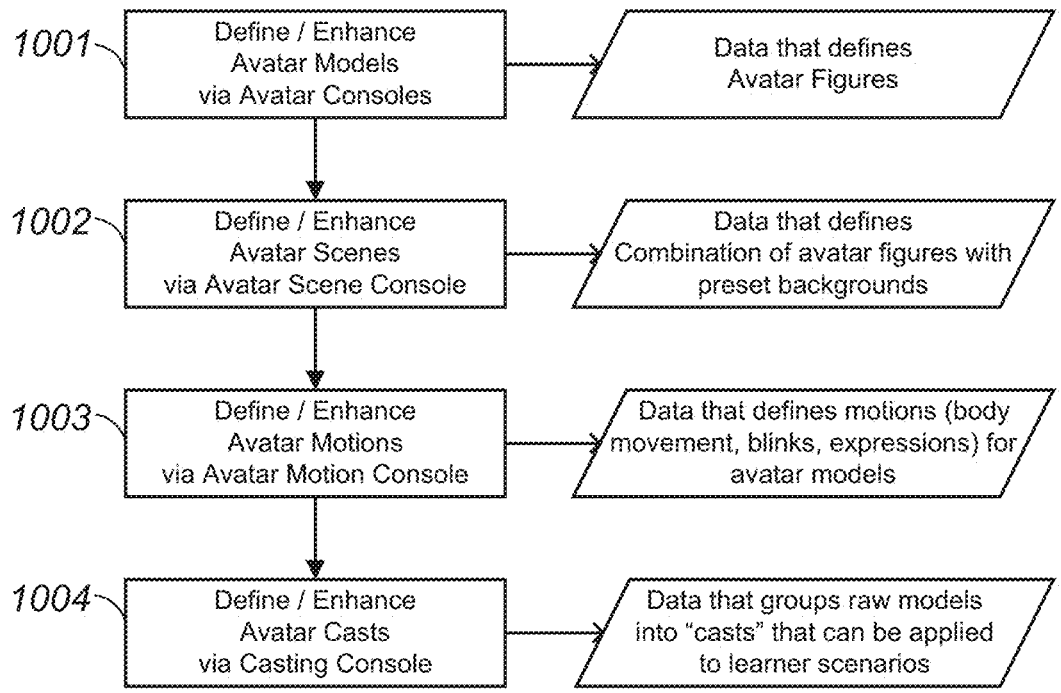
FIG. 10 illustrates an example process for defining an avatar.

FIG. 10 illustrates an example process for defining an avatar. At state 1001, the author may define/edit avatar modules via an avatar console to define avatar figures (e.g., gender, facial features, clothing, race, etc.). At state 1002, the author may define/edit avatar scenes via an avatar scene console to define scenes including avatars, such as by selecting predefined backgrounds or defining backgrounds. At state 1003, the author may define/edit avatar motions via an avatar motion console to define such aspects as body movements, facial expressions, stances, etc. for the avatar models. At state 1004, the author may define/edit avatar casts via a casting console to group avatar models in casts that can be applied to one or more learning scenarios.

Figure 11:
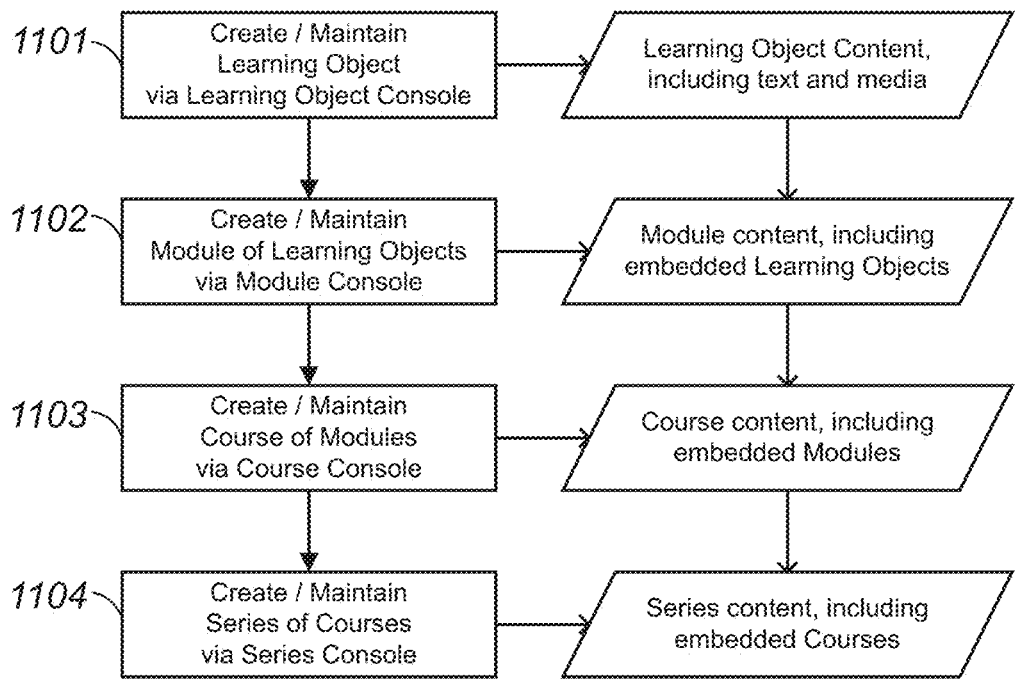
FIG. 11 illustrates an example process for defining learning content.

FIG. 11 illustrates an example process for defining learning content. At state 1101, the author may define/edit learning objects via a learning object console to define learning object content, such as text, audio-video media, graphics, etc. At state 1102, the author may define/edit modules of learning content via a module console to define module content (e.g., by selecting learning objects to embed in the learning content modules). At state 1103, the author may define/edit a course of modules via a course console to define course content (e.g., by selecting learning content modules to embed in the course content). At state 1104, the author may define/edit a series of courses via a series console to define course content (e.g., by selecting courses to embed in the course series.

Figure 12:
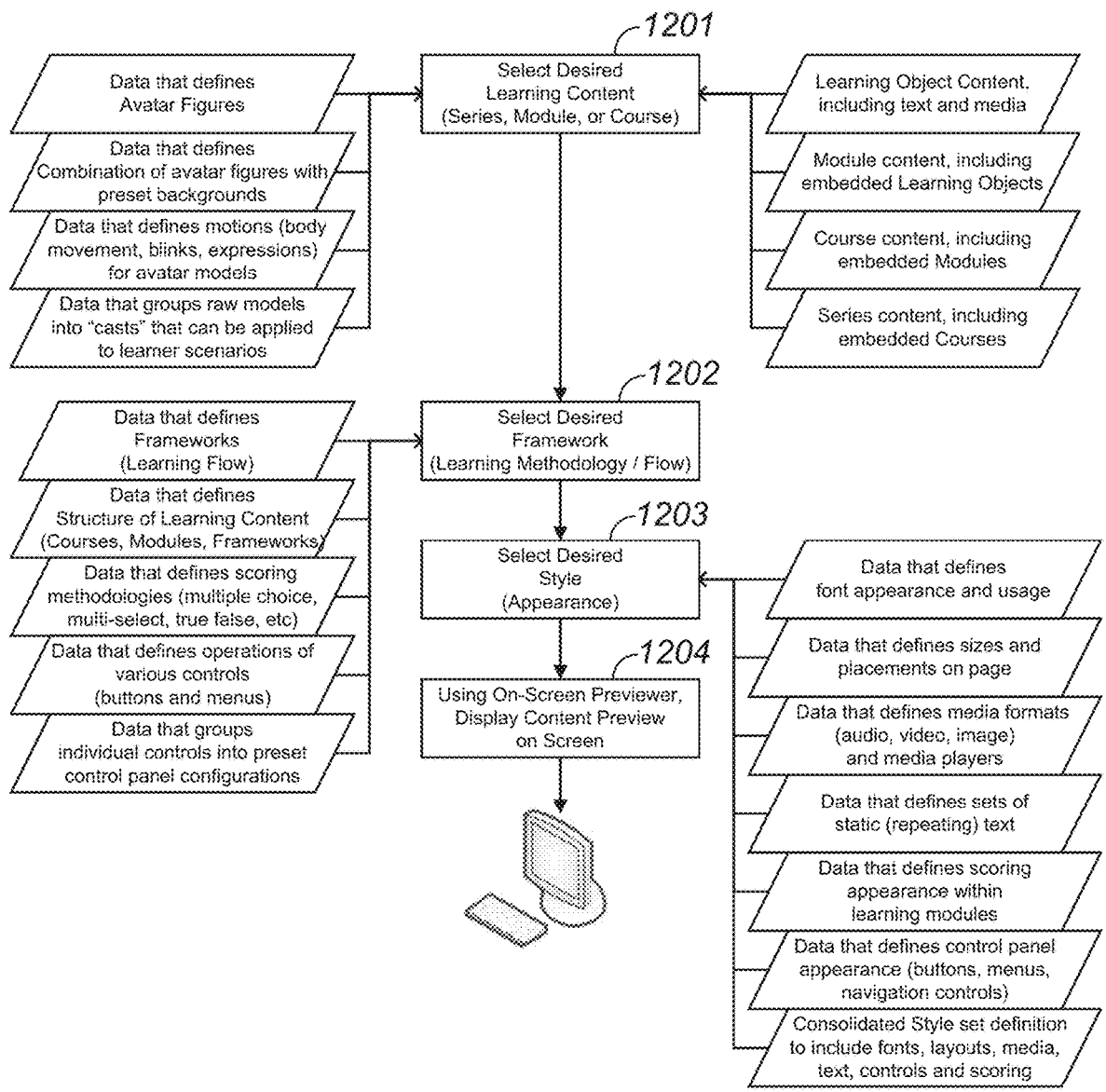
FIG. 12 illustrates an example process for previewing content.

FIG. 12 illustrates an example process for previewing content. At state 1201, the author can select desired content to be previewed from a menu of content (e.g., course series, modules, courses) or otherwise, which may include data that defines avatars, combinations of avatar figures with backgrounds, avatar model motions, avatar costs, learning object content, module content, course content, series content, etc. At state 1202, the user can select a desired framework (e.g., learning methodologies/flow) to be previewed from a menu of frameworks or otherwise, where a selected framework may include data that defines frameworks, learning content structure, scoring methodologies, control operations, control groupings, etc. At state 1203, the user can select a desired style (e.g., appearance) to be previewed from a menu of styles or otherwise, where a selected style may include data that defines font appearance and usage, dimensions/sizes and placement, media formats and players, static text, scoring appearance, control panel appearance, consolidated style set definition, etc.

Figure 13:
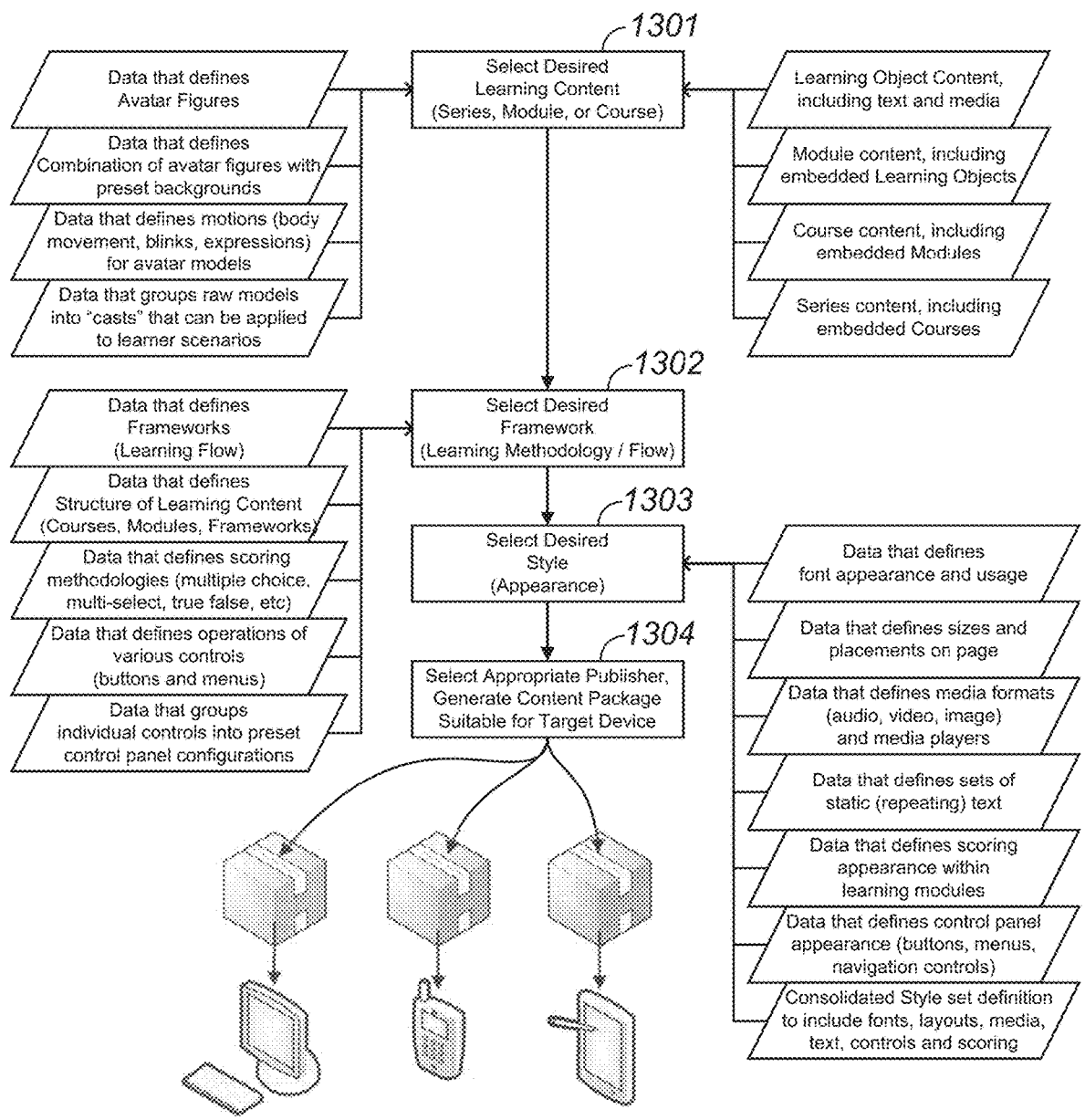
FIG. 13 illustrates an example process for publishing content.

FIG. 13 illustrates an example process for publishing content. At state 1301, the author may select (e.g., via a menu or otherwise) learning content to be published (e.g., a series, module, course, etc.), which may include data that defines avatars, combinations of avatar figures with backgrounds, avatar model motions, avatar costs, learning object content, module content, course content, series content, etc. At state 1302, the user can select a desired framework (e.g., learning methodologies/flow) to be published from a menu of frameworks or otherwise, where a selected framework may include data that defines frameworks, learning content structure, scoring methodologies, control operations, control groupings, etc. At state 1303, the user can select a desired style (e.g., appearance) to be published from a menu of styles or otherwise, where a selected style may include data that defines font appearance and usage, dimensions/sizes and placement, media formats and players, static text, scoring appearance, control panel appearance, consolidated style set definition, etc. At state 1304, the author can select the appropriate publisher for one or more target devices via a menu of publishers or otherwise, and the authoring system will generate a content package (e.g., digital documents) suitable for respective target devices (e.g., a desktop computer, a tablet, a smart phone, an interactive television, a hardcopy book, etc.).

Thus, certain embodiments described herein enable learning content to be developed flexibly and efficiently, with content and format independent defined. For example, an author may define learning items by subject, may define a template that specifies how these various items are to be presented to thereby build learning modules. An author may enter data independent of the format in which it is to be presented, and create an independent "framework" that specifies a learning flow. During publishing, content and the framework may be merged. Optionally, a user can automatically publish the same content in any number of different frameworks. Certain embodiments enable some or all of the foregoing features by providing a self-defining, extensible system enabling the user to appropriately tag and classify data. This enables the content to be defined before or after the format or the framework are defined.

Certain embodiments may be implemented via hardware, software stored on media, or a combination of hardware and software. For example, certain embodiments may include software/program instructions stored on tangible, non-transitory computer-readable medium (e.g., magnetic memory/discs, optical memory/discs, RAM, ROM, FLASH memory, other semiconductor memory, etc.), accessible by one or more computing devices configured to execute the software (e.g., servers or other computing device including one or more processors, wired and/or wireless network interfaces (e.g., cellular, WiFi, BLUETOOTH interface, T1, DSL, cable, optical, or other interface(s) which may be coupled to the Internet), content databases, customer account databases, etc.). Data stores (e.g., databases) may be used to store some or all of the information discussed herein.

By way of example, a given computing device may optionally include user interface devices, such as some or all of the following: one or more displays, keyboards, touch screens, speakers, microphones, mice, track balls, touch pads, printers, etc. The computing device may optionally include a media read/write device, such as a CD, DVD, Blu-ray, tape, magnetic disc, semiconductor memory, or other optical, magnetic, and/or solid state media device. A computing device, such as a user terminal, may be in the form of a general purpose computer, a personal computer, a laptop, a tablet computer, a mobile or stationary telephone, an interactive television, a set top box (e.g., coupled to a display), etc.

While certain embodiments may be illustrated or discussed as having certain example components, additional, fewer, or different components may be used. Process described as being performed by a given system may be performed by a user terminal or other system or systems. Processes described as being performed by a user terminal may be performed by another system or systems. Data described as being accessed from a given source may be stored by and accessed from other sources. Further, with respect to the processes discussed herein, various states may be performed in a different order, not all states are required to be reached, and fewer, additional, or different states may be utilized. User interfaces described herein are optionally presented (and user instructions may be received) via a user computing device using a browser, other network resource viewer, or otherwise. For example, the user interfaces may be presented (and user instructions received) via an application (sometimes referred to as an "app"), such as an app configured specifically for authoring or training activities, installed on the user's mobile phone, laptop, pad, desktop, television, set top box, or other terminal. Various features described or illustrated as being present in different embodiments or user interfaces may be combined into still another embodiment or user interface. A given user interface may have additional or fewer elements and fields than the examples depicted or described herein.

What is claimed is:

1. A learning content management system comprising:
one or more processing devices;
non-transitory machine readable media that stores executable instructions, which, when executed by the one or more processing devices, are configured to cause the one or more processing devices to perform operations comprising:
providing for display on a computing device a learning content input user interface configured to receive learning content;
receiving learning content via the learning content input user interface and storing the received learning content in machine readable memory;
providing for display on the computing device a framework user interface configured to receive a framework definition,
wherein the framework definition defines at least an order of presentation to a learner with respect to learning content;
receiving from a user, independently of the received learning content, a first framework definition via the framework user interface and storing the received first framework definition in machine readable memory, wherein the first framework definition specifies a first presentation flow;
receiving a second framework definition via the framework user interface and storing the received second framework definition in machine readable memory, wherein the second framework definition specifies a second presentation flow;
providing for display on the computing device a style set user interface configured to receive a style definition, wherein the style definition defines an appearance format of learning content, and
wherein the style set user interface enables a plurality of style definitions to be defined, including at least a first style definition and a second style definition;
receiving, independently of at least a portion of the received learning content, the first style set definition via the style set user interface and storing the received first style set definition in machine readable memory,
wherein the first style set definition defines an appearance format for a display having a first display capability;
receiving from the user a first publishing instruction via a publishing user interface;
at least partly in response to the received first publishing instruction:
accessing from machine readable memory the received learning content, the received first framework definition, and the received first style set definition;
rendering the received learning content using the received first framework definition in accordance with the first style set definition; and
packaging the learning content rendered using the first framework definition to provide a first published learning document for a device having the first display capability,
wherein packaging the learning content rendered using the first framework definition comprises saving space or enabling the device having the first display capability to display the published learning document by converting at least one content item format.

2. The system as defined in claim 1, wherein the first display capability relates to a physical property of the first display.

3. The system as defined in claim 1, the operations further comprising providing a target device menu for display on the computing device, the target device menu including at least:
a device type having the first display capability, and
a device type having a second display capability, wherein the device having the second display capability has a different display resolution than the device having the first display capability,
wherein the learning content rendered using the first framework definition is packaged in accordance with a selected target device.

4. The system as defined in claim 1, wherein the learning content management system comprises a multi-tenant Internet-based server system that enables multiple entities to utilize the learning content management system, and wherein a given entity is provided a private, secure space inaccessible to other entities provided access to the system, and certain resources are public and shared and are available to all entities or a plurality of selected entities that utilize the learning content management system.

5. The system as defined in claim 1, wherein the learning content management system comprises a multi-tenant Internet-based server system that enables multiple entities to utilize the learning content management system, and wherein a given entity is provided a private, secure space inaccessible to other entities provided access to the system, and certain resources are public and shared and are available to all entities or a plurality of selected entities that utilize the learning content management system, where the system enables a given entity to specify which resources of the given entity are public and which resources of the given entity are private.

6. The system as defined in claim 1, wherein the style set user interface comprises a hierarchal menu comprising resources and links to frameworks.

7. The system as defined in claim 1, wherein the style set user interface enables the user to specify a style set for a mobile device and a style set for a printable document.

8. The system as defined in claim 1, wherein converting at least one content item from a first format to a second format comprises converting at least one content item from a first file type to a second file type.

9. The system as defined in claim 1, wherein converting at least one content item from a first format to a second format comprises converting at least an image format of at least one content item.

10. The system as defined in claim 1, wherein converting at least one content item from a first format to a second format comprises converting at least an audio format of at least one content item.

11. The system as defined in claim 1, the operations further comprising:
providing a user interface enabling the user to select at least an avatar face and an audio track; and
generating a user selected animated avatar whose lips and/or body motions are synchronized with a user selected audio track.

12. A computer-implemented method, comprising:
providing, by a computer system comprising hardware, a learning content input user interface configured to receive learning content;
receiving, by the computer system, learning content via the learning content input user interface and storing the received learning content in machine readable memory;

providing, by the computer system, a framework user interface configured to receive a framework definition, wherein the framework definition defines at least an order of presentation to a learner with respect to learning content;

receiving, by the computer system, from a user, independently of the received learning content, a first framework definition via the framework user interface and storing the received first framework definition in machine readable memory, wherein the first framework definition specifies a first presentation flow;

receiving, by the computer system, independently of the received learning content, a second framework definition via the framework user interface and storing the received second framework definition in machine readable memory, wherein the second framework definition specifies a second presentation flow;

providing, by the computer system, a style set user interface configured to receive a style definition, wherein the style definition defines an appearance format of learning content and wherein the style set user interface enables a plurality of style definitions to be defined, including at least a first style definition and a second style definition;

receiving, independently of at least a portion of the received learning content, the first style set definition via the style set user interface and storing the received first style set definition in machine readable memory, wherein the first style set definition defines an appearance format for a display having a first display capability;

receiving, by the computer system, from the user a first publishing instruction via a publishing user interface;

at least partly in response to the received first publishing instruction:

accessing, by the computer system, from machine readable memory the received learning content, the received first framework definition, and the received first style set definition;

enabling the received learning content to be rendered using the received first framework definition;

packaging the learning content rendered using the first framework definition to provide a first published learning document for a device having the first display capability, wherein packaging the learning content rendered using the first framework definition comprises converting at least one content item from a first format to a second format.

13. The method as defined in claim 12, wherein the first display capability relates to a physical property of the first display.

14. The method as defined in claim 12, the method further comprising providing a target device menu for display on the computing device, the target device menu including at least:
  a device type having the first display capability, and
  a device type having a second display capability, wherein the device having the second display capability has a different display resolution than the device having the first display capability;
  wherein the learning content rendered using the first framework definition is packaged in accordance with a selected target device.

15. The method as defined in claim 12, the method further comprising: enabling multiple entities to utilize the computer system, wherein a given entity is provided a private, secure space inaccessible to other entities provided access to the computer system, and certain resources are public and shared and are available to all entities or a plurality of selected entities that utilize the computer system.

16. The method as defined in claim 12, the method further comprising: enabling multiple entities to utilize the computer system, wherein a given entity is provided a private, secure space inaccessible to other entities provided access to the computer system, and certain resources are public and shared and are available to all entities or a plurality of selected entities that utilize the computer system, and enabling a given entity to specify which resources of the given entity are public and which resources of the given entity are private.

17. The method as defined in claim 12, wherein the style set user interface comprises a hierarchal menu comprising resources and links to frameworks.

18. The method as defined in claim 12, wherein converting at least one content item from a first format to a second format comprises converting at least one content item from a first file type to a second file type.

19. The method as defined in claim 12, wherein converting at least one content item from a first format to a second format comprises converting at least an image format of at least one content item.

20. The method as defined in claim 12, wherein converting at least one content item from a first format to a second format comprises converting at least an audio format of at least one content item.

* * * * *